US011383107B2

(12) United States Patent
Connor

(10) Patent No.: US 11,383,107 B2
(45) Date of Patent: Jul. 12, 2022

(54) PATHOGEN-FILTERING FACE MASK WITH TRANSPARENT MOUTH-COVERING PORTION AND ACTIVE AIR CIRCULATION

(71) Applicant: Robert A. Connor, St. Paul, MN (US)

(72) Inventor: Robert A. Connor, St. Paul, MN (US)

(73) Assignee: Medibotics LLC, St. Paul, MN (US)

( * ) Notice: Subject to any disclaimer, the term of this patent is extended or adjusted under 35 U.S.C. 154(b) by 0 days.

(21) Appl. No.: 17/547,207

(22) Filed: Dec. 9, 2021

(65) Prior Publication Data

US 2022/0096874 A1   Mar. 31, 2022

Related U.S. Application Data

(63) Continuation-in-part of application No. 17/408,409, filed on Aug. 21, 2021, and a continuation-in-part of application No. 17/175,675, filed on Feb. 14, 2021, said application No. 17/408,409 is a continuation-in-part of application No. 17/175,675, filed on Feb. 14, 2021, which is a continuation-in-part of application No. 16/910,625, filed on Jun. 24, 2020, now abandoned.

(60) Provisional application No. 63/088,664, filed on Oct. 7, 2020, provisional application No. 63/035,744, filed on Jun. 6, 2020, provisional application No. 63/023,331, filed on May 12, 2020, provisional application No. 63/017,718, filed on Apr. 30, 2020.

(51) Int. Cl.
*A62B 7/10* (2006.01)
*A41D 13/11* (2006.01)

(52) U.S. Cl.
CPC ............... *A62B 7/10* (2013.01); *A41D 13/11* (2013.01)

(58) Field of Classification Search
CPC ....... A62B 18/02; A62B 18/025; A62B 23/02; A62B 23/025; A62B 18/006
See application file for complete search history.

(56) References Cited

U.S. PATENT DOCUMENTS

| 4,323,063 | A | 4/1982 | Fisichella |
| 4,848,366 | A | 7/1989 | Aita |
| 6,257,235 | B1 | 7/2001 | Bowen |
| 7,802,572 | B2 | 9/2010 | Hahne |
| 10,758,751 | B2 | 9/2020 | Feasey |
| 10,945,469 | B1 | 3/2021 | Rosenberg et al. |
| 11,123,581 | B1 * | 9/2021 | Salvino .............. A41D 13/1138 |
| 2004/0003810 | A1 * | 1/2004 | Templeton ............. A62B 17/04 128/201.25 |

(Continued)

OTHER PUBLICATIONS

Civility, 2020, "French Startup Launches First High-Tech Transparent Protective Anti-COVID Mask," AccessWire.com, Jun. 17, 2020.

(Continued)

*Primary Examiner* — Valerie L Woodward

(57) ABSTRACT

This invention is a pathogen-filtering face mask with a transparent portion over a wearer's mouth which enables other people to see the wearer's facial expressions and with active filtration of air entering and exiting the mask, with a relatively unobtrusive design. This mask can include a transparent portion which covers at least part of a person's mouth, a first-side air filter and air impellor, a second-side air filter and air impellor, and a central air filter between the first-side air filter and the second-side air filter.

3 Claims, 23 Drawing Sheets

(56) References Cited

U.S. PATENT DOCUMENTS

| | | | |
|---|---|---|---|
| 2006/0201511 A1* | 9/2006 | Freriks | A62B 17/04 |
| | | | 128/206.13 |
| 2006/0230485 A1 | 10/2006 | Lee | |
| 2007/0240716 A1* | 10/2007 | Marx | A62B 18/006 |
| | | | 128/204.21 |
| 2010/0239625 A1 | 9/2010 | Puckett | |
| 2011/0108035 A1 | 5/2011 | Samaniego | |
| 2012/0174922 A1 | 7/2012 | Virr et al. | |
| 2014/0373846 A1 | 12/2014 | Kao et al. | |
| 2018/0236275 A1* | 8/2018 | Song | A62B 18/10 |
| 2018/0296864 A1* | 10/2018 | Feasey | A61F 9/029 |
| 2019/0009114 A1 | 1/2019 | Han | |
| 2019/0069615 A1 | 3/2019 | Lam | |
| 2020/0206542 A1* | 7/2020 | Kim | A62B 7/08 |
| 2020/0353294 A1 | 11/2020 | Feasey | |
| 2020/0376213 A1 | 12/2020 | He | |
| 2020/0397087 A1 | 12/2020 | Crenshaw | |
| 2020/0406069 A1 | 12/2020 | Fu | |
| 2021/0001157 A1 | 1/2021 | Rashaud | |
| 2021/0077762 A1 | 3/2021 | Mauger | |
| 2021/0086005 A1 | 3/2021 | O'Brien | |
| 2021/0219636 A1 | 7/2021 | Stroiazzo-Mougin | |
| 2021/0228920 A1 | 7/2021 | Arigue | |
| 2021/0275842 A1* | 9/2021 | Conrad | A62B 23/025 |

OTHER PUBLICATIONS

Honeywell, 2021, "Will.i.am Debuts Innovative Face Technology Concept," Honeywell.com, Apr. 6, 2021.
Razer, 2021, "Razer Unveils Smart Mask and Gaming Chair Concept Designs at CES 2021," Razer.com, Jan. 21, 2021.
Redcliffe Medical, 2020, "LEAF: Self-Sterilizing, Transparent N99+ Mask," PR Newswire, May 14, 2020.
Scharper, 2018, "Clearly a Better Mask: Alums Allysa Dittmar and Aaron Hsu Are Reinventing the Surgical Mask to Make Quality Health Care Accessible," Johns Hopkins Magazine, Winter, 2018.
Stegman, 2021, "Ford Designs Clear N95 Masks to Help Deaf or Hard of Hearing," Arc Publishing, Feb. 3, 2021.

* cited by examiner

PATHOGEN-FILTERING FACE MASK WITH TRANSPARENT MOUTH-COVERING PORTION AND ACTIVE AIR CIRCULATION

CROSS-REFERENCE TO RELATED APPLICATIONS

This application is a continuation in part of U.S. patent application Ser. No. 17/408,409 filed on 2021 Aug. 21. This application is a continuation in part of U.S. patent application Ser. No. 17/175,675 filed on 2021 Feb. 14. U.S. patent application Ser. No. 17/408,409 was a continuation in part of U.S. patent application Ser. No. 17/175,675 filed on 2021 Feb. 14. U.S. patent application Ser. No. 17/408,409 claimed the priority benefit of U.S. provisional patent application 63/088,664 filed on 2020 Oct. 7. U.S. patent application Ser. No. 17/175,675 claimed the priority benefit of U.S. provisional patent application 63/088,664 filed on 2020 Oct. 7. U.S. patent application Ser. No. 17/175,675 was a continuation in part of U.S. patent application Ser. No. 16/910,625 filed on 2020 Jun. 24. U.S. patent application Ser. No. 17/175,675 claimed the priority benefit of U.S. provisional patent application 63/035,744 filed on 2020 Jun. 6. U.S. patent application Ser. No. 17/175,675 claimed the priority benefit of U.S. provisional patent application 63/023,331 filed on 2020 May 12. U.S. patent application Ser. No. 17/175,675 claimed the priority benefit of U.S. provisional patent application 63/017,718 filed on 2020 Apr. 30. U.S. patent application Ser. No. 16/910,625 claimed the priority benefit of U.S. provisional patent application 63/035,744 filed on 2020 Jun. 6. U.S. patent application Ser. No. 16/910,625 claimed the priority benefit of U.S. provisional patent application 63/023,331 filed on 2020 May 12. U.S. patent application Ser. No. 16/910,625 claimed the priority benefit of U.S. provisional patent application 63/017,718 filed on 2020 Apr. 30. The entire contents of these applications are incorporated herein by reference.

FEDERALLY SPONSORED RESEARCH

Not Applicable

SEQUENCE LISTING OR PROGRAM

Not Applicable

BACKGROUND

Field of Invention

This invention relates to respiratory face masks.

INTRODUCTION

With the increase in airborne infectious disease and environmental air pollution, air-filtering face masks are increasingly important. The most common air-filtration face masks are passive filtration masks which do not have active ventilation mechanisms such as motorized air impellers. They rely on a person's inhalation and exhalation to draw air through air filters. Passive filtration masks have some advantages. They tend to be relatively light-weight, inexpensive, and do not generate noise.

However, passive filtration masks also have disadvantages. They tend to have either relatively poor air filtration (e.g. leaking air around their perimeter) or have increased levels of carbon dioxide, humidity, and heat in air within the mask. Also, they are almost universally opaque because transparent materials tend to be impermeable to airflow and thus aggravate the accumulation of carbon dioxide, humidity, and heat within the mask. Lack of transparency interferes with human communication which relies on viewing mouth expressions. This is especially true for interpersonal communication involving people who are hearing impaired. There is a need for a transparent smart mask which has a transparent portion which allows a person's mouth expressions to be seen and also has a relatively light-weight, quiet active air filtration system which filters both air inflow and air outflow to reduce the transmission of airborne infectious disease.

Review of the Relevant Art

In the patent literature, U.S. Pat. No. 4,323,063 (Fisichella, Apr. 6, 1982, "Medical Face Mask") discloses a medical mask with a transparent central portion. U.S. Pat. No. 4,848,366 (Aita, Jul. 18, 1989, "Exhaust Mask System and Device") discloses a mask system including a front portion defining a surface which is generally C-shaped with curved surfaces in both the horizontal and vertical cross sections. U.S. Pat. No. 6,257,235 (Bowen, Jul. 10, 2001, "Face Mask with Fan Attachment") discloses a face mask with a fan attachment to enhance breathability and comfort. U.S. Patent Application 20060230485 (Lee, Oct. 19, 2006, "See-Through Mask") discloses a see-through mask for preventing infection of disease-causing bacteria and dust. U.S. Patent Application 20100239625 (Puckett, Sep. 23, 2010, "Transparent Antimicrobial Face Mask") discloses a generally transparent mask which is perforated with elongate slits. U.S. Pat. No. 7,802,572 (Hahne, Sep. 28, 2010, "Face Mask") discloses a medical mask with a transparent central portion. U.S. Patent Application 20110108035 (Samaniego, May 12, 2011, "Nex-Gen Respirator/Surgical Mask") discloses a face mask with a transparent shell. U.S. Patent Application 20120174922 (Virr et al., Jul. 12, 2012, "Respirator") discloses a mask with a neck component which surrounds the back of a user's neck. U.S. Patent Application 20140373846 (Kao et al., Dec. 25, 2014, "Breathing Apparatus") discloses a powered air purifying respirator with a filter and impellor behind a user's head. U.S. Patent Application 20190009114 (Han, Jan. 10, 2019, "Harmful-Substance-Blocking Health Mask Using Air Curtain") discloses a mask which creates an air curtain to block entry of external substances.

U.S. Patent Application 20190069615 (Lam, Mar. 7, 2019, "Face Mask Having Transparent Plastic Piece") discloses a face mask with a transparent plastic piece, a first conformable member affixed to a first portion of the back side of the piece, and a second conformable member affixed to a second portion of the back side of the piece. U.S. Patent Application 20200353294 (Feasey, Nov. 12, 2020, "Respirator") and U.S. patent Ser. No. 10/758,751 (Feasey, Sep. 1, 2020, "Respirator") disclose a mask or shield with opposing jets that create a stream of laminar flow filtered air. U.S. Patent Application 20200376213 (He, Dec. 3, 2020, "Miniature Air Filtration Assembly for a Medical Field") discloses a miniature vacuum unit including a suction tube.

U.S. Patent Application 20200397087 (Crenshaw, Dec. 24, 2020, "Electronic Airflow Mask") discloses a mask with a sensor and a multi-speed fan. U.S. Patent Application 20200406069 (Fu, Dec. 31, 2020, "Versatile and Multi-Purpose Breathing Mask") discloses a modular respirator comprising an elongate filter unit having a filter inlet, a filter outlet, and a replaceable fluid filter for filtering pollutants within the fluid. U.S. Patent Application 20210001157 (Rashaud, Jan. 7, 2021, "Personal Protective Face Shield for Preventing Biohazardous, Infectious or Pathological Aerosol Exposure (COVID-19)") discloses a face shield/window with an electrostatic double layer. U.S. patent Ser. No. 10/945,469 (Rosenberg et al., Mar. 16, 2021, "Respirator") discloses a respirator mask with a transparent front panel and a filter that extends around at least a portion of the perimeter of the mask.

U.S. Patent Application 20210077762 (Mauger, Mar. 18, 2021, "Respirator Devices with Source Control Mechanisms and Associated Systems and Methods") discloses a mask which filters air outflow to reduce the spread of contagious disease. U.S. Patent Application 20210086005 (O'Brien, Mar. 25, 2021, "Facemask Having Integrated Modules") discloses a facemask with integrated modules having sensors and other mechanisms. U.S. Patent Application 20210219636 (Stroiazzo-Mougin, Jul. 22, 2021, "Ultraviolet Face Mask") discloses a transparent cover for covering the nose and mouth of a wearer and one or more UV-C LEDs to irradiate filter media. U.S. Patent Application 20210228920 (Arigue, Jul. 29, 2021, "Filtering Mask Assembly") discloses a filtering mask assembly with a housing comprising a fan and an outlet valve.

In non-patent literature, Scharper, 2018, "Clearly A Better Mask: Alums Allysa Dittmar and Aaron Hsu Are Reinventing the Surgical Mask to Make Quality Health Care Accessible," Johns Hopkins Magazine, Winter, 2018, discloses a passive filtration mask with a transparent portion over a person's mouth, between upper and lower face-conforming foam portions.

Redcliffe Medical, 2020, "LEAF: Self-Sterilizing, Transparent N99+ Mask," PR Newswire, May 14, 2020, shows the concept of a transparent mask with an active filtration mechanism below a person's chin. Civility, 2020, "French Startup Launches First High-Tech Transparent Protective Anti-COVID Mask," AccessWire.com, Jun. 17, 2020, shows the concept of a generally-transparent face mask with circular (passive) air filters.

Razer, 2021, "Razer Unveils Smart Mask and Gaming Chair Concept Designs at CES 2021," Razer.com, Jan. 21, 2021, shows the concept of a mask with a transparent portion, active ventilation, lights, a microphone, and an ultraviolet-light charging case. Stegman, 2021, "Ford Designs Clear N95 Masks to Help Deaf or Hard of Hearing," Arc Publishing, Feb. 3, 2021, shows a prototype passive filtration mask with a transparent portion over a person's mouth. Honeywell, 2021, "Will.i.am Debuts Innovative Face Technology Concept," Honeywell.com, Apr. 6, 2021, shows the "Xupermask"—a non-transparent active filtration mask with multi-speed fans and advanced audio functions.

SUMMARY OF THE INVENTION

There are face masks (and respirators) in the prior art which provide active filtration of air entering and exiting a mask and provide good circulation of air through the mask, without air leakage around the mask perimeter. There are also face masks (and respirators) in the prior art with transparent portions over a wearer's mouth which enable other people to see the wearer's mouth and facial expressions. There are also face masks (and respirators) in the prior art which do not clutter a person's face and head with Borg-like hardware. However, there are trade-offs between these three goals (e.g. air quality, visible mouth, and unobtrusive design) in the prior art. Masks in the prior art do not achieve all three of these goals simultaneously. Innovative mask designs disclosed herein achieve all three of these goals simultaneously.

In an example, a pathogen-filtering semi-transparent face mask can comprise: a transparent portion of a face mask which covers at least part of a person's mouth; a first-side air filter on a first side of the mask on the person's jaw; a first-side air impellor on the first side of the mask on the person's jaw which draws air into the mask from the environment through the first-side air filter; a second-side air filter on a second side of the mask on the person's jaw; a second-side air impellor on the second side of the mask on the person's jaw which draws air into the mask from the environment through the second-side air filter; a central air filter between the first-side air filter and the second-side air filter; and one or more air tubes or channels between the first-side and second-side air filters and an interior space of the transparent portion.

In an example, a pathogen-filtering semi-transparent face mask can comprise: a transparent portion of a face mask which covers at least part of a person's mouth; non-transparent portions of the face mask which hold the transparent portion on the person's head; a first-side air filter on a first side of the transparent portion; a first-side air impellor which moves air through the first-side air filter; a second-side air filter on a second side of the transparent portion; a second-side air impellor which moves air through the second-side air filter; and a concave air filter with a concavity which opens upwards toward the person's mouth.

In an example, a pathogen-filtering semi-transparent face mask can comprise: a transparent portion of a face mask which covers at least part of a person's mouth; a first-side air filter on a first side of the person's head, wherein the first-side air filter is behind the person's first-side ear; a first-side air impellor which moves air through the first-side air filter; a first-side air tube or channel which directs airflow between the first-side air filter and the transparent portion; a second-side air filter on a second side of the person's head, wherein the second-side air filter is behind the person's second-side ear; a second-side air impellor which moves air through the second-side air filter; a second-side air tube or channel which directs airflow between the second-side air filter and the transparent portion; and a lower air filter which spans at least 25% of the lower perimeter of the mask.

INTRODUCTION TO THE FIGURES

DETAILED DESCRIPTION OF THE FIGURES

In an example, a pathogen-filtering semi-transparent face mask can comprise: a transparent portion of a face mask which covers at least part of a person's mouth; a first-side air filter on a first side of the mask on the person's jaw; a first-side air impellor on the first side of the mask on the person's jaw which draws air into the mask from the environment through the first-side air filter; a second-side air filter on a second side of the mask on the person's jaw; a second-side air impellor on the second side of the mask on the person's jaw which draws air into the mask from the environment through the second-side air filter; a central air filter between the first-side air filter and the second-side air filter; and one or more air tubes or channels between the first-side and second-side air filters and an interior space of the transparent portion.

In an example, a pathogen-filtering semi-transparent face mask can comprise: a transparent portion of a face mask which covers at least part of a person's mouth; non-transparent portions of the face mask which hold the transparent portion on the person's head; a first-side air filter on a first side of the transparent portion; a first-side air impellor which moves air through the first-side air filter; a second-side air filter on a second side of the transparent portion; a second-side air impellor which moves air through the second-side air filter; and a concave air filter with a concavity which opens upwards toward the person's mouth.

In an example, a pathogen-filtering semi-transparent face mask can comprise: a transparent portion of a face mask which covers at least part of a person's mouth; a first-side air filter on a first side of the person's head, wherein the first-side air filter is behind the person's first-side ear; a first-side air impellor which moves air through the first-side air filter; a first-side air tube or channel which directs airflow between the first-side air filter and the transparent portion; a second-side air filter on a second side of the person's head, wherein the second-side air filter is behind the person's second-side ear; a second-side air impellor which moves air through the second-side air filter; a second-side air tube or channel which directs airflow between the second-side air filter and the transparent portion; and a lower air filter which spans at least 25% of the lower perimeter of the mask.

Figure 1:
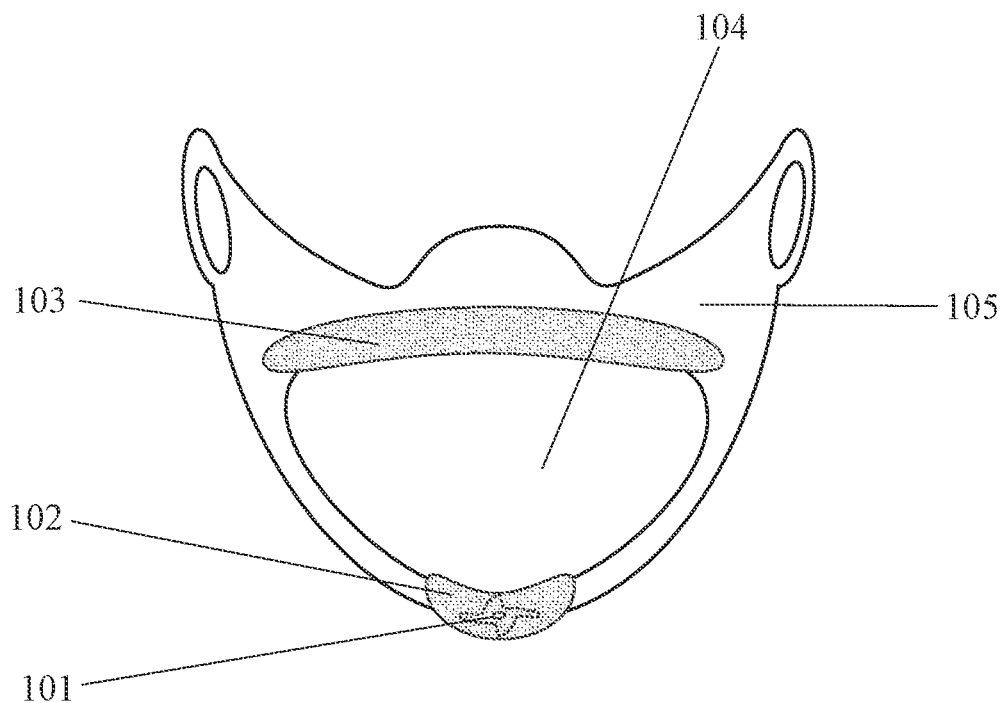
FIG. 1 shows a face mask with a transparent portion, a non-transparent portion, a longitudinal air filter above a mouth, and an air filter and impellor below the mouth.

FIG. 1 shows an example of a pathogen-filtering semi-transparent face mask comprising: a transparent portion 104 of a face mask which covers at least part of a person's mouth; a non-transparent portion 105 of the face mask which holds the transparent portion on the person's head; an upper air filter 103 above the person's mouth; a lower air filter 102 below the person's mouth; and an air impellor 101 which draws air from the environment in through lower air filter.

In an example, a transparent portion of a face mask can cover (and/or span) a person's entire mouth. In an example, a transparent portion can cover a person's mouth and also portions of the person's cheeks. In an example, a transparent portion can cover a person's mouth, portions of the person's cheeks, and also a lower portion of the person's nose. In an example, the maximum distance from a transparent portion of a face mask to a person's mouth can be within the range of ½" to 3". In an example, the maximum distance from a transparent portion of a face mask to a person's mouth can be within the range of 1" to 4".

In an example, a transparent portion of a face mask can have a concave shape, wherein the concave interior of the transparent portion faces towards the person's mouth. In an example, a transparent portion of a face mask can have an arcuate concave shape. In an example, a transparent portion can have a shape which is a section of a sphere. In an example, a transparent portion can have a hemispherical shape. In an example, a transparent portion can have a shape which is a section of an oblate spheroid. In an example, a transparent portion can have a shape which is a section of an ellipsoid. In an example, a transparent portion can have a frustal shape. In an example, a transparent portion can have a shape which is a section of a round cylinder. In an example, a transparent portion can have a shape which is a section of a polygonal (e.g. quadrilateral, hexagonal, or octagonal) cylinder. In an example, a transparent portion can be shaped like the upper surface of a bicycle seat. In an example, a transparent portion can be shaped like the upper surface of a saddle.

In an example, a transparent portion of a face mask can be impermeable to air. In an example, a transparent portion of a face mask can be less permeable to air than a non-transparent portion of a face mask. In an example, a transparent portion can be less flexible than a non-transparent portion. In an example, a transparent portion can be rigid. In an example, a transparent portion can be made with a transparent polymer. In an example, a transparent portion can be coated with an anti-fogging coating. In an example, a transparent portion of a face mask can be heated to reduce fogging. In an example, airflow from an air impellor can be directed across the mouth-facing surface of a transparent portion of a face mask to reduce fogging.

In an example, a non-transparent portion of a face mask can hold a transparent portion of a face mask on a person's head by being attached to (e.g. looping around) the person's ears. In an example, a non-transparent portion can hold the transparent portion on a person's head by being attached to (e.g. looping around) the rear of the person's head. In an example, a non-transparent portion can comprise straps, bands, cords, or strings. In an example, a non-transparent portion can comprise four straps, bands, cords, or strings. In an example, a non-transparent portion can comprise two straps, bands, cords, or strings. In an example, a non-transparent portion can comprise elastic and/or stretchable straps, bands, cords, or strings. In an example, a non-transparent portion can comprise fabric straps. In an example, a non-transparent portion can be made from a flexible fabric and/or textile. In an example, a non-transparent portion can be permeable to air. In an example, a non-transparent portion can be impermeable to air. In an example, a non-transparent portion can be less permeable to air than an air filter.

In an example, a transparent portion and a non-transparent portion of a face mask can be attached to each other by sewing or weaving. In an example, a transparent portion and a non-transparent portion can be attached to each other by adhesion and/or gluing. In an example, a transparent portion and a non-transparent portion can be attached to each other by melting and/or welding. In an example, a transparent portion and a non-transparent portion can be attached to each other by snaps, clips, clamps, hooks, pins, prongs, or buttons.

In an example, an upper air filter on a face mask can have a longitudinal shape. In an example, an upper air filter can have an arcuate longitudinal shape. In an example, an upper air filter can be located along the upper perimeter of a transparent portion of a face mask. In an example, an upper air filter can be located between an upper perimeter of a transparent portion of a face mask and a non-transparent portion of the face mask. In an example, an upper air filter can be located on the upper half of the transparent portion of a face mask. In an example, the closest distance between an upper air filter and a person's nose nostrils can be between ¼" and 2". In an example, an upper air filter can be substantially parallel with the surface of a non-transparent portion of a face mask. In an example, an upper air filter can be substantially orthogonal to the surface of a non-transparent portion of a face mask. In an example, an upper air filter can be located below a person's nose. In an example, an upper air filter can be located over a person's nose.

In an example, an upper air filter can be removably attached to a face mask via a clip, snap, clasp, hook, clamp, adhesive substance, or pin. In an example, an upper air filter can be disposable. In an example, an upper air filter can be detached from a face mask, cleaned, and then reattached to the face mask. In an example, a mask can further comprise a sensor which tracks the cumulative airflow through an upper filter and indicates when the upper air filter should be changed and/or cleaned. In an example, a mask can further comprise a sensor which tracks the level of airflow resistance through an upper filter and indicates when the upper air filter should be changed and/or cleaned. In an example, there can be two air filters, wherein the mask directs airflow through a first filter until a sensor detects that the first filter is dirty, at which time the mask automatically redirects airflow through a second filter. In an example, an upper air filter can further comprise two air filters, wherein the mask directs air through a second filter when the first filter becomes dirty and/or clogged.

In an example, when an air impellor is active (e.g. rotating and drawing air in through the lower filter) then airflow through an upper air filter can be: primarily or entirely from the interior of a face mask (e.g. the interior of the concavity of a transparent portion of the mask) out to the environment. In an example, when an air impellor is not active (e.g. not rotating and drawing air in through the lower filter), then airflow through the upper air filter can be: from the environment in to the interior of the face mask (e.g. the interior of the concavity of a transparent portion of the mask) when the person is inhaling; and from the interior of the face mask to the environment when the person is exhaling. This can enable passive two-way air filtering when the air impellor is not active in order to save energy. Alternatively, an upper air filter can further comprise a one-way valve which does not allow air to flow from the environment to the interior of the face mask.

In an example, a lower air filter on a face mask can have a circular shape. In an example, a lower air filter can have an arcuate shape. In an example, a lower air filter can be located along the lower perimeter of the transparent portion of a face mask. In an example, a lower air filter can be located between a lower perimeter of a transparent portion of a face mask and a non-transparent portion of the face mask. In an example, a lower air filter can be located in the lower half of the transparent portion of a face mask. In an example, a lower air filter can be located on a person's jaw and/or chin. In an example, a lower air filter can be located below a person's jaw and/or chin.

In an example, a lower air filter can be between an air impellor and the environment. In an example, a lower air filter can be between an air impellor and the interior of the mask. In an example, a lower filter can comprise two filter layers, one layer between an air impellor and the environment and one layer between the air impellor and the interior of the mask (e.g. the space inside a concave transparent portion of the mask). In an example, a face mask can further comprise one or more air tubes, channels, and/or pathways through which air flows from a lower air filter to an interior concavity of a transparent portion of the mask. In an example, a face mask can further comprise one or more flexible air tubes, channels, and/or pathways through which air flows from a lower air filter to the interior concavity of a transparent portion of the mask.

In an example, a lower air filter can be removably attached to a face mask via a clip, snap, clasp, hook, clamp, adhesive substance, or pin. In an example, a lower air filter can be disposable. In an example, a lower air filter can be detached from a face mask, cleaned, and then reattached to the face mask. In an example, a mask can further comprise a sensor which tracks the cumulative airflow through a lower air filter and indicates when the lower air filter should be changed and/or cleaned. In an example, a mask can further comprise a sensor which tracks the level of airflow resistance through a lower air filter and indicates when the lower air filter should be changed and/or cleaned. In an example, there can be two air filters, wherein the mask directs airflow through a first filter until a sensor detects that the first filter is dirty, at which time the mask automatically redirects airflow through a second filter. In an example, a lower air filter can further comprise two air filters, wherein the mask directs air through a second filter when the first filter becomes dirty and/or clogged.

In an example, when an air impellor is active (e.g. rotating and drawing air in through the lower filter) then airflow through a lower air filter can be: primarily or entirely from the environment to the interior of a face mask (e.g. the interior of the concavity of a transparent portion of the mask). In an example, when an air impellor is not active (e.g. not rotating and drawing air in through the lower filter), then airflow through the lower air filter can be: from the environment to the interior of the face mask (e.g. the interior of the concavity of a transparent portion of the mask) when the person is inhaling; and from the interior of the face mask to the environment when the person is exhaling. Alternatively, a lower air filter can further comprise a one-way valve which does not allow air to flow from the interior of the face mask to the environment.

In an example, an air impellor can be selected from the group consisting of: a fan, a turbine, a propeller, a helix, and a pump. In an example, an air impellor can rotate. In an example, an air impellor can be rotated by an electromagnetic motor. In an example, an air impellor can move air from the environment through a lower air filter into the interior of a face mask. In an example, a face mask can further comprise one or more air tubes, channels, and/or pathways through which air flows from an air impellor to an interior concavity of a transparent portion of the mask. In an example, a face mask can further comprise one or more flexible air tubes, channels, and/or pathways through which air flows from an air impellor to the interior concavity of a transparent portion of the mask.

In an example, the rotational speed of an air impellor can be varied. In an example, an air impellor can have different speed settings. In an example, a user can manually change the rotational speed of an air impellor. In an example, a face mask can automatically change the rotational speed of an air impellor in response to data from biometric and/or environmental sensors. In an example, a user can manually change the rotational direction of an air impellor (and thus the direction of active airflow). In an example, a face mask can automatically change the rotational direction of an air impellor (and thus the direction of active airflow).

In an example, a face mask can further comprise one or more sensors. In an example, the airflow of a face mask is automatically adjusted based on analysis of data from one or more sensors on the mask. In an example, the airflow of a face mask is automatically adjusted based on analysis of data from one or more biometric and/or physiological sensors on the mask. In an example, the airflow of a face mask is automatically adjusted based on analysis of data from one or more environmental sensors on the mask. In an example, a face mask can further comprise one or more sensors and the rotational speed of an air impellor is automatically changed in response to data from the one or more sensors.

In an example, a face mask can further comprise one or more sensors which evaluate attributes of air inside the mask (e.g. oxygen level, carbon dioxide level, temperature, and/or humidity level) and the rotational speed of an air impellor is automatically changed in response to data from the one or more sensors. In an example, a face mask can further comprise one or more sensors which evaluate attributes of air inside the mask (e.g. oxygen level, carbon dioxide level, temperature, and/or humidity level) and the rotational speed of an air impellor is automatically increased in response to data from the one or more sensors (e.g. in response to low oxygen level, high carbon dioxide level, high or low temperature, and/or high humidity level). In an example, a face mask can further comprise one or more biometric and/or physiological sensors (e.g. pulse oximeter, EMG sensor, and/or motion sensor) and the rotational speed of an air impellor is automatically changed in response to data from the one or more sensors.

In an example, a face mask can have: an active filtration mode (wherein movement of air through one or more air filters on the mask is caused primarily or entirely by one or more air impellors); and a passive filtration mode (wherein the air impellors are not activated and movement of air through one or more air filters on the mask is caused entirely or primarily by a person's inhalation and exhalation). In an example, a face mask can automatically switch to active filtration mode when data from biometric and/or environmental sensors indicates that a high level of air filtration and/or airflow is needed and can automatically switch to passive filtration mode when data from those sensors indicates that a high level of air filtration and/or airflow is not needed. In an example, active filtration can be initiated when the oxygen level inside the mask is low or when a wearer enters a high-risk environmental situation. In this manner, a face mask can conserve energy (and prolong battery life) by only initiating active filtration only when it is needed.

In an example, a face mask can further comprise one or more components selected from the group consisting of: data processor, power source (e.g. battery), data transmitter/receiver, biometric and/or physiological sensor, environmental sensor, microphone, speaker, interior mask light, exterior mask light, ultraviolet light emitter in optical communication with airflow within the mask, touch screen, push buttons or switches, a strap or band which loops around the back of a person's head, and a strap or band which loops over the top of a person's head. In an example, a face mask can further comprise a microphone which is in acoustic communication with the interior of the mask (e.g. with the interior of the transparent portion) and a speaker which reproduces sound recorded by the microphone. In an example, a face mask can further comprise a microphone on the inside of the mask which records a person's voice and a speaker on the outside of the mask which reproduces the person's voice. In an example, a face mask can further comprise one or more lights on the inside of the mask which highlight a person's mouth in order to increase visibility of the person's mouth (e.g. lip motion and facial expression) by nearby people. Other design variations discussed elsewhere in this disclosure or in priority-linked disclosures can also be applied to this example where relevant.

Figure 2:
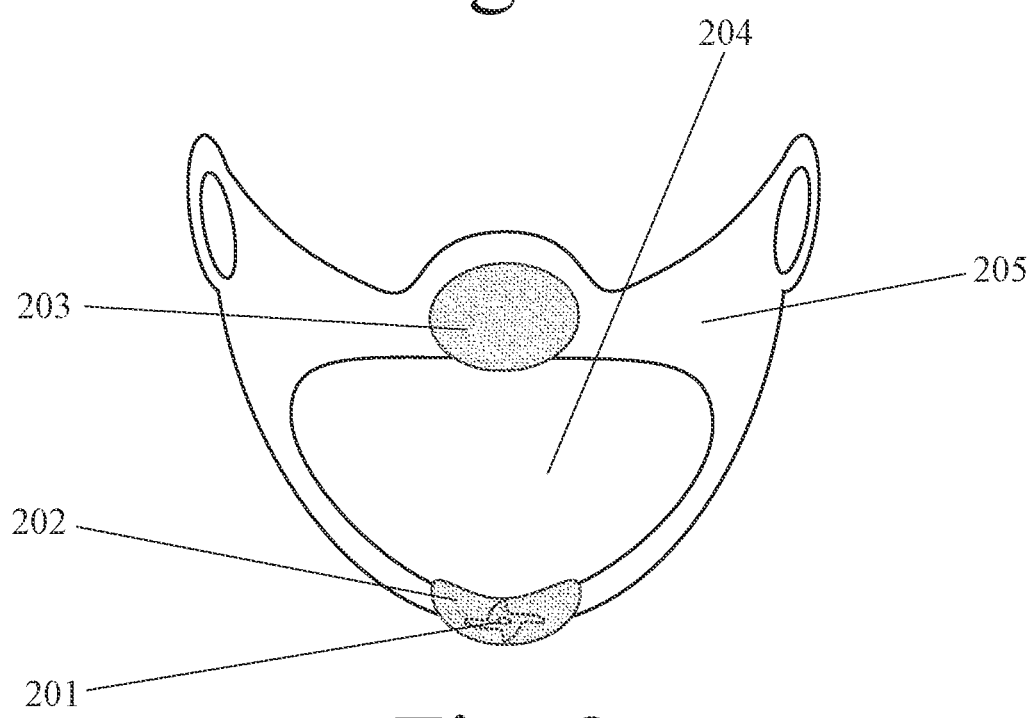
FIG. 2 shows a face mask with a transparent portion, a non-transparent portion, a convex air filter above a mouth, and an air filter and impellor below the mouth.

FIG. 2 shows an example of a face mask which is similar to the one shown in FIG. 1 except that the upper air filter is more circular (e.g. elliptical or oval) in shape. FIG. 2 shows an example of a pathogen-filtering semi-transparent face mask comprising: a transparent portion 204 of a face mask which covers at least part of a person's mouth; a non-transparent portion 205 of the face mask which holds the transparent portion on the person's head; an upper air filter 203 above the person's mouth; a lower air filter 202 below the person's mouth; and an air impellor 201 which draws air from the environment in through lower air filter. Other design variations discussed elsewhere in this disclosure or in priority-linked disclosures can also be applied to this example where relevant.

Figure 3:
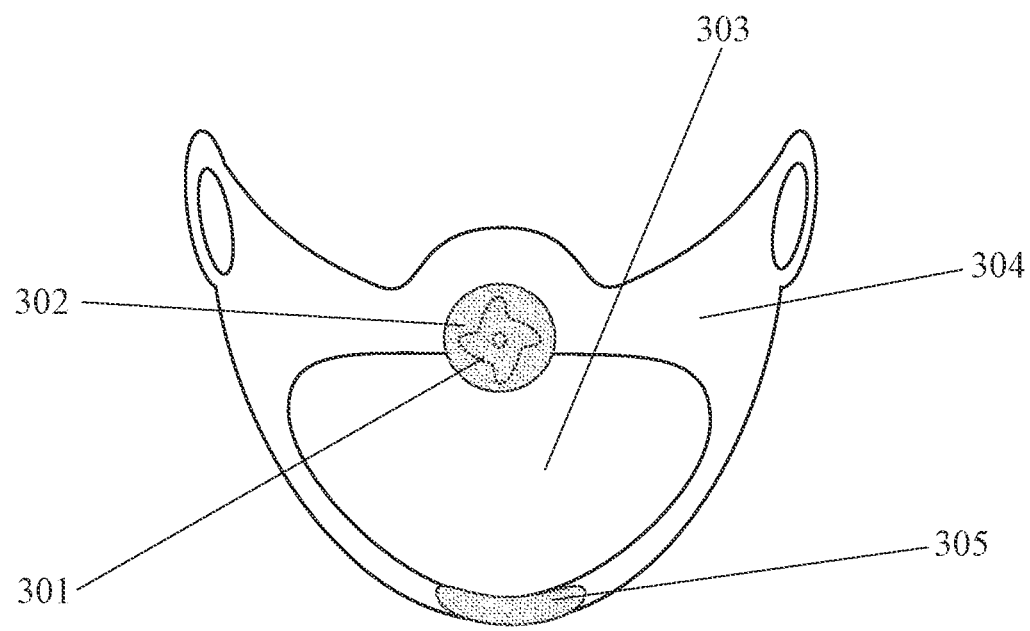
FIG. 3 shows a face mask with a transparent portion, a non-transparent portion, an air filter and impellor above a mouth, and an air filter below the mouth.

FIG. 3 shows an example of a face mask which is similar to the one shown in FIG. 2 except that an air impellor draws air in through the upper air filter instead of the lower air filter. FIG. 3 shows an example of a pathogen-filtering semi-transparent face mask comprising: a transparent portion 303 of a face mask which covers at least part of a person's mouth; a non-transparent portion 304 of the face mask which holds the transparent portion on the person's head; an upper air filter 302 above the person's mouth; an air impellor 301 which draws air from the environment in through lower air filter; and a lower air filter 305 below the person's mouth.

In an example, an upper air filter on a face mask can have a circular, elliptical, or oval shape. In an example, an upper air filter can be located on the upper perimeter of the transparent portion of a face mask. In an example, an upper air filter can be located between an upper perimeter of a transparent portion of a face mask and a non-transparent portion of the face mask. In an example, an upper air filter can be located in the upper half of the transparent portion of a face mask. In an example, the closest distance between an upper air filter and a person's nose nostrils can be between ¼" and 2". In an example, an upper air filter can be substantially parallel with the surface of a non-transparent portion of a face mask. In an example, an upper air filter can be substantially orthogonal to the surface of a non-transparent portion of a face mask. In an example, an upper air filter can be located below a person's nose. In an example, an upper air filter can be located over a person's nose.

In an example, an upper air filter can be removably attached to a face mask via a clip, snap, clasp, hook, clamp, adhesive substance, or pin. In an example, an upper air filter can be disposable. In an example, an upper air filter can be detached from a face mask, cleaned, and then reattached to the face mask. In an example, a mask can further comprise a sensor which tracks the cumulative airflow through an upper filter and indicates when the upper air filter should be changed and/or cleaned. In an example, a mask can further comprise a sensor which tracks the level of airflow resistance through an upper filter and indicates when the upper air filter should be changed and/or cleaned. In an example, there can be two air filters, wherein the mask directs airflow through a first filter until a sensor detects that the first filter is dirty, at which time the mask automatically redirects airflow through a second filter. In an example, an upper air filter can further comprise two air filters, wherein the mask directs air through a second filter when the first filter becomes dirty and/or clogged.

In an example, an upper air filter can be between an air impellor and the environment. In an example, an upper air filter can be between an air impellor and the interior of the mask. In an example, an upper filter can comprise two filter layers, one layer between an air impellor and the environment and one layer between the air impellor and the interior of the mask (e.g. the space inside a concave transparent portion of the mask).

In an example, when an air impellor is active (e.g. rotating and drawing air through the upper air filter) then airflow through an upper air filter can be: primarily or entirely from the environment to the interior of a face mask (e.g. the interior of the concavity of a transparent portion of the mask). In an example, when an air impellor is not active (e.g. not rotating and drawing air through the upper air filter), then airflow through the upper air filter can be: from the environment to the interior of the face mask (e.g. the interior of the concavity of a transparent portion of the mask) when the person is inhaling; and from the interior of the face mask to the environment when the person is exhaling. Alternatively, an upper air filter can further comprise a one-way valve which does not allow air to flow from the interior of the face mask to the environment.

In an example, an air impellor can be selected from the group consisting of: a fan, a turbine, a propeller, a helix, and a pump. In an example, an air impellor can rotate. In an example, an air impellor can be rotated by an electromagnetic motor. In an example, an air impellor can move air from the environment through an upper air filter into the interior of a face mask. In an example, a face mask can further comprise one or more air tubes, channels, and/or pathways through which air flows from an air impellor to an interior concavity of a transparent portion of the mask. In an example, a face mask can further comprise one or more flexible air tubes, channels, and/or pathways through which air flows from an air impellor to the interior concavity of a transparent portion of the mask.

In an example, the rotational speed of an air impellor can be varied. In an example, an air impellor can have different speed settings. In an example, a user can manually change the rotational speed of an air impellor. In an example, a face mask can automatically change the rotational speed of an air impellor in response to data from biometric and/or environmental sensors. In an example, a user can manually change the rotational direction of an air impellor (and thus the direction of active airflow). In an example, a face mask can automatically change the rotational direction of an air impellor (and thus the direction of active airflow).

In an example, a face mask can further comprise one or more sensors. In an example, the airflow of a face mask is automatically adjusted based on analysis of data from one or more sensors on the mask. In an example, the airflow of a face mask is automatically adjusted based on analysis of data from one or more biometric and/or physiological sensors on the mask. In an example, the airflow of a face mask is automatically adjusted based on analysis of data from one or more environmental sensors on the mask. In an example, a face mask can further comprise one or more sensors and the rotational speed of an air impellor is automatically changed in response to data from the one or more sensors.

In an example, a face mask can further comprise one or more sensors which evaluate attributes of air inside the mask (e.g. oxygen level, carbon dioxide level, temperature, and/or humidity level) and the rotational speed of an air impellor is automatically changed in response to data from the one or more sensors. In an example, a face mask can further comprise one or more sensors which evaluate attributes of air inside the mask (e.g. oxygen level, carbon dioxide level, temperature, and/or humidity level) and the rotational speed of an air impellor is automatically increased in response to data from the one or more sensors (e.g. in response to low oxygen level, high carbon dioxide level, high or low temperature, and/or high humidity level). In an example, a face mask can further comprise one or more biometric and/or physiological sensors (e.g. pulse oximeter, EMG sensor, and/or motion sensor) and the rotational speed of an air impellor is automatically changed in response to data from the one or more sensors.

In an example, a face mask can have: an active filtration mode (wherein movement of air through one or more air filters on the mask is caused primarily or entirely by one or more air impellors); and a passive filtration mode (wherein the air impellors are not activated and movement of air through one or more air filters on the mask is caused entirely or primarily by a person's inhalation and exhalation). In an example, a face mask can automatically switch to active filtration mode when data from biometric and/or environmental sensors indicates that a high level of air filtration and/or airflow is needed and can automatically switch to passive filtration mode when data from those sensors indicates that a high level of air filtration and/or airflow is not needed. In an example, active filtration can be initiated when the oxygen level inside the mask is low or when a wearer enters a high-risk environmental situation. In this manner, a face mask can conserve energy (and prolong battery life) by only initiating active filtration only when it is needed.

In an example, a lower air filter on a face mask can have a longitudinal shape. In an example, a lower air filter can have a circular, elliptical, or oval. In an example, a lower air filter can be located along the lower perimeter of the transparent portion of a face mask. In an example, a lower air filter can be located between a lower perimeter of a transparent portion of a face mask and a non-transparent portion of the face mask. In an example, a lower air filter can be located in the lower half of the transparent portion of a face mask. In an example, a lower air filter can be located on a person's jaw and/or chin. In an example, a lower air filter can be located below a person's jaw and/or chin. In an example, a face mask can further comprise one or more air tubes, channels, and/or pathways through which air flows from a lower air filter to the interior concavity of a transparent portion of the mask. In an example, a face mask can further comprise one or more flexible air tubes, channels, and/or pathways through which air flows from a lower air filter to the interior concavity of a transparent portion of the mask.

In an example, a lower air filter can be removably attached to a face mask via a clip, snap, clasp, hook, clamp, adhesive substance, or pin. In an example, a lower air filter can be disposable. In an example, a lower air filter can be detached from a face mask, cleaned, and then reattached to the face mask. In an example, a mask can further comprise a sensor which tracks the cumulative airflow through a lower air filter and indicates when the lower air filter should be changed and/or cleaned. In an example, a mask can further comprise a sensor which tracks the level of airflow resistance through a lower air filter and indicates when the lower air filter should be changed and/or cleaned. In an example, there can be two air filters, wherein the mask directs airflow through a first filter until a sensor detects that the first filter is dirty, at which time the mask automatically redirects airflow through a second filter. In an example, a lower air filter can further comprise two air filters, wherein the mask directs air through a second filter when the first filter becomes dirty and/or clogged.

In an example, when an air impellor is active (e.g. rotating and drawing air in through the upper air filter) then airflow through a lower air filter can be: primarily or entirely from the interior of a face mask (e.g. the interior of the concavity of a transparent portion of the mask) out to the environment. In an example, when an air impellor is not active (e.g. not rotating and drawing air in through the upper air filter), then airflow through the lower air filter can be: from the environment in to the interior of the face mask (e.g. the interior of the concavity of a transparent portion of the mask) when the person is inhaling; and from the interior of the face mask to the environment when the person is exhaling. This can enable passive two-way air filtering when the air impellor is not active in order to save energy. Alternatively, a lower air filter can further comprise a one-way valve which does not allow air to flow from the environment in to the interior of the face mask.

In an example, a face mask can further comprise one or more components selected from the group consisting of: data processor, power source (e.g. battery), data transmitter/receiver, biometric and/or physiological sensor, environmental sensor, microphone, speaker, interior mask light, exterior mask light, ultraviolet light emitter in optical communication with airflow within the mask, touch screen, push buttons or switches, a strap or band which loops around the back of a person's head, and a strap or band which loops over the top of a person's head. In an example, a face mask can further comprise a microphone which is in acoustic communication with the interior of the mask (e.g. with the interior of the transparent portion) and a speaker which reproduces sound recorded by the microphone. In an example, a face mask can further comprise a microphone on the inside of the mask which records a person's voice and a speaker on the outside of the mask which reproduces the person's voice. In an example, a face mask can further comprise one or more lights on the inside of the mask which highlight a person's mouth in order to increase visibility of the person's mouth (e.g. lip motion and facial expression) by nearby people. Other design variations discussed elsewhere in this disclosure or in priority-linked disclosures can also be applied to this example where relevant.

Figure 4:
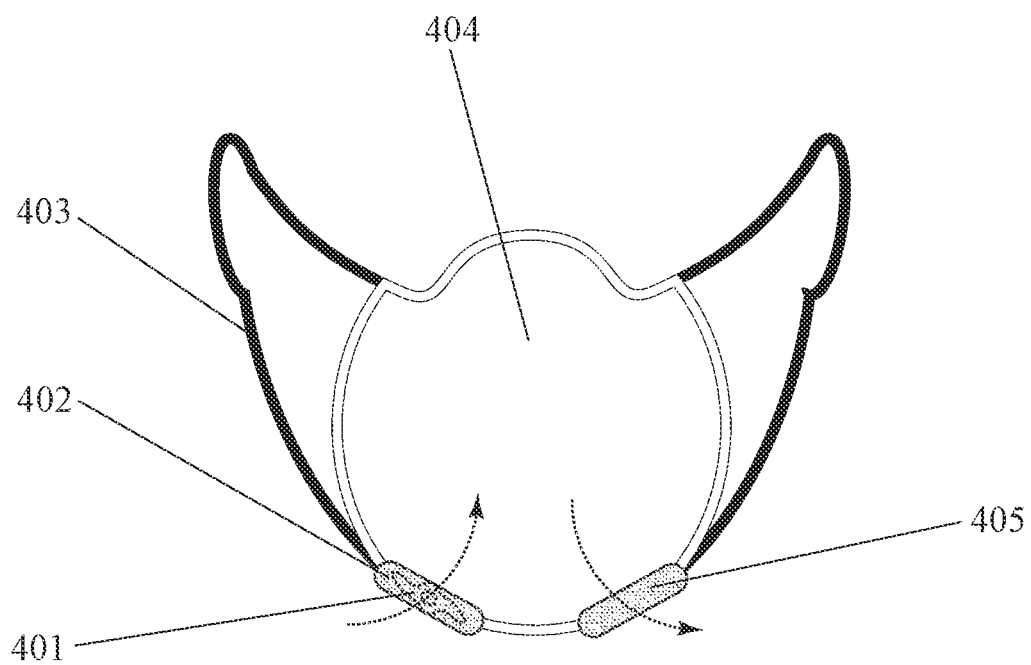
FIG. 4 shows a face mask with a transparent portion, straps, a first-side air filter and impellor on a person's jaw, and a second-side air filter on the person's jaw.

FIG. 4 shows an example of a pathogen-filtering semi-transparent face mask comprising: a transparent portion 404 of a face mask which covers at least part of a person's mouth; straps (including strap 403) which hold the transparent portion on the person's head; a first-side air filter 402 on a first side (e.g. the right side) of the mask below the person's mouth; a second-side air filter 405 on a second side (e.g. the left side) of the mask below the person's mouth; and an air impellor 401 which draws air from the environment in through first-side air filter.

In an example, a first-side air filter on a face mask can have a circular, elliptical, or oval shape. In an example, a first-side air filter can be located on a first-side (e.g. right side) perimeter of the transparent portion of a face mask. In an example, a first-side air filter can be located between a first-side (e.g. right side) perimeter of a transparent portion of a face mask and a non-transparent portion of the face mask. In an example, a first-side air filter can be located on the first-side half (e.g. on the right half) of a transparent portion of a face mask. In an example, a first-side air filter can be located on a person's jaw, chin, and/or neck. In an example, being "below a person's mouth" can be defined as being located at a height which is lower than the height of the lowest point of a person's mouth when the person is standing up with their head erect.

In an example, a first-side air filter can be removably attached to a face mask via a clip, snap, clasp, hook, clamp, adhesive substance, or pin. In an example, a first-side air filter can be disposable. In an example, a first-side air filter can be detached from a face mask, cleaned, and then reattached to the face mask. In an example, a mask can further comprise a sensor which tracks the cumulative airflow through a first-side filter and indicates when the first-side air filter should be changed and/or cleaned. In an example, a mask can further comprise a sensor which tracks the level of airflow resistance through a first-side filter and indicates when the first-side air filter should be changed and/or cleaned. In an example, there can be two air filters, wherein the mask directs airflow through a first filter until a sensor detects that the first filter is dirty, at which time the mask automatically redirects airflow through a second filter. In an example, a first-side air filter can further comprise two air filters, wherein the mask directs air through a second filter when the first filter becomes dirty and/or clogged.

In an example, a first-side air filter can be between an air impellor and the environment. In an example, a first-side air filter can be between an air impellor and the interior of the mask. In an example, a first-side filter can comprise two filter layers, one layer between an air impellor and the environment and one layer between the air impellor and the interior of the mask (e.g. the space inside a concave transparent portion of the mask).

In an example, when an air impellor is active (e.g. rotating and drawing air in through the first-side air filter) then airflow through a first-side air filter can be: primarily or entirely from the environment to the interior of a face mask (e.g. the interior of the concavity of a transparent portion of the mask). In an example, when an air impellor is not active (e.g. not rotating and drawing air in through the first-side air filter), then airflow through the first-side air filter can be: from the environment to the interior of the face mask (e.g. the interior of the concavity of a transparent portion of the mask) when the person is inhaling; and from the interior of the face mask to the environment when the person is exhaling. Alternatively, a first-side air filter can further comprise a one-way valve which does not allow air to flow from the interior of the face mask to the environment.

In an example, an air impellor can be selected from the group consisting of: a fan, a turbine, a propeller, a helix, and a pump. In an example, an air impellor can rotate. In an example, an air impellor can be rotated by an electromagnetic motor. In an example, an air impellor can move air from the environment through a first-side air filter into the interior of a face mask. In an example, a face mask can further comprise one or more air tubes, channels, and/or pathways through which air flows from an air impellor to the interior concavity of a transparent portion of the mask. In an example, a face mask can further comprise one or more flexible air tubes, channels, and/or pathways through which air flows from an air impellor to the interior concavity of a transparent portion of the mask.

In an example, the rotational speed of an air impellor can be varied. In an example, an air impellor can have different speed settings. In an example, a user can manually change the rotational speed of an air impellor. In an example, a face mask can automatically change the rotational speed of an air impellor in response to data from biometric and/or environmental sensors. In an example, a user can manually change the rotational direction of an air impellor (and thus the direction of active airflow). In an example, a face mask can automatically change the rotational direction of an air impellor (and thus the direction of active airflow).

In an example, a face mask can further comprise one or more sensors. In an example, the airflow of a face mask is automatically adjusted based on analysis of data from one or more sensors on the mask. In an example, the airflow of a face mask is automatically adjusted based on analysis of data from one or more biometric and/or physiological sensors on the mask. In an example, the airflow of a face mask is automatically adjusted based on analysis of data from one or more environmental sensors on the mask. In an example, a face mask can further comprise one or more sensors and the rotational speed of an air impellor is automatically changed in response to data from the one or more sensors.

In an example, a face mask can further comprise one or more sensors which evaluate attributes of air inside the mask (e.g. oxygen level, carbon dioxide level, temperature, and/or humidity level) and the rotational speed of an air impellor is automatically changed in response to data from the one or more sensors. In an example, a face mask can further comprise one or more sensors which evaluate attributes of air inside the mask (e.g. oxygen level, carbon dioxide level, temperature, and/or humidity level) and the rotational speed of an air impellor is automatically increased in response to data from the one or more sensors (e.g. in response to low oxygen level, high carbon dioxide level, high or low temperature, and/or high humidity level). In an example, a face mask can further comprise one or more biometric and/or physiological sensors (e.g. pulse oximeter, EMG sensor, and/or motion sensor) and the rotational speed of an air impellor is automatically changed in response to data from the one or more sensors.

In an example, a face mask can have: an active filtration mode (wherein movement of air through one or more air filters on the mask is caused primarily or entirely by the activation of one or more air impellors); and a passive filtration mode (wherein the air impellors are not activated and movement of air through one or more air filters on the mask is caused entirely or primarily by a person's inhalation and exhalation). In an example, a face mask can automatically switch to active filtration mode when data from biometric and/or environmental sensors indicates that a high level of air filtration and/or airflow is needed and can automatically switch to passive filtration mode when data from those sensors indicates that a high level of air filtration and/or airflow is not needed. In an example, active filtration can be initiated when the oxygen level inside the mask is low or when a wearer enters a high-risk environmental situation. In this manner, a face mask can conserve energy (and prolong battery life) by only initiating active filtration only when it is needed.

In an example, a second-side (e.g. left side) air filter on a face mask can have a circular, elliptical, oval, or longitudinal shape. In an example, a second-side air filter can be located along a second-side (e.g. left side) perimeter of the transparent portion of a face mask. In an example, a second-side air filter can be located between a second-side (e.g. left side) perimeter of a transparent portion of a face mask and a non-transparent portion of the face mask. In an example, a second-side air filter can be located on the second-side half (e.g. the left half) of a transparent portion of a face mask. In an example, a second-side air filter can be located on a person's jaw and/or chin. In an example, a second-side air filter can be located on a person's jaw, chin, or neck. In an example, a face mask can further comprise one or more air tubes, channels, and/or pathways through which air flows from a second-side air filter to the interior concavity of a transparent portion of the mask. In an example, a face mask can further comprise one or more flexible air tubes, channels, and/or pathways through which air flows from a second-side air filter to the interior concavity of a transparent portion of the mask.

In an example, a second-side air filter can be removably attached to a face mask via a clip, snap, clasp, hook, clamp, adhesive substance, or pin. In an example, a second-side air filter can be disposable. In an example, a second-side air filter can be detached from a face mask, cleaned, and then reattached to the face mask. In an example, a mask can further comprise a sensor which tracks the cumulative airflow through a second-side air filter and indicates when the second-side air filter should be changed and/or cleaned. In an example, a mask can further comprise a sensor which tracks the level of airflow resistance through a second-side air filter and indicates when the second-side air filter should be changed and/or cleaned. In an example, there can be two air filters, wherein the mask directs airflow through a first filter until a sensor detects that the first filter is dirty, at which time the mask automatically redirects airflow through a second filter. In an example, a second-side air filter can further comprise two air filters, wherein the mask directs air through a second filter when the first filter becomes dirty and/or clogged.

In an example, when an air impellor is active (e.g. rotating and drawing air in through the first-side air filter) then airflow through a second-side air filter can be: primarily or entirely from the interior of a face mask (e.g. the interior of the concavity of a transparent portion of the mask) out to the environment. In an example, when an air impellor is not active (e.g. not rotating and drawing air in through the first-side air filter), then airflow through the second-side air filter can be: from the environment in to the interior of the face mask (e.g. the interior of the concavity of a transparent portion of the mask) when the person is inhaling; and from the interior of the face mask to the environment when the person is exhaling. This can enable passive two-way air filtering when the air impellor is not active in order to save energy. Alternatively, a second-side air filter can further comprise a one-way valve which does not allow air to flow from the environment in to the interior of the face mask.

In an example, a face mask can further comprise one or more components selected from the group consisting of: data processor, power source (e.g. battery), data transmitter/receiver, biometric and/or physiological sensor, environmental sensor, microphone, speaker, interior mask light, exterior mask light, ultraviolet light emitter in optical communication with airflow within the mask, touch screen, push buttons or switches, a strap or band which loops around the back of a person's head, and a strap or band which loops over the top of a person's head. In an example, a face mask can further comprise a microphone which is in acoustic communication with the interior of the mask (e.g. with the interior of the transparent portion) and a speaker which reproduces sound recorded by the microphone. In an example, a face mask can further comprise a microphone on the inside of the mask which records a person's voice and a speaker on the outside of the mask which reproduces the person's voice. In an example, a face mask can further comprise one or more lights on the inside of the mask which highlight a person's mouth in order to increase visibility of the person's mouth (e.g. lip motion and facial expression) by nearby people. Other design variations discussed elsewhere in this disclosure or in priority-linked disclosures can also be applied to this example where relevant.

Figure 5:
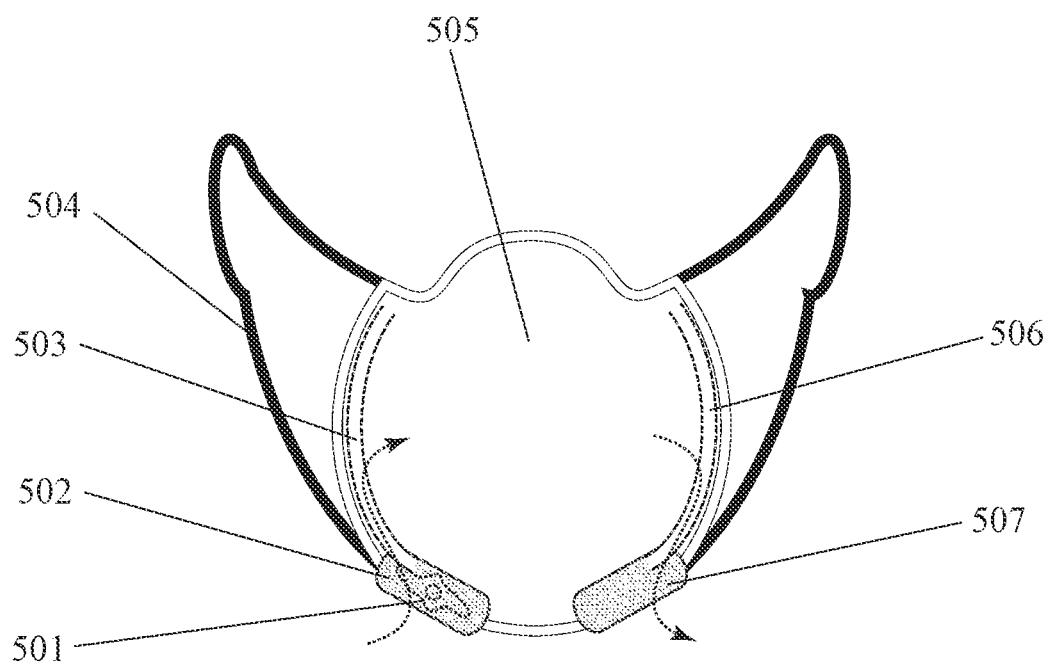
FIG. 5 shows a face mask with a transparent portion, straps, a first-side air filter and impellor on a person's jaw, a second-side air filter on the person's jaw, and air tubes or channels.

FIG. 5 shows an example of a face mask which is similar to the one shown in FIG. 4 except that it further comprises air tubes (e.g. air tubes, channels, or pathways) through which air flows between air filters and the interior of a transparent portion of the mask. FIG. 5 shows an example of a pathogen-filtering semi-transparent face mask comprising: a transparent portion 505 of a face mask which covers at least part of a person's mouth; straps (including strap 504) which hold the transparent portion on the person's head; a first-side air filter 502 on a first side (e.g. the right side) of the mask below the person's mouth; a first-side air tube (or channel) 503 between the first-side air filter and an interior space of the transparent portion; a second-side air filter 507 on a second side (e.g. the left side) of the mask below the person's mouth; a second-side air tube (or channel) 506 between the first-side air filter and the interior space of the transparent portion; and an air impellor 501 which draws air from the environment in through first-side air filter.

In an example, an air tube (e.g. air tube, channel, or pathway) can channel airflow between an air filter and an interior space of a transparent portion of a mask. This can be especially useful when an air filter and/or an air impellor are located relatively far away from the transparent portion of the mask for esthetic and/or other design reasons. In an example, a first air tube can channel airflow between a first air filter and an interior space of a transparent portion of a mask and a second air tube can channel airflow between a second air filter and the interior space of the transparent portion of the mask. In an example, a first air tube can (primarily) channel air from the environment into the interior space of the mask and a second air tube can (primarily) channel air out from the interior space into the environment. In an example, an air tube can channel airflow between an air impellor and an interior space of a transparent portion of a mask. In an example, an air impellor and the interior space of a transparent portion of a mask can be in fluid communication with each other through an air tube. In an example, an air filter and the interior space of a transparent portion of a mask can be in fluid communication with each other through an air tube.

In an example, an air tube (e.g. air tube, channel, or pathway) can span a portion of the perimeter of a transparent portion of a mask. In an example, an arcuate air tube can curve around a portion of an arcuate perimeter of a transparent portion of a mask. In an example, a right-side air tube can span the right-side perimeter of a transparent portion of a mask and a left-side air tube can span the left-side perimeter of the transparent portion of the mask. In an example, a right-side air tube can be on the right side of a transparent portion of a mask and a left-side air tube can be on the left side of the transparent portion of the mask. In an example, the perimeter of a transparent portion of a mask can be generally circular and an air tube can be generally semicircular. In an example, the perimeter of a transparent portion of a mask can be generally circular and an air tube can have a shape which is a section (e.g. an arc portion) of a circle.

In an example, an air tube in a mask can have an air-impermeable section and an air-permeable (e.g. perforated) section. In an example, the air-permeable section can have holes, openings, and perforations which allow fluid communication (e.g. air flow) with the interior space of the mask. In an example, the air-impermeable section can be closer to an air filter or air impellor and the air-permeable section can be closer to the interior space of a mask. In an example, the air-permeable section can have holes, openings, and perforations which allow fluid communication (e.g. air flow) with the interior space of transparent portion of the mask. In an example, the air-impermeable section can be closer to an air filter or air impellor and the air-permeable section can be closer to the interior space of the transparent portion of a mask.

In an example, the inner diameter of an air tube (e.g. air tube, channel, or pathway) can be within the range of ⅛" to ½". In an example, the length of an air tube can be within the range of ½" to 5". In an example, between 25% and 75% of the length of an air tube can be perforated with holes. In an example, between 50% and 80% of the length of an air tube can be perforated with holes. In an example, the interior of an air tube can have a circular cross-sectional shape. In an example, the interior of an air tube can have an elliptical, oval, and/or oblong cross-sectional shape. In an example, an air tube can be detached from a mask for cleaning and then reattached. Other design variations discussed elsewhere in this disclosure or in priority-linked disclosures can also be applied to this example where relevant.

Figure 6:
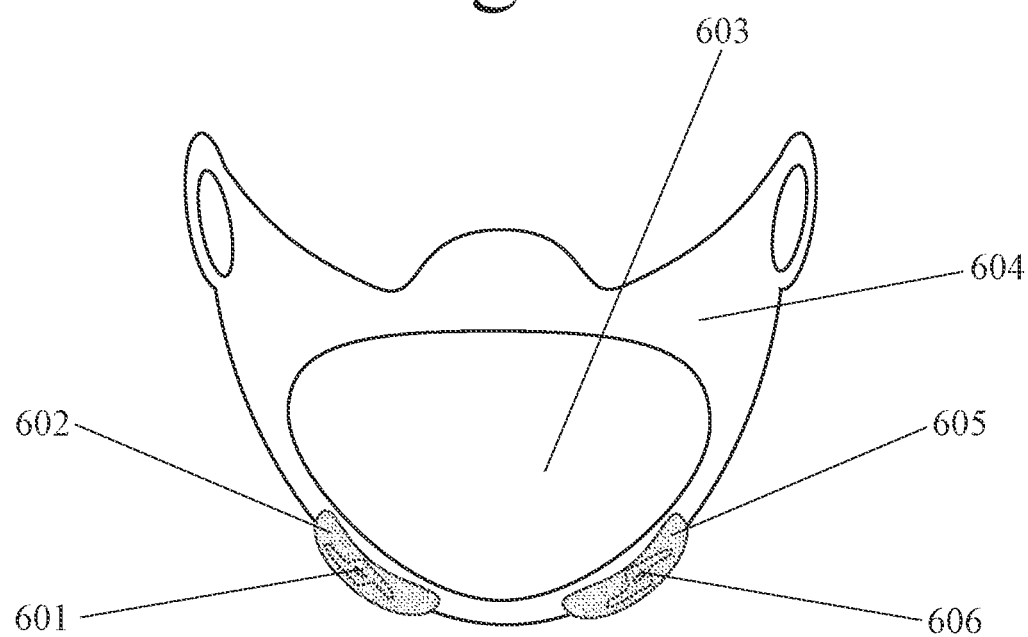
FIG. 6 shows a face mask with a transparent portion, a non-transparent portion, a first-side air filter and impellor on a person's jaw, and a second-side air filter and impellor on the person's jaw.

FIG. 6 shows an example of a pathogen-filtering semi-transparent face mask comprising: a transparent portion 603 of a face mask which covers at least part of a person's mouth; a non-transparent portion 604 of the face mask which holds the transparent portion on the person's head; a first-side air filter 602 on a first side (e.g. the right side) of the mask on the person's jaw; a first-side air impellor 601 on the first side of the mask on the person's jaw which draws air through the first-side air filter; a second-side air filter 605 on a second side (e.g. the left side) of the mask on the person's jaw; and a second-side air impellor 606 on the second side of the mask on the person's jaw which draws air through the second-side air filter.

In an example, a first and/or second air filter can be on a person's jaw, chin, or neck. In an example, a first and/or second air filter can be below a person's jaw and/or chin. In an example, a first and/or second air filter can be location at substantially the same height as a person's mouth. In an example, a first and/or second air filter can be on the lower-half perimeter of a transparent portion of a face mask. In an example, a first and/or second air filter can be between a transparent portion of a face mask and a non-transparent portion of the face mask. In an example, a first and/or second air filter can be between an air impellor and the environment. In an example, a first and/or second air filter can be between an air impellor and the interior of the mask. In an example, a first air filter can be on a person's jaw on a first side (e.g.

the right side) of a mask and a second air filter can be on the person's jaw on a second side (e.g. the left side) of the mask.

In an example, a first and/or second air filter on a face mask can have a circular, elliptical, oval, or longitudinal shape. In an example, a first and/or second air filter can be removably attached to a face mask via a clip, snap, clasp, hook, clamp, adhesive substance, or pin. In an example, a first and/or second air filter can be disposable. In an example, a first and/or second air filter can be detached from a face mask, cleaned, and then reattached to the face mask. In an example, a first and/or second air filter can comprise two filter layers, one layer between an air impellor and the environment and one layer between the air impellor and the interior of the mask (e.g. the space inside a concave transparent portion of the mask). In an example, a first and/or second air filter can further comprise a one-way airflow valve.

In an example, a mask can further comprise a sensor which tracks the cumulative airflow through a first and/or second air filter and indicates when the first and/or second air filter should be changed and/or cleaned. In an example, a mask can further comprise a sensor which tracks the level of airflow resistance through a first and/or second air filter and indicates when the first and/or second air filter should be changed and/or cleaned. In an example, there can be two air filters, wherein the mask directs airflow through a first filter until a sensor detects that the first filter is dirty, at which time the mask automatically redirects airflow through a second filter. In an example, a first and/or second air filter can further comprise two air filters, wherein the mask directs air through a second filter when the first filter becomes dirty and/or clogged.

In an example, when an air impellor is active (e.g. rotating and drawing air through an air filter) then airflow through the air filter can be: primarily or entirely from the environment to the interior of a face mask (e.g. the interior of the concavity of a transparent portion of the mask). In an example, when an air impellor is active (e.g. rotating and drawing air through an air filter) then airflow through the air filter can be: primarily or entirely from the interior of a face mask (e.g. the interior of the concavity of a transparent portion of the mask) out to the environment. In an example, when an air impellor is not active (e.g. not rotating and drawing air through an air filter), then airflow through the air filter can be: from the environment in to the interior of the face mask (e.g. the interior of the concavity of a transparent portion of the mask) when the person is inhaling; and from the interior of the face mask to the environment when the person is exhaling.

In an example, a first and/or second air impellor can be selected from the group consisting of: a fan, a turbine, a propeller, a helix, and a pump. In an example, a first and/or second air impellor can rotate. In an example, a first and/or second air impellor can be rotated by an electromagnetic motor. In an example, a first and/or second air impellor can move air from the environment through one or more air filters into the interior of a face mask. In an example, a first and/or second air impellor can move air from the interior of a face mask through one or more air filters out into the environment.

In an example, the rotational speed of a first and/or second air impellor can be varied. In an example, a first and/or second air impellor can have different speed settings. In an example, a user can manually change the rotational speed of a first and/or second air impellor. In an example, a face mask can automatically change the rotational speed of a first and/or second air impellor in response to data from biometric and/or environmental sensors. In an example, a user can manually change the rotational direction of a first and/or second air impellor (and thus the direction of active airflow). In an example, a face mask can automatically change the rotational direction of a first and/or second air impellor (and thus the direction of active airflow).

In an example, a face mask can further comprise one or more sensors. In an example, the airflow of a face mask is automatically adjusted based on analysis of data from one or more sensors on the mask. In an example, the airflow of a face mask is automatically adjusted based on analysis of data from one or more biometric and/or physiological sensors on the mask. In an example, the airflow of a face mask is automatically adjusted based on analysis of data from one or more environmental sensors on the mask. In an example, a face mask can further comprise one or more sensors and the rotational speed of a first and/or second air impellor is automatically changed in response to data from the one or more sensors.

In an example, a face mask can further comprise one or more sensors which evaluate attributes of air inside the mask (e.g. oxygen level, carbon dioxide level, temperature, and/or humidity level) and the rotational speed of a first and/or second air impellor is automatically changed in response to data from the one or more sensors. In an example, a face mask can further comprise one or more sensors which evaluate attributes of air inside the mask (e.g. oxygen level, carbon dioxide level, temperature, and/or humidity level) and the rotational speed of a first and/or second air impellor is automatically increased in response to data from the one or more sensors (e.g. in response to low oxygen level, high carbon dioxide level, high or low temperature, and/or high humidity level). In an example, a face mask can further comprise one or more biometric and/or physiological sensors (e.g. pulse oximeter, EMG sensor, and/or motion sensor) and the rotational speed of a first and/or second air impellor is automatically changed in response to data from the one or more sensors.

In an example, a face mask can have: an active filtration mode (wherein movement of air through one or more air filters on the mask is caused primarily or entirely by the activation of one or more air impellors); and a passive filtration mode (wherein the air impellors are not activated and movement of air through one or more air filters on the mask is caused entirely or primarily by a person's inhalation and exhalation). In an example, a face mask can automatically switch to active filtration mode when data from biometric and/or environmental sensors indicates that a high level of air filtration and/or airflow is needed and can automatically switch to passive filtration mode when data from those sensors indicates that a high level of air filtration and/or airflow is not needed. In an example, active filtration can be initiated when the oxygen level inside the mask is low or when a wearer enters a high-risk environmental situation. In this manner, a face mask can conserve energy (and prolong battery life) by only initiating active filtration only when it is needed.

In an example, a face mask can further comprise one or more components selected from the group consisting of: data processor, power source (e.g. battery), data transmitter/receiver, biometric and/or physiological sensor, environmental sensor, microphone, speaker, interior mask light, exterior mask light, ultraviolet light emitter in optical communication with airflow within the mask, touch screen, push buttons or switches, a strap or band which loops around the back of a person's head, and a strap or band which loops over the top of a person's head. In an example, a face mask can further comprise a microphone which is in acoustic communication with the interior of the mask (e.g. with the interior of the transparent portion) and a speaker which reproduces sound recorded by the microphone. In an example, a face mask can further comprise a microphone on the inside of the mask which records a person's voice and a speaker on the outside of the mask which reproduces the person's voice. In an example, a face mask can further comprise one or more lights on the inside of the mask which highlight a person's mouth in order to increase visibility of the person's mouth (e.g. lip motion and facial expression) by nearby people. Other design variations discussed elsewhere in this disclosure or in priority-linked disclosures can also be applied to this example where relevant.

Figure 7:
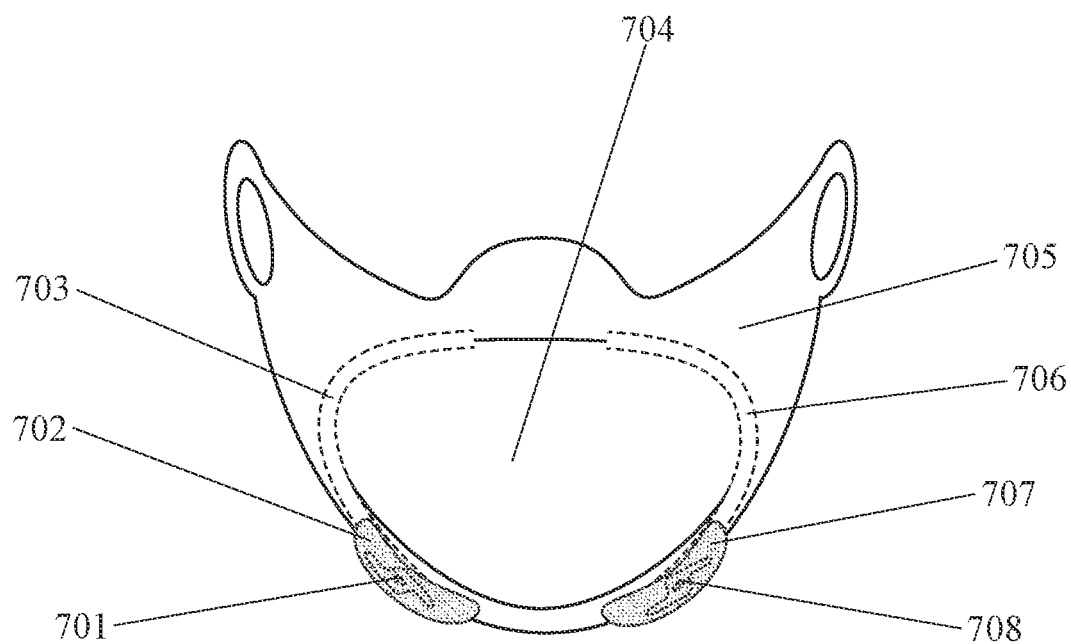
FIG. 7 shows a face mask with a transparent portion, a non-transparent portion, a first-side air filter and impellor on a person's jaw, a second-side air filter and impellor on the person's jaw, and air tubes or channels.

FIG. 7 shows an example of a face mask which is similar to the one shown in FIG. 6 except that it further comprises air tubes (e.g. air tubes, channels, or pathways) through which air flows between air filters and the interior of a transparent portion of the mask. FIG. 7 shows an example of a pathogen-filtering semi-transparent face mask comprising: a transparent portion 704 of a face mask which covers at least part of a person's mouth; a non-transparent portion 705 of the face mask which holds the transparent portion on the person's head; a first-side air filter 702 on a first side (e.g. the right side) of the mask on the person's jaw; a first-side air impellor 701 on the first side of the mask on the person's jaw which draws air through the first-side air filter; a first-side air tube (or channel) 703 between the first-side air filter and an interior space of the transparent portion; a second-side air filter 707 on a second side (e.g. the left side) of the mask on the person's jaw; a second-side air impellor 708 on the second side of the mask on the person's jaw which draws air through the second-side air filter; and a second-side air tube (or channel) 706 between the second-side air filter and an interior space of the transparent portion;

In an example, an air tube (e.g. air tube, channel, or pathway) can channel airflow between an air filter and an interior space of a transparent portion of a mask. This can be especially useful when an air filter and/or an air impellor are located relatively far away from the transparent portion of the mask for esthetic and/or other design reasons. In an example, a first air tube can channel airflow between a first air filter and an interior space of a transparent portion of a mask and a second air tube can channel airflow between a second air filter and the interior space of the transparent portion of the mask. In an example, an air tube (e.g. air tube, channel, or pathway) can span a portion of the perimeter of a transparent portion of a mask. In an example, an arcuate air tube can curve around a portion of an arcuate perimeter of a transparent portion of a mask.

In an example, an air tube in a mask can have an air-impermeable section and an air-permeable (e.g. perforated) section. In an example, the air-permeable section can have holes, openings, and perforations which allow fluid communication (e.g. air flow) with the interior space of the mask. In an example, the air-impermeable section can be closer to an air filter or air impellor and the air-permeable section can be closer to the interior space of a mask. In an example, the air-permeable section can have holes, openings, and perforations which allow fluid communication (e.g. air flow) with the interior space of transparent portion of the mask. In an example, the air-impermeable section can be closer to an air filter or air impellor and the air-permeable section can be closer to the interior space of the transparent portion of a mask.

In an example, the inner diameter of an air tube (e.g. air tube, channel, or pathway) can be within the range of ⅛" to ½". In an example, the length of an air tube can be within the range of ½" to 5". In an example, between 25% and 75% of the length of an air tube can be perforated with holes. In an example, between 50% and 80% of the length of an air tube can be perforated with holes. In an example, the interior of an air tube can have a circular cross-sectional shape. In an example, the interior of an air tube can have an elliptical, oval, and/or oblong cross-sectional shape. In an example, an air tube can be detached from a mask for cleaning and then reattached. Other design variations discussed elsewhere in this disclosure or in priority-linked disclosures can also be applied to this example where relevant.

Figure 8:
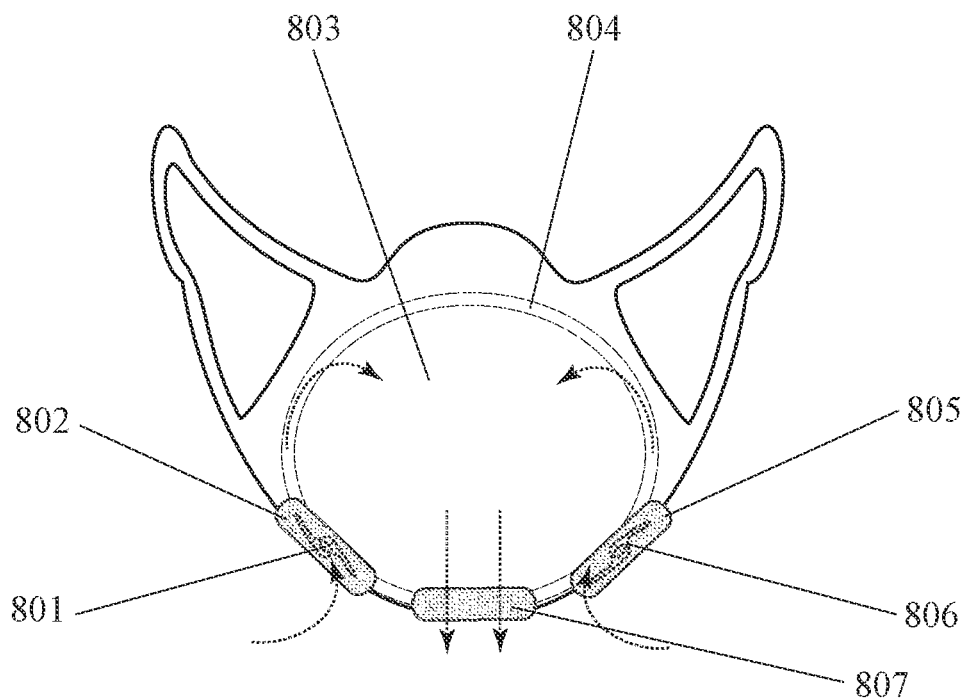
FIG. 8 shows a face mask with a transparent portion, a non-transparent portion, a first-side air filter and impellor on a person's jaw, a second-side air filter and impellor on the person's jaw, a central air filter between the first-side air filter and the second-side air filter, and air tubes or channels.

FIG. 8 shows an example of a pathogen-filtering semi-transparent face mask comprising: a transparent portion 803 of a face mask which covers at least part of a person's mouth; a first-side air filter 802 on a first side (e.g. the right side) of the mask on the person's jaw; a first-side air impellor 801 on the first side of the mask on the person's jaw which draws air into the mask from the environment through the first-side air filter; a central air filter 807 on the right-to-left central longitudinal axis of the mask on the person's jaw; a second-side air filter 805 on a second side (e.g. the left side) of the mask on the person's jaw; a second-side air impellor 806 on the second side of the mask on the person's jaw which draws air into the mask from the environment through the second-side air filter; and one or more air tubes (or channels) 804 between the first-side and second-side air filters and an interior space of the transparent portion.

In an example, when the air impellors are activated (e.g. rotating), the mask has active airflow. In an example, when the air impellors are activated (e.g. rotating), air flows from the environment into the mask through the first-side and second-side air filters and air flows out from the mask into the environment through the central air filter. In an example, when the air impellors are not activated (e.g. not rotating), then the mask has passive airflow. In an example, when the air impellors are not activated (e.g. not rotating), air flows from the environment into the mask through all of the filters when the person inhales and air flows out from the mask into the environment through all of the filters when the person exhales. Other design variations discussed elsewhere in this disclosure or in priority-linked disclosures can also be applied to this example where relevant.

Figure 9:
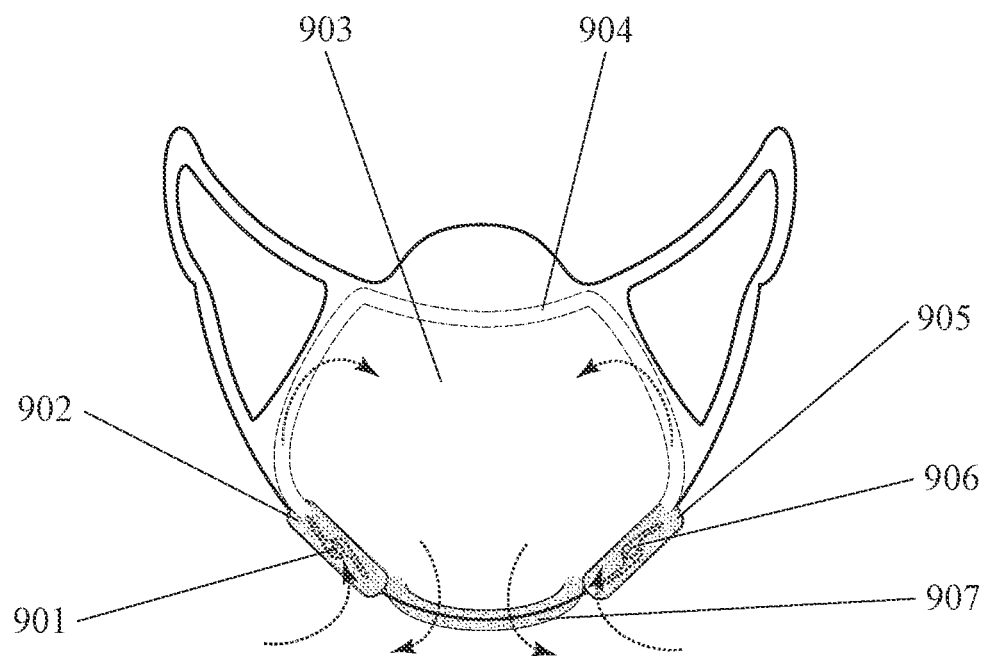
FIG. 9 shows a face mask with a transparent portion, a non-transparent portion, a first-side air filter and impellor on a person's jaw, a second-side air filter and impellor on the person's jaw, a central air filter on the perimeter of the mask between the first-side air filter and the second-side air filter, and air tubes or channels.

FIG. 9 shows an example of a face mask which is similar to the one shown in FIG. 8 except that the central air filter is longer, spanning the perimeter of the transparent portion between the first-side air filter and the second-side air filter. FIG. 9 shows an example of a pathogen-filtering semi-transparent face mask comprising: a transparent portion 903 of a face mask which covers at least part of a person's mouth; a first-side air filter 902 on a first side (e.g. the right side) of the mask on the person's jaw; a first-side air impellor 901 on the first side of the mask on the person's jaw which draws air into the mask from the environment through the first-side air filter; a second-side air filter 905 on a second side (e.g. the left side) of the mask on the person's jaw; a second-side air impellor 906 on the second side of the mask on the person's jaw which draws air into the mask from the environment through the second-side air filter; a central air filter 907 on the perimeter of the transparent portion between the first-side air filter and the second-side air filter; and one or more air tubes (or channels) 904 between the first-side and second-side air filters and an interior space of the transparent portion. Other design variations discussed elsewhere in this disclosure or in priority-linked disclosures can also be applied to this example where relevant.

Figure 10:
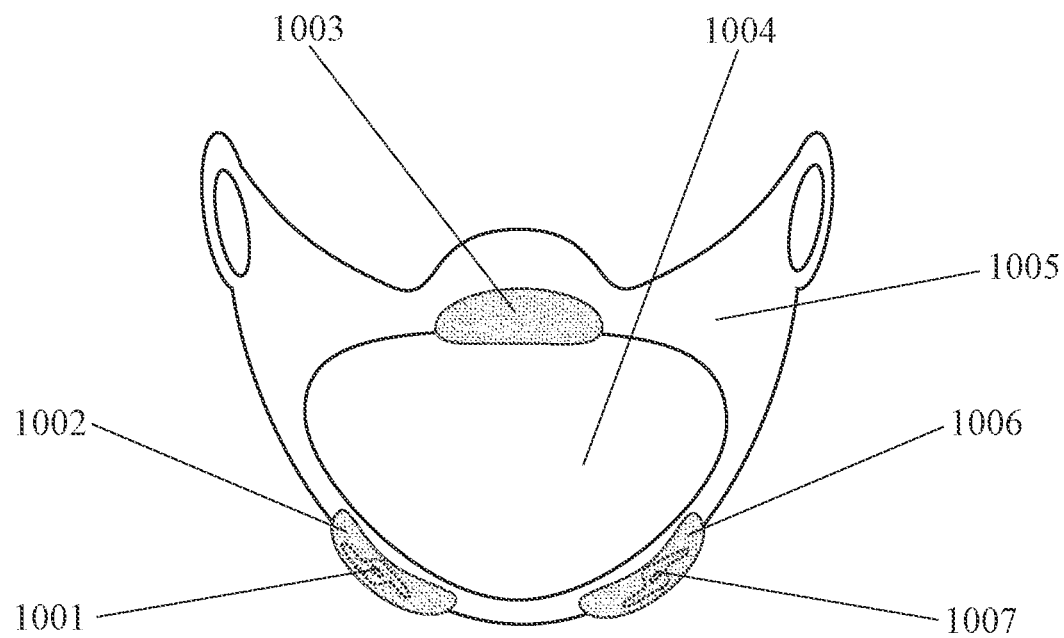
FIG. 10 shows a face mask with a transparent portion, a non-transparent portion, a first-side air filter and impellor on a person's jaw, a second-side air filter and impellor on the person's jaw, and a central air filter above the person's mouth.

FIG. 10 shows an example of a pathogen-filtering semi-transparent face mask comprising: a transparent portion 1004 of a face mask which covers at least part of a person's mouth; a non-transparent portion 1005 of the face mask which holds the transparent portion on the person's head; a first-side air filter 1002 on a first side (e.g. the right side) of the mask on the person's jaw; a first-side air impellor 1001 on the first side of the mask on the person's jaw which draws air into the mask from the environment through the first-side air filter; a second-side air filter 1006 on a second side (e.g. the left side) of the mask on the person's jaw; a second-side air impellor 1007 on the second side of the mask on the person's jaw which draws air into the mask from the environment through the second-side air filter; and an upper air filter 1003 above the person's mouth.

In an example, when the air impellors are activated (e.g. rotating), the mask has active airflow. In an example, when the air impellors are activated (e.g. rotating), air flows from the environment into the mask through the first-side and second-side air filters and air flows out from the mask into the environment through the upper air filter. In an example, when the air impellors are not activated (e.g. not rotating), then the mask has passive airflow. In an example, when the air impellors are not activated (e.g. not rotating), air flows from the environment into the mask through all of the filters when the person inhales and air flows out from the mask into the environment through all of the filters when the person exhales. Other design variations discussed elsewhere in this disclosure or in priority-linked disclosures can also be applied to this example where relevant.

Figure 11:
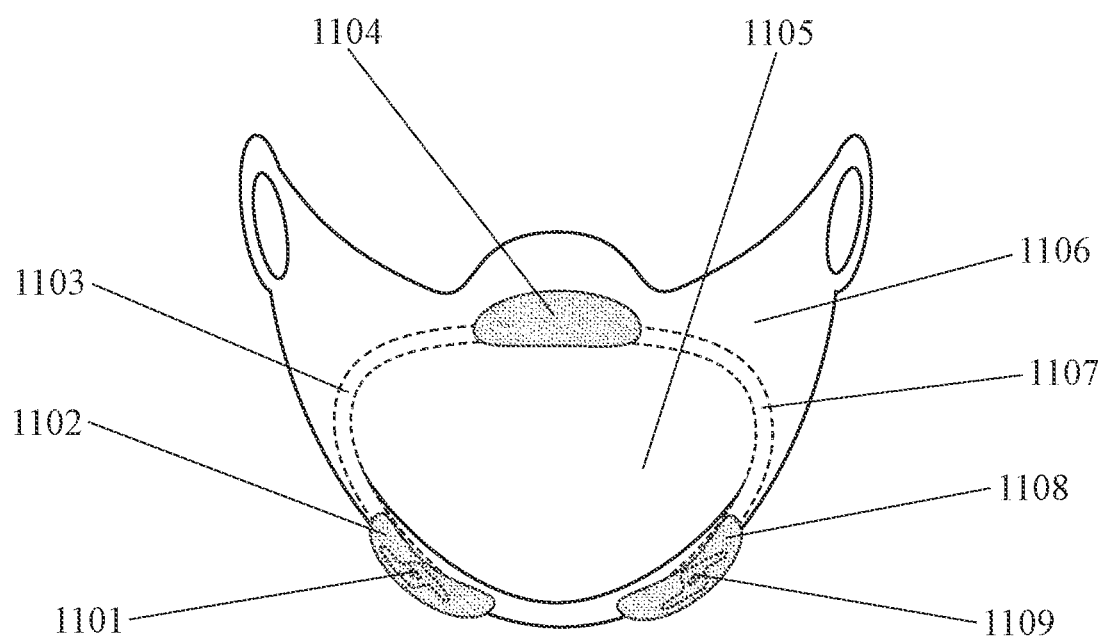
FIG. 11 shows a face mask with a transparent portion, a non-transparent portion, a first-side air filter and impellor on a person's jaw, a second-side air filter and impellor on the person's jaw, a central air filter above the person's mouth; and air tubes or channels.

FIG. 11 shows an example of a face mask which is similar to the one shown in FIG. 10 except that it further comprises air tubes (e.g. air tubes, channels, or pathways) through which air flows between air filters and the interior of a transparent portion of the mask. FIG. 11 shows an example of a pathogen-filtering semi-transparent face mask comprising: a transparent portion 1105 of a face mask which covers at least part of a person's mouth; a non-transparent portion 1106 of the face mask which holds the transparent portion on the person's head; a first-side air filter 1102 on a first side (e.g. the right side) of the mask on the person's jaw; a first-side air impellor 1101 on the first side of the mask on the person's jaw which draws air into the mask from the environment through the first-side air filter; a first-side air tube (or channel) 1103 between the first-side air filter and an interior space of the transparent portion; a second-side air filter 1108 on a second side (e.g. the left side) of the mask on the person's jaw; a second-side air impellor 1109 on the second side of the mask on the person's jaw which draws air into the mask from the environment through the second-side air filter; a second-side air tube (or channel) 1107 between the second-side air filter and an interior space of the transparent portion; and an upper air filter 1104 above the person's mouth.

In an example, when the air impellors are activated (e.g. rotating), the mask has active airflow. In an example, when the air impellors are activated (e.g. rotating), air flows from the environment into the mask through the first-side and second-side air filters and air flows out from the mask into the environment through the upper air filter. In an example, when the air impellors are not activated (e.g. not rotating), then the mask has passive airflow. In an example, when the air impellors are not activated (e.g. not rotating), air flows from the environment into the mask through all of the filters when the person inhales and air flows out from the mask into the environment through all of the filters when the person exhales. Other design variations discussed elsewhere in this disclosure or in priority-linked disclosures can also be applied to this example where relevant.

Figure 12:
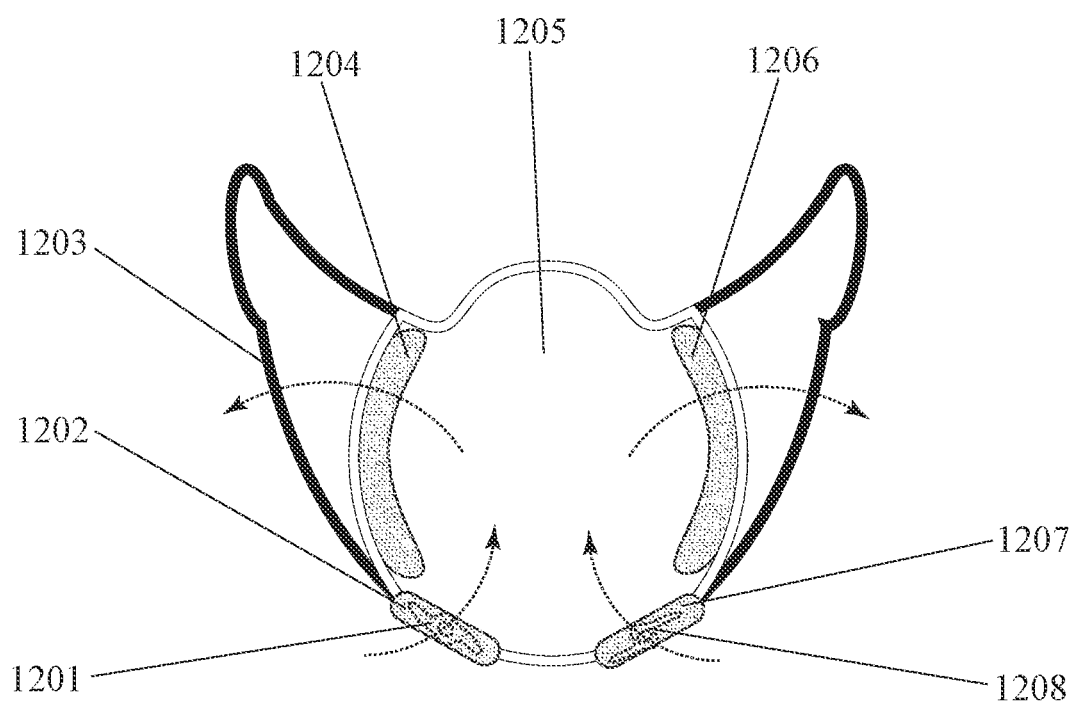
FIG. 12 shows an example of a face mask with a transparent portion, a non-transparent portion, a first-side lower air filter and impellor on a person's jaw, a second-side lower air filter and impellor on the person's jaw, a first-side upper air filter, and a second-side upper air filter.

FIG. 12 shows an example of a pathogen-filtering semi-transparent face mask comprising: a transparent portion 1205 of a face mask which covers at least part of a person's mouth; straps (including strap 1203) which hold the transparent portion on the person's head; a first-side lower air filter 1202 on a first side (e.g. the right side) of the mask on the person's jaw and/or neck; a first-side air impellor 1201 on the first side of the mask on the person's jaw which moves air through the first-side lower air filter; a first-side upper air filter 1204 on the first side of the mask which is higher than the first side lower air filter; a second-side lower air filter 1207 on a second side (e.g. the left side) of the mask on the person's jaw and/or neck; a second-side air impellor 1208 on the second side of the mask on the person's jaw which moves air through the second-side lower air filter; and a second-side upper air filter 1206 on the second side of the mask which is higher than the second side lower air filter.

In an example, a lower air filter can be on a person's jaw, chin, or neck. In an example, a lower air filter can be below a person's jaw and/or chin. In an example, a lower air filter can be on the lower-half perimeter of a transparent portion of a face mask. In an example, a lower air filter can be between a transparent portion of a face mask and a non-transparent portion of the face mask. In an example, a lower air filter can be between an air impellor and the environment. In an example, a lower air filter can be between an air impellor and the interior of the mask. In an example, a first lower air filter can be on a person's jaw on a first side (e.g. the right side) of a mask and a second lower air filter can be on the person's jaw on a second side (e.g. the left side) of the mask.

In an example, a lower air filter on a face mask can have a circular, elliptical, or oval shape. In an example, a lower air filter can be removably attached to a face mask via a clip, snap, clasp, hook, clamp, adhesive substance, or pin. In an example, a lower air filter can be disposable. In an example, a lower air filter can be detached from a face mask, cleaned, and then reattached to the face mask. In an example, a lower air filter can comprise two filter layers, one layer between an air impellor and the environment and one layer between the air impellor and the interior of the mask (e.g. the space inside a concave transparent portion of the mask). In an example, a lower air filter can further comprise a one-way airflow valve.

In an example, when an air impellor is active (e.g. rotating and drawing air through a lower air filter) then airflow through the lower air filter can be: primarily or entirely from the environment to the interior of a face mask (e.g. the interior of the concavity of a transparent portion of the mask). In an example, when an air impellor is not active (e.g. not rotating and drawing air through a lower air filter), then airflow through the lower air filter can be: from the environment in to the interior of the face mask (e.g. the interior of the concavity of a transparent portion of the mask) when the person is inhaling; and from the interior of the face mask to the environment when the person is exhaling.

In an example, an upper air filter can be to the right or left of a person's mouth. In an example, an upper air filter can be directly to the right or left of a person's mouth. In an example, an upper air filter can be on a person's cheek. In an example, an upper air filter can be on the right-side or left-side perimeter of a transparent portion of a face mask. In an example, an upper air filter can be between a transparent portion of a face mask and a non-transparent portion of the face mask. In an example, an upper air filter can curve around the right side or the left side of a transparent portion of a face mask.

In an example, an upper air filter on a face mask can have a semicircular shape. In an example, an upper air filter on a face mask can be shaped like a section of a circle, ellipse, or oval. In an example, an upper air filter can be removably attached to a face mask via a clip, snap, clasp, hook, clamp, adhesive substance, or pin. In an example, an upper air filter can be disposable. In an example, an upper air filter can be detached from a face mask, cleaned, and then reattached to the face mask. In an example, an upper air filter can further comprise a one-way airflow valve.

In an example, when an air impellor is active (e.g. rotating and drawing air through a lower air filter) then airflow through the higher air filter can be: primarily or entirely out from the interior of a face mask (e.g. the interior of the concavity of a transparent portion of the mask) to the environment. In an example, when an air impellor is not active (e.g. not rotating and drawing air through a lower air filter), then airflow through the upper air filter can be: from the environment in to the interior of the face mask (e.g. the interior of the concavity of a transparent portion of the mask) when the person is inhaling; and from the interior of the face mask to the environment when the person is exhaling. Other design variations discussed elsewhere in this disclosure or in priority-linked disclosures can also be applied to this example where relevant.

Figure 13:
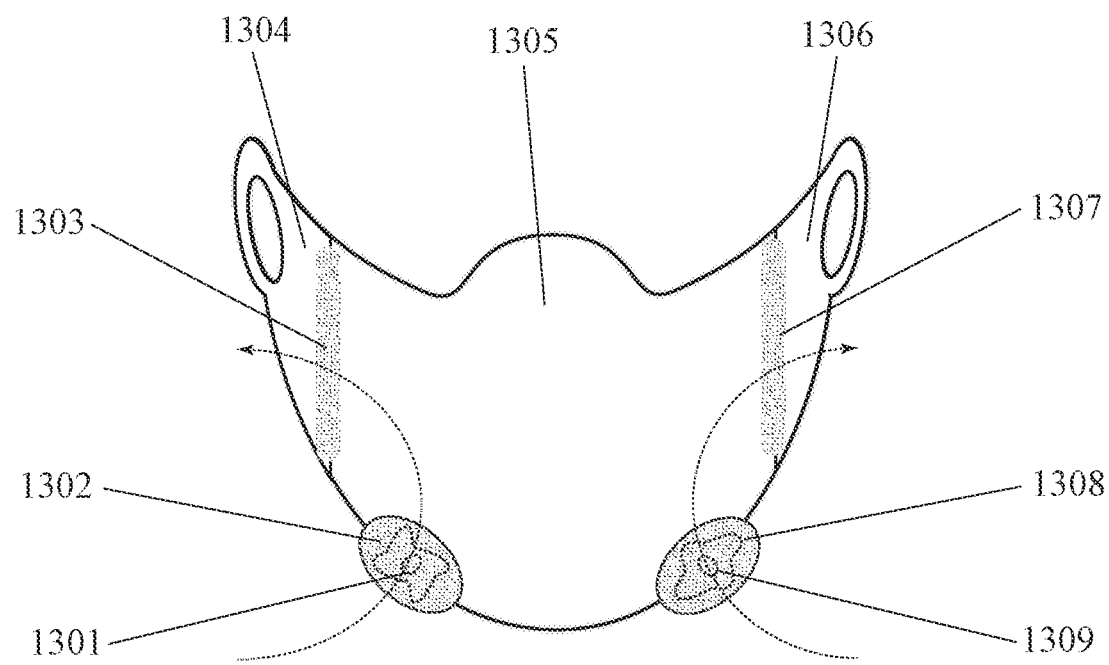
FIG. 13 shows another example of a face mask with a transparent portion, a non-transparent portion, a first-side lower air filter and impellor on a person's jaw, a second-side lower air filter and impellor on the person's jaw, a first-side upper air filter, and a second-side upper air filter.

FIG. 13 shows an example of a pathogen-filtering semi-transparent face mask comprising: a transparent portion 1305 of a face mask which covers at least part of a person's mouth; non-transparent portions 1304 and 1306 of the mask which hold the transparent portion on the person's head; a first-side lower air filter 1302 on a first side (e.g. the right side) of the mask on the person's jaw and/or neck; a first-side air impellor 1301 on the first side of the mask on the person's jaw which moves air through the first-side lower air filter; a first-side upper air filter 1303 on the first side of the mask which is higher than the first side lower air filter; a second-side lower air filter 1308 on a second side (e.g. the left side) of the mask on the person's jaw and/or neck; a second-side air impellor 1309 on the second side of the mask on the person's jaw which moves air through the second-side lower air filter; and a second-side upper air filter 1307 on the second side of the mask which is higher than the second side lower air filter.

In an example, non-transparent portions of a face mask can hold a transparent portion of a face mask on a person's head by being attached to (e.g. looping around) the person's ears. In an example, non-transparent portions can hold the transparent portion on a person's head by being attached to (e.g. looping around) the rear of the person's head. In an example, non-transparent portions can comprise elastic and/or stretchable straps, bands, cords, or strings. In an example, non-transparent portions can comprise fabric straps. In an example, non-transparent portions can be made from a flexible fabric and/or textile. In an example, non-transparent portions can be permeable to air. In an example, non-transparent portions can be impermeable to air. In an example, non-transparent portions can be less permeable to air than an air filter.

In an example, a transparent portion and non-transparent portions of a face mask can be attached to each other by sewing or weaving. In an example, a transparent portion and non-transparent portions can be attached to each other by adhesion and/or gluing. In an example, a transparent portion and non-transparent portions can be attached to each other by melting and/or welding. In an example, a transparent portion and non-transparent portions can be attached to each other by snaps, clips, clamps, hooks, pins, prongs, or buttons.

In an example, a lower air filter can be on a person's jaw, chin, or neck. In an example, a lower air filter can be below a person's jaw and/or chin. In an example, a lower air filter can be on the lower-half perimeter of a transparent portion of a face mask. In an example, a lower air filter can be between a transparent portion of a face mask and a non-transparent portion of the face mask. In an example, a lower air filter can be between an air impellor and the environment. In an example, a lower air filter can be between an air impellor and the interior of the mask. In an example, a first lower air filter can be on a person's jaw on a first side (e.g. the right side) of a mask and a second lower air filter can be on the person's jaw on a second side (e.g. the left side) of the mask.

In an example, a lower air filter on a face mask can have a circular, elliptical, or oval shape. In an example, a lower air filter can be removably attached to a face mask via a clip, snap, clasp, hook, clamp, adhesive substance, or pin. In an example, a lower air filter can be disposable. In an example, a lower air filter can be detached from a face mask, cleaned, and then reattached to the face mask. In an example, a lower air filter can comprise two filter layers, one layer between an air impellor and the environment and one layer between the air impellor and the interior of the mask (e.g. the space inside a concave transparent portion of the mask). In an example, a lower air filter can further comprise a one-way airflow valve.

In an example, when an air impellor is active (e.g. rotating and drawing air through a lower air filter) then airflow through the lower air filter can be: primarily or entirely from the environment to the interior of a face mask (e.g. the interior of the concavity of a transparent portion of the mask). In an example, when an air impellor is not active (e.g. not rotating and drawing air through a lower air filter), then airflow through the lower air filter can be: from the environment in to the interior of the face mask (e.g. the interior of the concavity of a transparent portion of the mask) when the person is inhaling; and from the interior of the face mask to the environment when the person is exhaling.

In an example, an upper air filter can be to the right or left of a person's mouth. In an example, an upper air filter can be directly to the right or left of a person's mouth. In an example, an upper air filter can be on a person's cheek. In an example, an upper air filter can be on the right-side or left-side perimeter of a transparent portion of a face mask. In an example, an upper air filter can be between a transparent portion of a face mask and a non-transparent portion of the face mask. In an example, an upper air filter can curve around the right side or the left side of a transparent portion of a face mask.

In an example, an upper air filter on a face mask can have a vertical longitudinal orientation. In an example, an upper air filter can be removably attached to a face mask via a clip, snap, clasp, hook, clamp, adhesive substance, or pin. In an example, an upper air filter can be disposable. In an example, an upper air filter can be detached from a face mask, cleaned, and then reattached to the face mask. In an example, an upper air filter can further comprise a one-way airflow valve.

In an example, when an air impellor is active (e.g. rotating and drawing air through a lower air filter) then airflow through the higher air filter can be: primarily or entirely out from the interior of a face mask (e.g. the interior of the concavity of a transparent portion of the mask) to the environment. In an example, when an air impellor is not active (e.g. not rotating and drawing air through a lower air filter), then airflow through the upper air filter can be: from the environment in to the interior of the face mask (e.g. the interior of the concavity of a transparent portion of the mask) when the person is inhaling; and from the interior of the face mask to the environment when the person is exhaling. Other design variations discussed elsewhere in this disclosure or in priority-linked disclosures can also be applied to this example where relevant.

Figure 14:
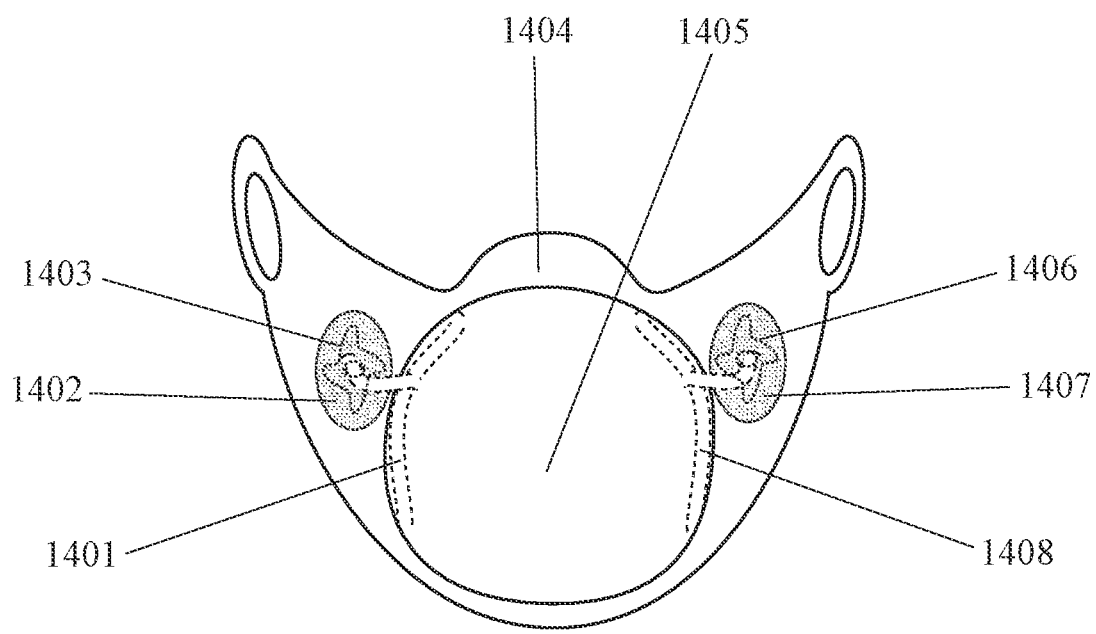
FIG. 14 shows a face mask with a transparent portion, a non-transparent portion, a first-side air filter and impellor on a person's first-side cheek, a second-side air filter and impellor on the person's second-side cheek, and air tubes or channels.

FIG. 14 shows an example of a pathogen-filtering semi-transparent face mask comprising: a transparent portion 1405 of a face mask which covers at least part of a person's mouth; a non-transparent portion 1404 of the face mask which holds the transparent portion on the person's head; a first-side air filter 1402 on a first side (e.g. the right side) of the mask over the person's cheek (e.g. between the person's mouth and an ear); a first-side air impellor 1403 on the first side of the mask on the person's jaw which moves air through the first-side air filter; a first-side air tube (or channel) 1401 between the first-side air filter and an interior space of the transparent portion; a second-side air filter 1407 on a second side (e.g. the left side) of the mask over the person's cheek (e.g. between the person's mouth and an ear); a second-side air impellor 1406 on the second side of the mask on the person's jaw which draws air through the second-side air filter; and a second-side air tube (or channel) 1408 between the second-side air filter and an interior space of the transparent portion.

In an example, a first and/or second air filter can be over (e.g. partially cover) a person's cheek. In an example, a first and/or second air filter can be between a person's mouth and an ear. In an example, a first air filter can be over a person's cheek on a first side (e.g. the right side) of a mask and a second air filter can be over the person's cheek on a second side (e.g. the left side) of the mask. In an example, a first and/or second air filter can be between an air impellor and the environment. In an example, a first and/or second air filter can be between an air impellor and the interior of the mask.

In an example, a first and/or second air filter on a face mask can have a circular, elliptical, oval, or longitudinal shape. In an example, a first and/or second air filter can be removably attached to a face mask via a clip, snap, clasp, hook, clamp, adhesive substance, or pin. In an example, a first and/or second air filter can be disposable. In an example, a first and/or second air filter can be detached from a face mask, cleaned, and then reattached to the face mask. In an example, a first and/or second air filter can comprise two filter layers, one layer between an air impellor and the environment and one layer between the air impellor and the interior of the mask (e.g. the space inside a concave transparent portion of the mask). In an example, a first and/or second air filter can further comprise a one-way airflow valve.

In an example, a mask can further comprise a sensor which tracks the cumulative airflow through a first and/or second air filter and indicates when the first and/or second air filter should be changed and/or cleaned. In an example, a mask can further comprise a sensor which tracks the level of airflow resistance through a first and/or second air filter and indicates when the first and/or second air filter should be changed and/or cleaned. In an example, there can be two air filters, wherein the mask directs airflow through a first filter until a sensor detects that the first filter is dirty, at which time the mask automatically redirects airflow through a second filter. In an example, a first and/or second air filter can further comprise two air filters, wherein the mask directs air through a second filter when the first filter becomes dirty and/or clogged.

In an example, when an air impellor is active (e.g. rotating and drawing air through an air filter) then airflow through the air filter can be: primarily or entirely from the environment to the interior of a face mask (e.g. the interior of the concavity of a transparent portion of the mask). In an example, when an air impellor is active (e.g. rotating and drawing air through an air filter) then airflow through the air filter can be: primarily or entirely from the interior of a face mask (e.g. the interior of the concavity of a transparent portion of the mask) out to the environment. In an example, when an air impellor is not active (e.g. not rotating and drawing air through an air filter), then airflow through the air filter can be: from the environment in to the interior of the face mask (e.g. the interior of the concavity of a transparent portion of the mask) when the person is inhaling; and from the interior of the face mask to the environment when the person is exhaling.

In an example, a first and/or second air impellor can be selected from the group consisting of: a fan, a turbine, a propeller, a helix, and a pump. In an example, a first and/or second air impellor can rotate. In an example, a first and/or second air impellor can be rotated by an electromagnetic motor. In an example, a first and/or second air impellor can move air from the environment through one or more air filters into the interior of a face mask. In an example, a first and/or second air impellor can move air from the interior of a face mask through one or more air filters out into the environment.

In an example, the rotational speed of a first and/or second air impellor can be varied. In an example, a first and/or second air impellor can have different speed settings. In an example, a user can manually change the rotational speed of a first and/or second air impellor. In an example, a face mask can automatically change the rotational speed of a first and/or second air impellor in response to data from biometric and/or environmental sensors. In an example, a user can manually change the rotational direction of a first and/or second air impellor (and thus the direction of active airflow). In an example, a face mask can automatically change the rotational direction of a first and/or second air impellor (and thus the direction of active airflow).

In an example, a face mask can further comprise one or more sensors. In an example, the airflow of a face mask is automatically adjusted based on analysis of data from one or more sensors on the mask. In an example, the airflow of a face mask is automatically adjusted based on analysis of data from one or more biometric and/or physiological sensors on the mask. In an example, the airflow of a face mask is automatically adjusted based on analysis of data from one or more environmental sensors on the mask. In an example, a face mask can further comprise one or more sensors and the rotational speed of a first and/or second air impellor is automatically changed in response to data from the one or more sensors.

In an example, a face mask can further comprise one or more sensors which evaluate attributes of air inside the mask (e.g. oxygen level, carbon dioxide level, temperature, and/or humidity level) and the rotational speed of a first and/or second air impellor is automatically changed in response to data from the one or more sensors. In an example, a face mask can further comprise one or more sensors which evaluate attributes of air inside the mask (e.g. oxygen level, carbon dioxide level, temperature, and/or humidity level)

and the rotational speed of a first and/or second air impellor is automatically increased in response to data from the one or more sensors (e.g. in response to low oxygen level, high carbon dioxide level, high or low temperature, and/or high humidity level). In an example, a face mask can further comprise one or more biometric and/or physiological sensors (e.g. pulse oximeter, EMG sensor, and/or motion sensor) and the rotational speed of a first and/or second air impellor is automatically changed in response to data from the one or more sensors.

In an example, a face mask can have: an active filtration mode (wherein movement of air through one or more air filters on the mask is caused primarily or entirely by the activation of one or more air impellors); and a passive filtration mode (wherein the air impellors are not activated and movement of air through one or more air filters on the mask is caused entirely or primarily by a person's inhalation and exhalation). In an example, a face mask can automatically switch to active filtration mode when data from biometric and/or environmental sensors indicates that a high level of air filtration and/or airflow is needed and can automatically switch to passive filtration mode when data from those sensors indicates that a high level of air filtration and/or airflow is not needed. In an example, active filtration can be initiated when the oxygen level inside the mask is low or when a wearer enters a high-risk environmental situation. In this manner, a face mask can conserve energy (and prolong battery life) by only initiating active filtration only when it is needed.

In an example, an air tube (e.g. air tube, channel, or pathway) can channel airflow between an air filter and an interior space of a transparent portion of a mask. This can be especially useful when an air filter and/or an air impellor are located relatively far away from the transparent portion of the mask for esthetic and/or other design reasons. In an example, a first air tube can channel airflow between a first air filter and an interior space of a transparent portion of a mask and a second air tube can channel airflow between a second air filter and the interior space of the transparent portion of the mask. In an example, an air tube (e.g. air tube, channel, or pathway) can span a portion of the perimeter of a transparent portion of a mask. In an example, an arcuate air tube can curve around a portion of an arcuate perimeter of a transparent portion of a mask.

In an example, an air tube in a mask can have an air-impermeable section and an air-permeable (e.g. perforated) section. In an example, the air-permeable section can have holes, openings, and perforations which allow fluid communication (e.g. air flow) with the interior space of the mask. In an example, the air-impermeable section can be closer to an air filter or air impellor and the air-permeable section can be closer to the interior space of a mask. In an example, the air-permeable section can have holes, openings, and perforations which allow fluid communication (e.g. air flow) with the interior space of transparent portion of the mask. In an example, the air-impermeable section can be closer to an air filter or air impellor and the air-permeable section can be closer to the interior space of the transparent portion of a mask.

In an example, the inner diameter of an air tube (e.g. air tube, channel, or pathway) can be within the range of ⅛" to ½". In an example, the length of an air tube can be within the range of ½" to 5". In an example, between 25% and 75% of the length of an air tube can be perforated with holes. In an example, between 50% and 80% of the length of an air tube can be perforated with holes. In an example, the interior of an air tube can have a circular cross-sectional shape. In an example, the interior of an air tube can have an elliptical, oval, and/or oblong cross-sectional shape. In an example, an air tube can be detached from a mask for cleaning and then reattached.

In an example, a face mask can further comprise one or more components selected from the group consisting of: data processor, power source (e.g. battery), data transmitter/receiver, biometric and/or physiological sensor, environmental sensor, microphone, speaker, interior mask light, exterior mask light, ultraviolet light emitter in optical communication with airflow within the mask, touch screen, push buttons or switches, a strap or band which loops around the back of a person's head, and a strap or band which loops over the top of a person's head. In an example, a face mask can further comprise a microphone which is in acoustic communication with the interior of the mask (e.g. with the interior of the transparent portion) and a speaker which reproduces sound recorded by the microphone. In an example, a face mask can further comprise a microphone on the inside of the mask which records a person's voice and a speaker on the outside of the mask which reproduces the person's voice. In an example, a face mask can further comprise one or more lights on the inside of the mask which highlight a person's mouth in order to increase visibility of the person's mouth (e.g. lip motion and facial expression) by nearby people. Other design variations discussed elsewhere in this disclosure or in priority-linked disclosures can also be applied to this example where relevant.

Figure 15:
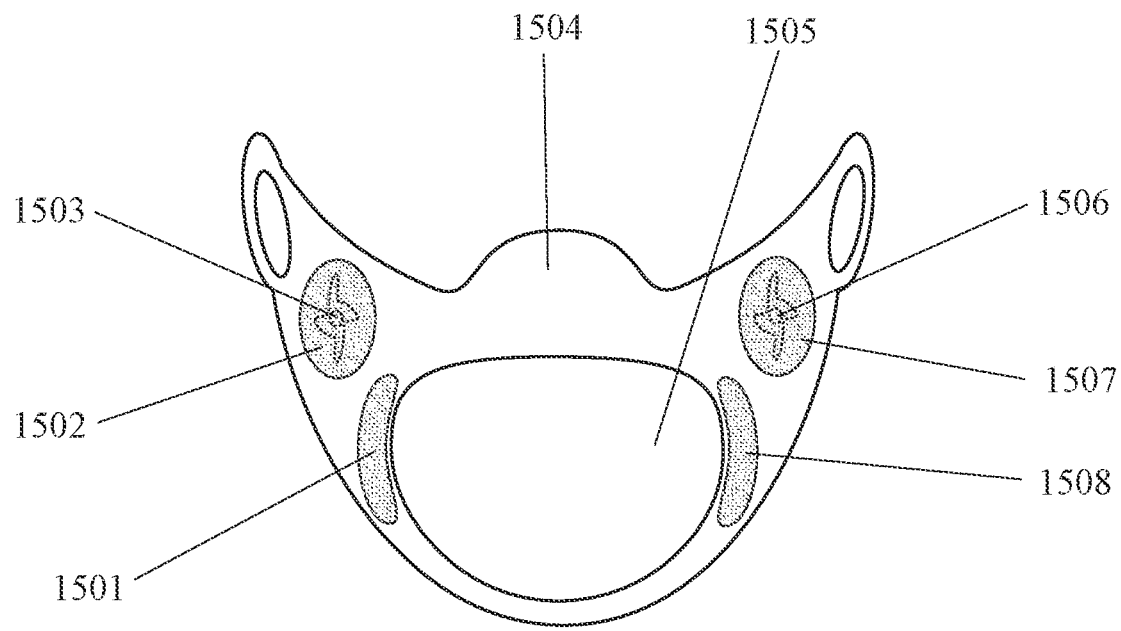
FIG. 15 shows an example of a face mask with a transparent portion, a non-transparent portion, posterior first-side and second-side air filters and impellors, and anterior first-side and second-side air filters.

FIG. 15 shows an example of a pathogen-filtering semi-transparent face mask comprising: a transparent portion 1505 of a face mask which covers at least part of a person's mouth; a non-transparent portion 1504 of the face mask which holds the transparent portion on the person's head; a posterior first-side air filter 1502 on a first side (e.g. the right side) of the mask between the person's mouth and an ear; an anterior first-side air filter 1501 on the first side of the mask between the person's mouth and an ear, wherein the anterior first-side air filter is closer to the person's mouth than the posterior first-side air filter; a first-side air impellor 1503 on the first side of the mask which moves air through the posterior first-side air filter; a posterior second-side air filter 1507 on a second side (e.g. the left side) of the mask between the person's mouth and an ear; an anterior second-side air filter 1508 on the second side of the mask between the person's mouth and an ear, wherein the anterior second-side air filter is closer to the person's mouth than the posterior second-side air filter; and a second-side air impellor 1506 on the second side of the mask which moves air through the posterior second-side air filter.

In an example, a posterior (first or second side) air filter can be between a person's mouth and an ear. In an example, a posterior air filter can be in the posterior third of the distance between a person's mouth and an ear. In an example, a posterior air filter can be in the posterior half of the distance between a person's mouth and an ear. In an example, a posterior air filter can be over (e.g. partially cover) a person's cheek. In an example, a posterior air filter can be between an air impellor and the environment. In an example, a posterior air filter can be between an air impellor and the interior of the mask. In an example, a posterior air filter on a face mask can have a circular, elliptical, or oval shape. In an example, a posterior (first or second side) air filter can be removably attached to a face mask via a clip, snap, clasp, hook, clamp, adhesive substance, or pin. In an example, a posterior air filter can be disposable. In an example, a posterior air filter can be detached from a face mask, cleaned, and then reattached to the face mask. In an example, a posterior air filter can comprise two filter layers, one layer between an air impellor and the environment and one layer between the air impellor and the interior of the mask (e.g. the space inside a concave transparent portion of the mask). In an example, a posterior air filter can further comprise a one-way airflow valve.

In an example, an anterior (first or second side) air filter can be between a person's mouth and an ear. In an example, an anterior air filter can be in the anterior third of the distance between a person's mouth and an ear. In an example, an anterior air filter can be in the anterior half of the distance between a person's mouth and an ear. In an example, an anterior air filter can be over (e.g. partially cover) a person's cheek. In an example, an anterior air filter on a face mask can have a circular, semi-circular, elliptical, or oblong shape. In an example, an anterior air filter on a face mask can curve around the right or left side perimeter of a transparent portion of a mask. In an example, an anterior air filter can be between a transparent portion of a mask and a non-transparent portion of the mask. In an example, an anterior (first or second side) air filter can be removably attached to a face mask via a clip, snap, clasp, hook, clamp, adhesive substance, or pin. In an example, an anterior air filter can be disposable. In an example, an anterior air filter can be detached from a face mask, cleaned, and then reattached to the face mask. In an example, an anterior air filter can further comprise a one-way airflow valve.

In an example, a face mask can further comprise one or more components selected from the group consisting of: data processor, power source (e.g. battery), data transmitter/receiver, biometric and/or physiological sensor, environmental sensor, microphone, speaker, interior mask light, exterior mask light, ultraviolet light emitter in optical communication with airflow within the mask, touch screen, push buttons or switches, a strap or band which loops around the back of a person's head, and a strap or band which loops over the top of a person's head. In an example, a face mask can further comprise a microphone which is in acoustic communication with the interior of the mask (e.g. with the interior of the transparent portion) and a speaker which reproduces sound recorded by the microphone. In an example, a face mask can further comprise a microphone on the inside of the mask which records a person's voice and a speaker on the outside of the mask which reproduces the person's voice. In an example, a face mask can further comprise one or more lights on the inside of the mask which highlight a person's mouth in order to increase visibility of the person's mouth (e.g. lip motion and facial expression) by nearby people. Other design variations discussed elsewhere in this disclosure or in priority-linked disclosures can also be applied to this example where relevant.

Figure 16:
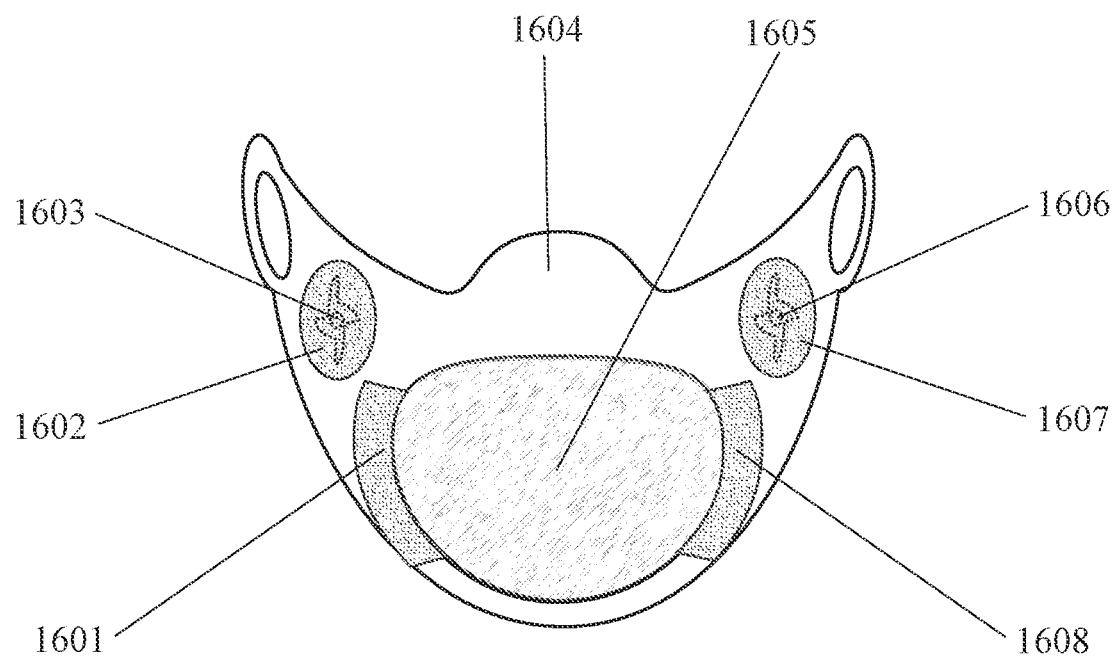
FIG. 16 shows another example of a face mask with a transparent portion, a non-transparent portion, a posterior first-side and second-side air filters and impellors, and anterior first-side and second-side air filters.

FIG. 16 shows an example of a face mask which is similar to the one shown in FIG. 15 except that the anterior right-side and left-side filters curve around the right-side and left-side perimeters, respectively, of the transparent portion of the mask. FIG. 16 shows an example of a pathogen-filtering semi-transparent face mask comprising: a transparent portion 1605 of a face mask which covers at least part of a person's mouth; a non-transparent portion 1604 of the face mask which holds the transparent portion on the person's head; a posterior first-side air filter 1602 on a first side (e.g. the right side) of the mask between the person's mouth and an ear; an anterior first-side air filter 1601 on the first side of the mask between the person's mouth and an ear, wherein the anterior first-side air filter is closer to the person's mouth than the posterior first-side air filter, and wherein the anterior first-side air filter is along the first side of the perimeter of the transparent portion; a first-side air impellor 1603 on the first side of the mask which moves air through the posterior first-side air filter; a posterior second-side air filter 1607 on a second side (e.g. the left side) of the mask between the person's mouth and an ear; an anterior second-side air filter 1608 on the second side of the mask between the person's mouth and an ear, wherein the anterior second-side air filter is closer to the person's mouth than the posterior second-side air filter, and wherein the anterior second-side air filter is along the second side of the perimeter of the transparent portion; and a second-side air impellor 1606 on the second side of the mask which moves air through the posterior second-side air filter. Other design variations discussed elsewhere in this disclosure or in priority-linked disclosures can also be applied to this example where relevant.

Figure 17:
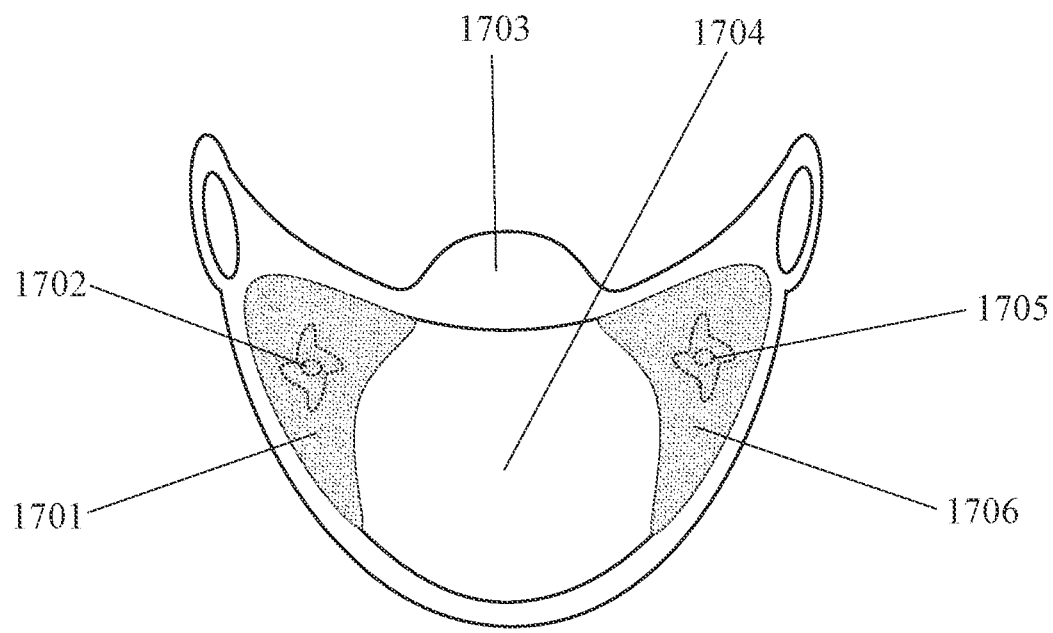
FIG. 17 shows a face mask with a transparent portion, a non-transparent portion, first-side and second-side air filters adjacent to the transparent portion, and first-side and second-side air impellors.

FIG. 17 shows an example of a pathogen-filtering semi-transparent face mask comprising: a transparent portion 1704 of a face mask which covers at least part of a person's mouth; a non-transparent portion 1703 of the face mask which holds the transparent portion on the person's head; a first-side air filter 1701 on a first side (e.g. the right side) of the mask between the person's mouth and an ear, wherein the first-side air filter is adjacent to the transparent portion; a first-side air impellor 1702 on the first side of the mask which moves air through the first-side air filter; a second-side air filter 1706 on a second side (e.g. the left side) of the mask between the person's mouth and an ear, wherein the second-side air filter is adjacent to the transparent portion; and a second-side air impellor 1705 on the second side of the mask which moves air through the second-side air filter.

In an example, a (first or second) side air filter can be adjacent to the (first or second) side perimeter of a transparent portion of the mask. In an example, a (first or second) side air filter can be contiguous to the (first or second) side perimeter of the transparent portion. In an example, a (first or second) side air filter can curve around the (first or second) side perimeter of the transparent portion. In an example, a (first or second) side air filter can span between 10% and 50% of the perimeter of the transparent portion. In an example, a (first or second) side air filter can span between 20% and 40% of the perimeter of the transparent portion. In an example, a (first or second) side air filter can span between 20% and 80% of the distance between a person's mouth and an ear. In an example, a (first or second) side air filter can span between 20% and 80% of the distance between a person's nose and the bottom of their jaw. In an example, a (first or second) side air filter can have a shape selected from the group consisting of: conic section; rounded arrowhead shape; StarTrek™ communications badge shape (OK, so I am nerd, but that is what it looks like to me); and Nike™ logo swoosh shape (OK, so I know a little about sports logos, but I am still a nerd). Other design variations discussed elsewhere in this disclosure or in priority-linked disclosures can also be applied to this example where relevant.

Figure 18:
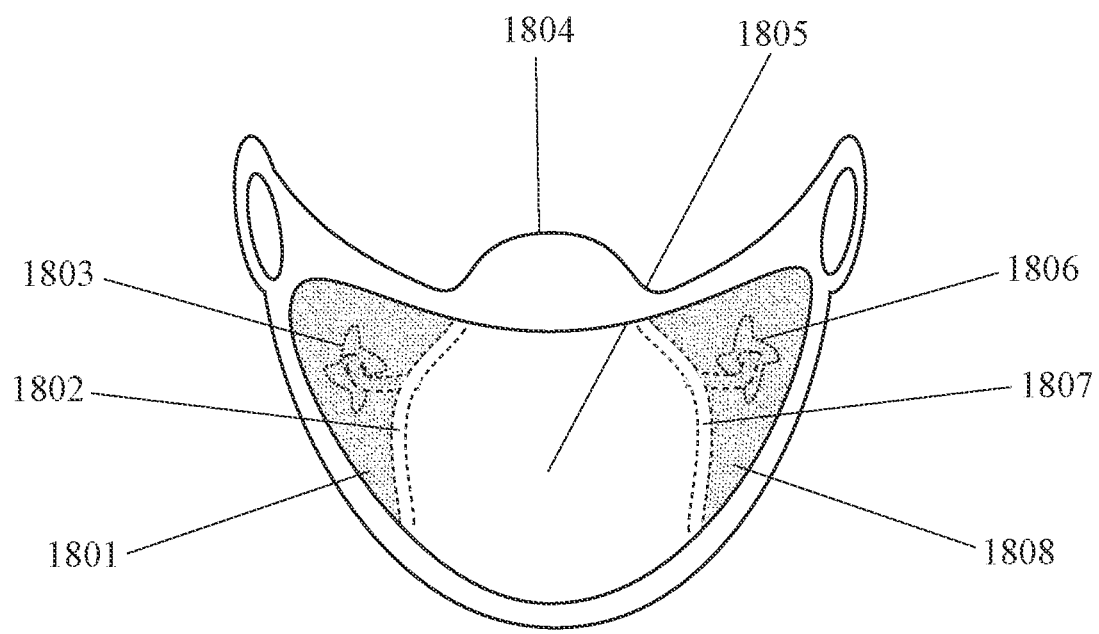
FIG. 18 shows a face mask with a transparent portion, a non-transparent portion, first-side and second-side air filters adjacent to the transparent portion, first-side and second-side air impellors, and air tubes or channels.

FIG. 18 shows an example of a face mask which is similar to the one shown in FIG. 17 except that it includes air tubes (or channels) which direct airflow between air filters and the transparent portion of the mask. FIG. 18 shows an example of a pathogen-filtering semi-transparent face mask comprising: a transparent portion 1805 of a face mask which covers at least part of a person's mouth; a non-transparent portion 1804 of the face mask which holds the transparent portion on the person's head; a first-side air filter 1801 on a first side (e.g. the right side) of the mask between the person's mouth and an ear, wherein the first-side air filter is adjacent to the transparent portion; a first-side air impellor 1803 on the first side of the mask which moves air through the first-side air filter; a first-side air tube (or channel) 1802 which directs airflow between the first-side air filter and the transparent portion; a second-side air filter 1808 on a second side (e.g. the left side) of the mask between the person's mouth and an ear, wherein the second-side air filter is adjacent to the transparent portion; a second-side air impellor 1806 on the second side of the mask which moves air through the second-side air filter; and a second-side air tube (or channel) 1807 which directs airflow between the second-side air filter and the transparent portion.

In an example, a (first or second) side air filter can be adjacent to the (first or second) side perimeter of a transparent portion of the mask. In an example, a (first or second) side air filter can be contiguous to the (first or second) side perimeter of the transparent portion. In an example, a (first or second) side air filter can curve around the (first or second) side perimeter of the transparent portion. In an example, a (first or second) side air filter can span between 10% and 50% of the perimeter of the transparent portion. In an example, a (first or second) side air filter can span between 20% and 40% of the perimeter of the transparent portion. In an example, a (first or second) side air filter can span between 20% and 80% of the distance between a person's mouth and an ear. In an example, a (first or second) side air filter can span between 20% and 80% of the distance between a person's nose and the bottom of their jaw. In an example, a (first or second) side air filter can have a shape selected from the group consisting of: conic section; rounded arrowhead shape; StarTrek™ communications badge shape (OK, so I am nerd, but that is what it looks like to me); and Nike™ logo swoosh shape (OK, so I know a little about sports logos, but I am still a nerd).

In an example, an air tube (e.g. air tube, channel, or pathway) can channel airflow between an air filter and an interior space of a transparent portion of a mask. This can be especially useful when an air filter and/or an air impellor are located relatively far away from the transparent portion of the mask for esthetic and/or other design reasons. In an example, a first air tube can channel airflow between a first air filter and an interior space of a transparent portion of a mask and a second air tube can channel airflow between a second air filter and the interior space of the transparent portion of the mask. In an example, an air tube (e.g. air tube, channel, or pathway) can span a portion of the perimeter of a transparent portion of a mask. In an example, an arcuate air tube can curve around a portion of an arcuate perimeter of a transparent portion of a mask.

In an example, an air tube in a mask can have an air-impermeable section and an air-permeable (e.g. perforated) section. In an example, the air-permeable section can have holes, openings, and perforations which allow fluid communication (e.g. air flow) with the interior space of the mask. In an example, the air-impermeable section can be closer to an air filter or air impellor and the air-permeable section can be closer to the interior space of a mask. In an example, the air-permeable section can have holes, openings, and perforations which allow fluid communication (e.g. air flow) with the interior space of transparent portion of the mask. In an example, the air-impermeable section can be closer to an air filter or air impellor and the air-permeable section can be closer to the interior space of the transparent portion of a mask.

In an example, the inner diameter of an air tube (e.g. air tube, channel, or pathway) can be within the range of ⅛" to ½". In an example, the length of an air tube can be within the range of ½" to 5". In an example, between 25% and 75% of the length of an air tube can be perforated with holes. In an example, between 50% and 80% of the length of an air tube can be perforated with holes. In an example, the interior of an air tube can have a circular cross-sectional shape. In an example, the interior of an air tube can have an elliptical, oval, and/or oblong cross-sectional shape. In an example, an air tube can be detached from a mask for cleaning and then reattached. Other design variations discussed elsewhere in this disclosure or in priority-linked disclosures can also be applied to this example where relevant.

Figure 19:
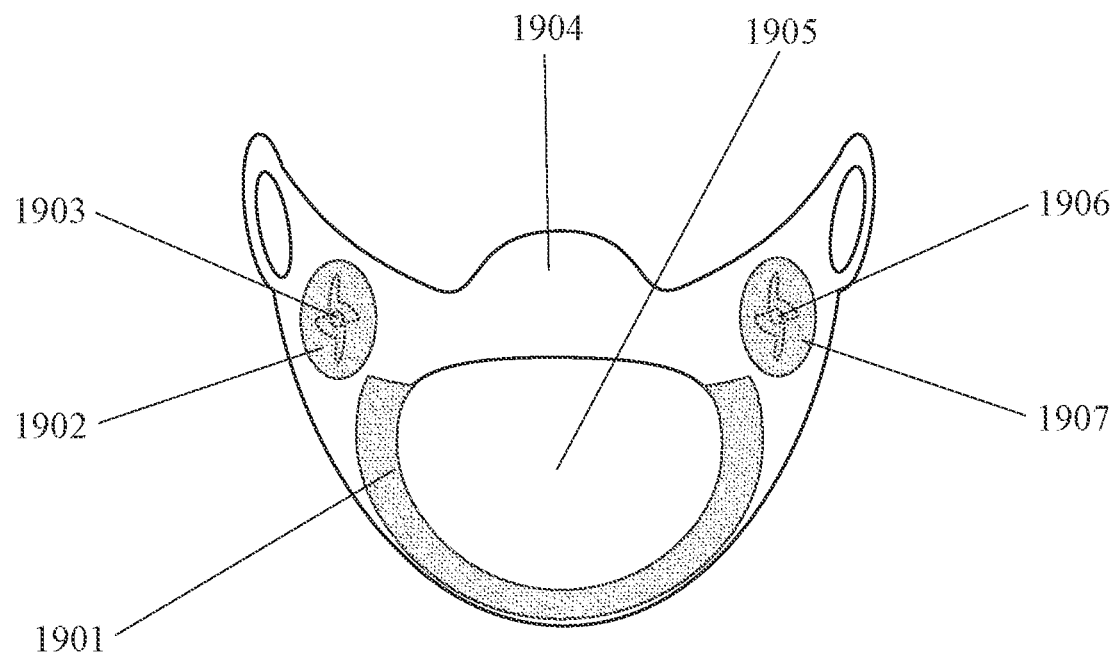
FIG. 19 shows a face mask with a transparent portion, a non-transparent portion, first-side and second-side air filters and impellors, and a concave air filter.

FIG. 19 shows an example of a pathogen-filtering semi-transparent face mask comprising: a transparent portion 1905 of a face mask which covers at least part of a person's mouth; a non-transparent portion 1904 of the face mask which holds the transparent portion on the person's head; a first-side air filter 1902 on a first side (e.g. the right side) of the mask between the person's mouth and an ear; a first-side air impellor 1903 on the first side of the mask which moves air through the first-side air filter; a second-side air filter 1907 on a second side (e.g. the left side) of the mask between the person's mouth and an ear; a second-side air impellor 1906 on the second side of the mask which moves air through the second-side air filter; and a concave air filter 1901 with a concavity which opens upwards toward the person's mouth.

In an example, a concave air filter can have a concavity which opens upwards toward a person's mouth. In an example, at least a part of a person's mouth enclosed within and/or surrounded by the concavity of a concave air filter. In an example, a lower portion of a concave air filter can be below a person's mouth. In an example, a lower portion of a concave air filter can be on a person's jaw and/or chin. In an example, a lower portion of a concave air filter can be along a person's jaw and/or chin. In an example, a concave air filter can span from a first side (e.g. the right side) of a transparent portion of a mask to a second side (e.g. the left side) of the transparent portion. In an example, a concave air filter can span the perimeter of a transparent portion of a mask from a first side (e.g. the right side) of the transparent portion to a second side (e.g. the left side) of the transparent portion. In an example, a concave air filter can have a smile shape which could cause the wearer to be mistaken for Pikachu.

In an example, a concave air filter can span half of the perimeter of a transparent portion of a mask. In an example, a concave air filter can span between 15% and 60% of the perimeter of a transparent portion of a mask. In an example, a concave air filter can span two-third of the perimeter of a transparent portion of a mask. In an example, a concave air filter can span between 30% and 75% of the perimeter of a transparent portion of a mask. In an example, a concave air filter can have a width within the range of ¼" to 1". In an example, a concave air filter can have an arcuate length within the range of ¾" to 6". Other design variations discussed elsewhere in this disclosure or in priority-linked disclosures can also be applied to this example where relevant.

Figure 20:
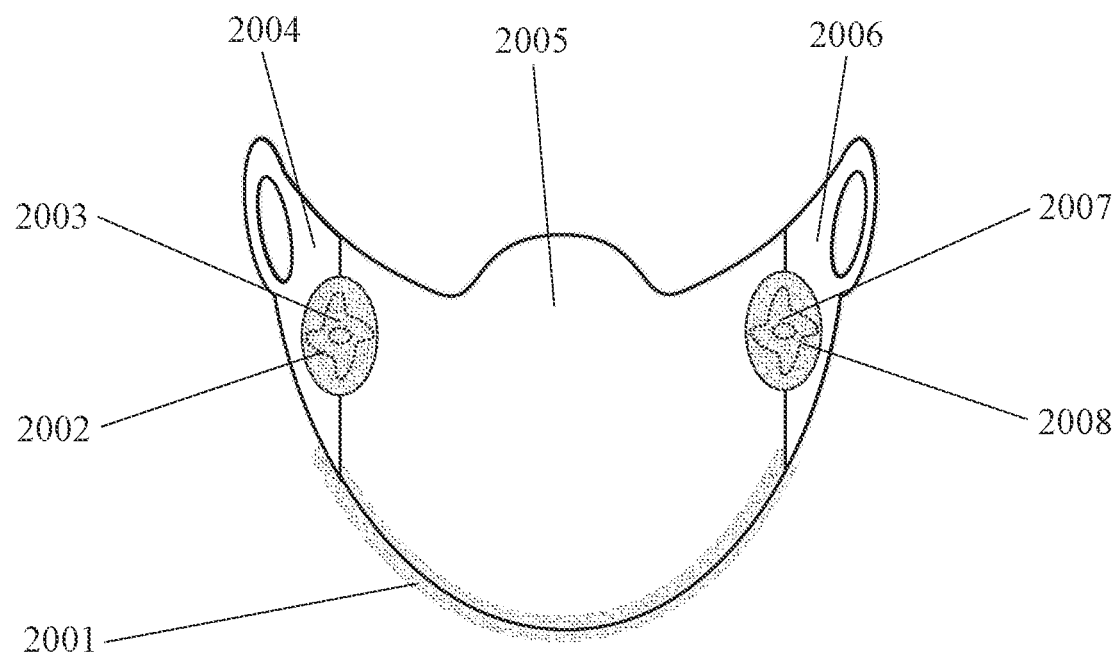
FIG. 20 shows a face mask with a transparent portion, a non-transparent portion, first-side and second-side air filters and impellors, and a lower perimeter air filter.

FIG. 20 shows an example of a pathogen-filtering semi-transparent face mask comprising: a transparent portion 2005 of a face mask which covers at least part of a person's mouth; non-transparent portions 2004 and 2006 of the face mask which hold the transparent portion on the person's head; a first-side air filter 2002 on a first side (e.g. the right side) of the transparent portion; a first-side air impellor 2003 which moves air through the first-side air filter; a second-side air filter 2008 on a second side (e.g. the left side) of the transparent portion; a second-side air impellor 2007 which moves air through the second-side air filter; and a concave air filter 2001 with a concavity which opens upwards toward the person's mouth.

In an example, a concave air filter can have a concavity which opens upwards toward a person's mouth. In an example, at least a part of a person's mouth enclosed within and/or surrounded by the concavity of a concave air filter. In an example, a lower portion of a concave air filter can be below a person's mouth. In an example, a lower portion of a concave air filter can be on a person's jaw and/or chin. In an example, a lower portion of a concave air filter can be along a person's jaw and/or chin. In an example, a concave air filter can span from a first side (e.g. the right side) of a transparent portion of a mask to a second side (e.g. the left side) of the transparent portion. In an example, a concave air filter can span the perimeter of a transparent portion of a mask from a first side (e.g. the right side) of the transparent portion to a second side (e.g. the left side) of the transparent portion. In an example, a concave air filter can have a smile shape.

In an example, a concave air filter can span half of the perimeter of a transparent portion of a mask. In an example, a concave air filter can span between 15% and 60% of the perimeter of a transparent portion of a mask. In an example, a concave air filter can span two-third of the perimeter of a transparent portion of a mask. In an example, a concave air filter can span between 30% and 75% of the perimeter of a transparent portion of a mask. In an example, a concave air filter can have a width within the range of ¼" to 1". In an example, a concave air filter can have an arcuate length within the range of ¾" to 6". Other design variations discussed elsewhere in this disclosure or in priority-linked disclosures can also be applied to this example where relevant.

Figure 21:
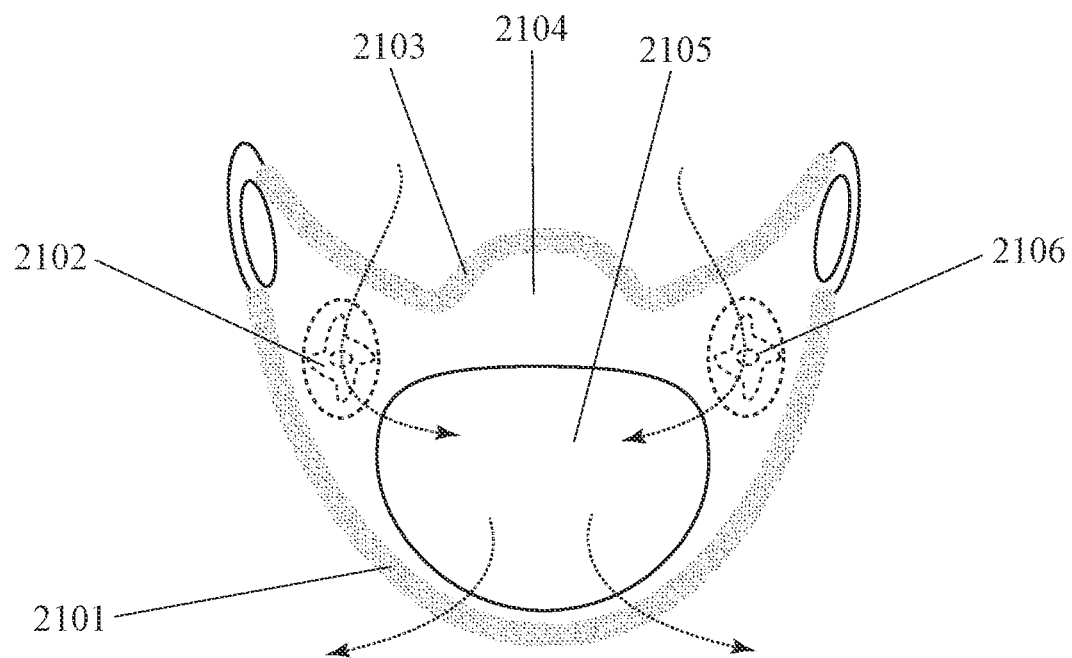
FIG. 21 shows a face mask with a transparent portion, a non-transparent portion, first-side and second-side air filters and impellors, an upper-perimeter air filter, and a lower-perimeter air filter.

FIG. 21 shows an example of a pathogen-filtering semi-transparent face mask comprising: a transparent portion 2105 of a face mask which covers at least part of a person's mouth; a non-transparent portion 2104 of the face mask which holds the transparent portion on the person's head; an upper-perimeter air filter 2103 which spans at least part of the upper perimeter of the mask, including a portion of the mask perimeter around the person's nose; a lower-perimeter air filter 2101 which spans at least part of the lower perimeter of the mask, including a portion of the mask perimeter around the person's jaw and/or chin; a first-side air impellor 2102 which draws air into the mask through the upper-perimeter air filter; and a second-side air filter 2106 which draws air into the mask through the upper-perimeter air filter.

In an example, an upper perimeter air filter can be a single continuous air filter which spans from a first side (e.g. the right side) of a mask to a second side (e.g. the left side) of the mask. In an example, an upper perimeter air filter can comprise two separate air filters, one on a first side (e.g. the right side) of a mask and one on a second side (e.g. the left side) of the mask. In an example, an upper perimeter air filter can comprise two separate air filters, one to a first side (e.g. to the right) of a person's nose and one to a second side (e.g. to the left) of the person's nose. In an example, an upper perimeter air filter can span between 30% and 50% of the upper perimeter of a mask. In an example, an upper perimeter air filter can span between 30% and 50% of the upper perimeter of a mask between a person's ears. In an example, an upper perimeter air filter can span between 20% and 90% of the upper perimeter of a mask. In an example, an upper perimeter air filter can span between 20% and 90% of the upper perimeter of a mask between a person's ears.

In an example, a lower perimeter air filter can be a single continuous air filter which spans from a first side (e.g. the right side) of a mask to a second side (e.g. the left side) of the mask. In an example, a lower perimeter air filter can comprise two separate air filters, one on a first side (e.g. the right side) of a mask and one on a second side (e.g. the left side) of the mask. In an example, a lower perimeter air filter can comprise two separate air filters, one to a first side (e.g. to the right) of a person's chin and one to a second side (e.g. to the left) of the person's chin. In an example, a lower perimeter air filter can span between 30% and 50% of the lower perimeter of a mask. In an example, a lower perimeter air filter can span between 30% and 50% of the lower perimeter of a mask along a person's jaw. In an example, a lower perimeter air filter can span between 20% and 90% of the lower perimeter of a mask. In an example, a lower perimeter air filter can span between 20% and 90% of the lower perimeter of a mask along a person's jaw. Other design variations discussed elsewhere in this disclosure or in priority-linked disclosures can also be applied to this example where relevant.

Figure 22:
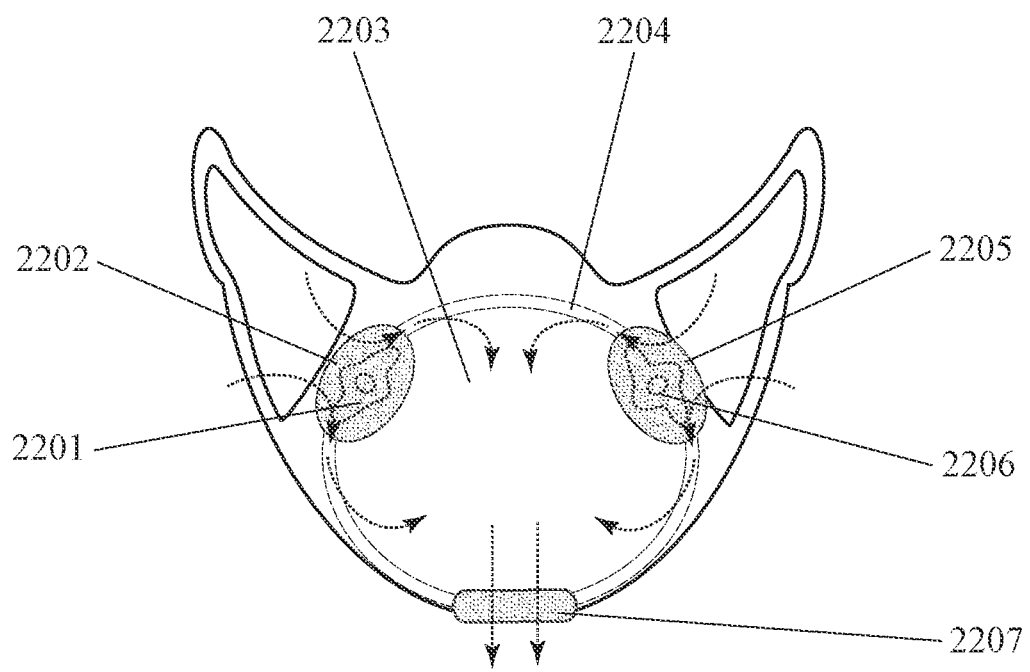
FIG. 22 shows a face mask with a transparent portion, first-side and second-side air filters and impellors, a lower air filter below the person's mouth, and air tubes or channels.

FIG. 22 shows an example of a pathogen-filtering semi-transparent face mask comprising: a transparent portion 2203 of a face mask which covers at least part of a person's mouth; a first-side air filter 2202 on a first side (e.g. the right side) of the mask between the person's mouth and an ear; a first-side air impellor 2201 which moves air through the first-side air filter; a second-side air filter 2205 on a second side (e.g. the left side) of the mask between the person's mouth and an ear; a second-side air impellor 2206 which moves air through the second-side air filter; an air tube (or channel) 2204 which directs airflow between the first-side air filter and/or the second-side air filter and the transparent portion; and a lower air filter 2207 below the person's mouth.

In an example, an air tube (e.g. air tube, channel, or pathway) can channel airflow between one or more air filters and an interior space of a transparent portion of a mask. This can be especially useful when an air filter and/or an air impellor are located relatively far away from the transparent portion of the mask for esthetic and/or other design reasons. In an example, a first air tube can channel airflow between a first air filter and an interior space of a transparent portion of a mask and a second air tube can channel airflow between a second air filter and the interior space of the transparent portion of the mask. In an example, an air tube (e.g. air tube, channel, or pathway) can span a portion of the perimeter of a transparent portion of a mask. In an example, an arcuate air tube can curve around a portion of an arcuate perimeter of a transparent portion of a mask.

In an example, an air tube in a mask can have an air-impermeable section and an air-permeable (e.g. perforated) section. In an example, the air-permeable section can have holes, openings, and perforations which allow fluid communication (e.g. air flow) with the interior space of the mask. In an example, the air-impermeable section can be closer to an air filter or air impellor and the air-permeable section can be closer to the interior space of a mask. In an example, the air-permeable section can have holes, openings, and perforations which allow fluid communication (e.g. air flow) with the interior space of transparent portion of the mask. In an example, the air-impermeable section can be closer to an air filter or air impellor and the air-permeable section can be closer to the interior space of the transparent portion of a mask.

In an example, the inner diameter of an air tube (e.g. air tube, channel, or pathway) can be within the range of ⅛" to ½". In an example, the length of an air tube can be within the range of ½" to 5". In an example, between 25% and 75% of the length of an air tube can be perforated with holes. In an example, between 50% and 80% of the length of an air tube can be perforated with holes. In an example, the interior of an air tube can have a circular cross-sectional shape. In an example, the interior of an air tube can have an elliptical, oval, and/or oblong cross-sectional shape. In an example, an air tube can be detached from a mask for cleaning and then reattached.

In an example, an air filter can have a circular shape. In an example, an air filter can have an arcuate shape. In an example, an air filter can be removably attached to a face mask via a clip, snap, clasp, hook, clamp, adhesive substance, or pin. In an example, an air filter can be disposable. In an example, an air filter can be detached from a face mask, cleaned, and then reattached to the face mask. In an example, an air filter can be located along the perimeter of a transparent portion of a face mask. In an example, a side air filter can be located between a person's mouth and an ear. In an example, a lower air filter can be located in the lower half of the transparent portion of a face mask. In an example, a lower air filter can be located on a person's jaw and/or chin. In an example, an air filter can be located below a person's jaw and/or chin.

In an example, when the first-side air impellor and/or second-side air impellor are in operation then: airflow through the first-side air filter and/or second-side air filter can be primarily (or entirely) from the environment into the interior of the mask; and airflow through the lower air filter can be primarily (or entirely) from the interior of the mask out into environment. In an example, when the first-side air impellor and second-side air impellor are not in operation then: airflow through the first-side air filter, the second-side air filter, and/or the lower air filter can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 23:
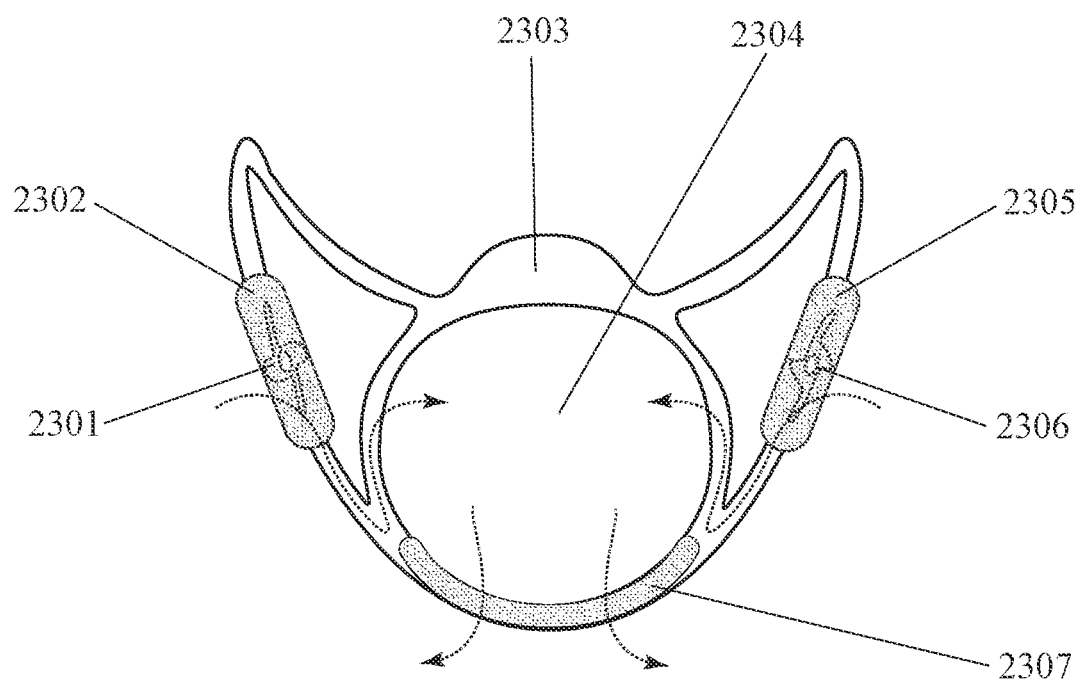
FIG. 23 shows a face mask with a transparent portion, a non-transparent portion, first-side and second-side air filters and impellors which are close to a person's ears, and a lower air filter below the person's mouth.

FIG. 23 shows an example of a pathogen-filtering semi-transparent face mask comprising: a transparent portion 2304 of a face mask which covers at least part of a person's mouth; a non-transparent portion 2303 of the mask which holds the transparent portion on the person's head; a first-side air filter 2302 on a first side (e.g. the right side) of the mask, wherein the portion of the perimeter of the first-side air filter which is closest to the person's first side ear is within 2" of the first side ear; a first-side air impellor 2301 which moves air through the first-side air filter; a second-side air filter 2305 on a second side (e.g. the left side) of the mask, wherein the portion of the perimeter of the second-side air filter which is closest to the person's second side ear is within 2" of the second side ear; a second-side air impellor 2306 which moves air through the second-side air filter; and a lower air filter 2307 below the person's mouth.

In an example, a transparent portion of a face mask can have a circular, elliptical, oval, or egg-shaped perimeter. In an example, a transparent portion of a face mask can have a polygonal (e.g. hexagonal or octagonal) perimeter. In an example, a transparent portion of a face mask can be concave, wherein the concavity opens toward a person's mouth. In an example, a transparent portion can have a hemispherical shape. In an example, a transparent portion can have a shape which is a section of a sphere, ellipsoid, or oblate spheroid. In an example, a transparent portion can have a saddle shape or a bicycle seat shape. In an example, a transparent portion can have a cardioid shape. In an example, a transparent portion can have a kidney shape.

In an example, a non-transparent portion of a mask can include (or comprise) straps or bands which loop around a person's ears to hold a transparent portion of the mask on the person's head. In an example, a non-transparent portion of a mask can include (or comprise) straps or bands which loop around the back of a person's head to hold a transparent portion of the mask on the person's head. In an example, first-side and second-side air filters can be located on such straps or bands. In an example, air can flow through straps or bands between air filters and a transparent portion of a mask.

In an example, the portion of the perimeter of a (first or second) side air filter which is closest to the person's (first or second) side ear can be within 1" of the (first or second) side ear. In an example, an air filter can have a circular shape. In an example, an air filter can have an arcuate shape. In an example, an air filter can be removably attached to a face mask via a clip, snap, clasp, hook, clamp, adhesive substance, or pin. In an example, an air filter can be disposable. In an example, an air filter can be detached from a face mask, cleaned, and then reattached to the face mask. In an example, an air filter can be located along the perimeter of a transparent portion of a face mask. In an example, a side air filter can be located between a person's mouth and an ear. In an example, a lower air filter can be located in the lower half of the transparent portion of a face mask. In an example, a lower air filter can be located on a person's jaw and/or chin. In an example, an air filter can be located below a person's jaw and/or chin.

In an example, when the first-side air impellor and/or second-side air impellor are in operation then: airflow through the first-side air filter and/or second-side air filter can be primarily (or entirely) from the environment into the interior of the mask; and airflow through the lower air filter can be primarily (or entirely) from the interior of the mask out into environment. In an example, when the first-side air impellor and second-side air impellor are not in operation then: airflow through the first-side air filter, the second-side air filter, and/or the lower air filter can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 24:
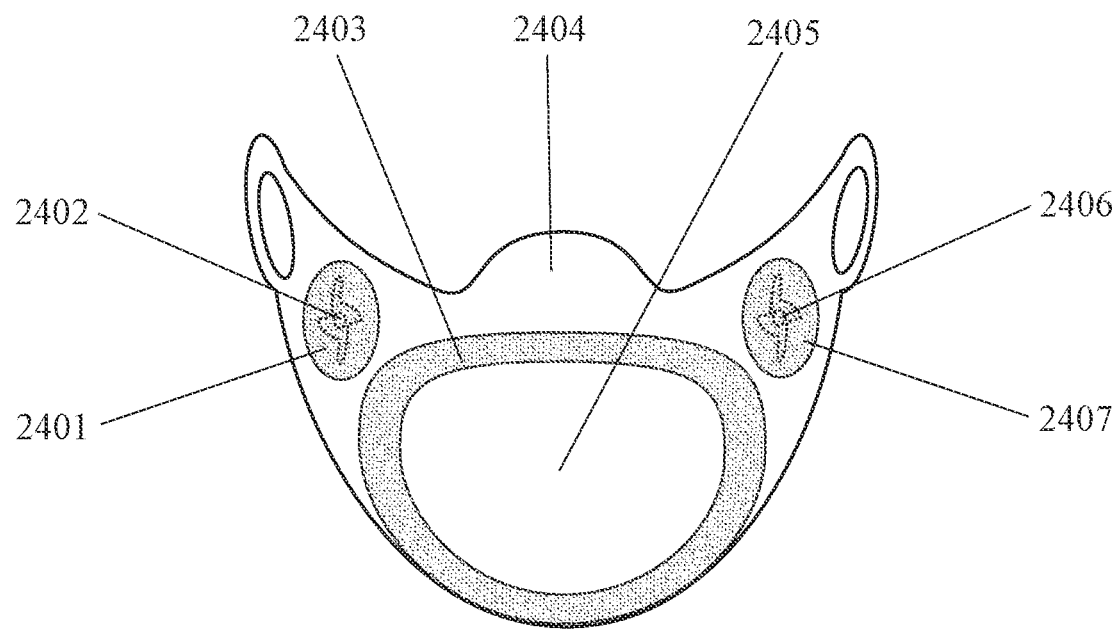
FIG. 24 shows a face mask with a transparent portion, a non-transparent portion, first-side and second-side air filters and impellors, and a perimeter air filter around the transparent portion.

FIG. 24 shows an example of a pathogen-filtering semi-transparent face mask comprising: a transparent portion 2405 of a face mask which covers at least part of a person's mouth; a non-transparent portion 2404 of the mask which holds the transparent portion on the person's head; a first-side air filter 2401 on a first side (e.g. the right side) of the mask; a first-side air impellor 2402 which moves air through the first-side air filter; a second-side air filter 2407 on a second side (e.g. the left side) of the mask; a second-side air impellor 2406 which moves air through the second-side air filter; and a perimeter air filter 2403 which spans at least 80% of the perimeter of the transparent portion.

In an example, a transparent portion of a face mask can have a circular, elliptical, oval, or egg-shaped perimeter. In an example, a transparent portion of a face mask can have a polygonal (e.g. hexagonal or octagonal) perimeter. In an example, a transparent portion of a face mask can be concave, wherein the concavity opens toward a person's mouth. In an example, a transparent portion can have a hemispherical shape. In an example, a transparent portion can have a shape which is a section of a sphere, ellipsoid, or oblate spheroid. In an example, a transparent portion can have a saddle shape or a bicycle seat shape. In an example, a transparent portion can have a cardioid shape. In an example, a transparent portion can have a kidney shape.

In an example, a perimeter air filter can span at least 80% of the perimeter of the transparent portion of a face mask. In an example, a perimeter air filter can curve around at least 80% of the perimeter of the transparent portion of a face mask. In an example, a perimeter air filter can follow at least 80% of the perimeter of the transparent portion of a face mask. In an example, a perimeter air filter can encircle at least 80% of the perimeter of the transparent portion of a face mask. In an example, a perimeter air filter can span the entire perimeter of the transparent portion of a face mask. In an example, a perimeter air filter can be between the transparent portion and the transparent portion of a face mask.

In an example, when the first-side air impellor and/or second-side air impellor are in operation then: airflow through the first-side air filter and/or second-side air filter can be primarily (or entirely) from the environment into the interior of the mask; and airflow through the perimeter air filter can be primarily (or entirely) from the interior of the mask out into environment. In an example, when the first-side air impellor and second-side air impellor are not in operation then: airflow through the first-side air filter, the second-side air filter, and/or the perimeter air filter can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 25:
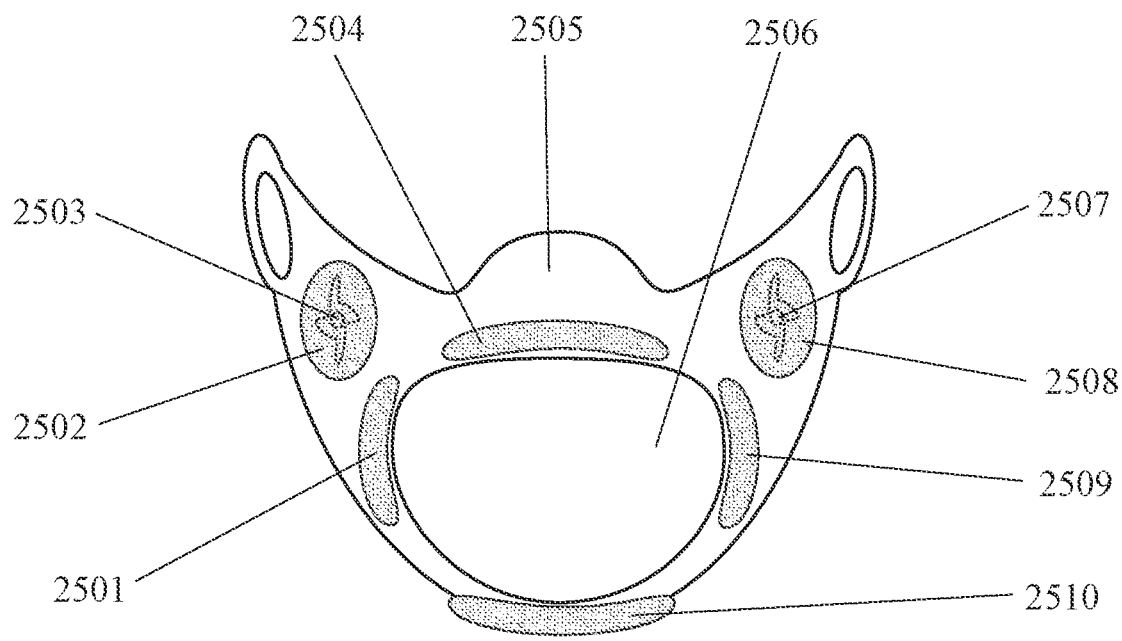
FIG. 25 shows a face mask with a transparent portion, a non-transparent portion, first-side and second-side air filters and impellors, and four air filters around the transparent portion.

FIG. 25 shows an example of a pathogen-filtering semi-transparent face mask comprising: a transparent portion 2506 of a face mask which covers at least part of a person's mouth; a non-transparent portion 2505 of the mask which holds the transparent portion on the person's head; a first-side air filter 2502 on a first side (e.g. the right side) of the mask, wherein the portion of the perimeter of the first-side air filter which is closest to the person's first side ear is within 2" of the first side ear; a first-side air impellor 2503 which moves air through the first-side air filter; a second-side air filter 2508 on a second side (e.g. the left side) of the mask, wherein the portion of the perimeter of the second-side air filter which is closest to the person's second side ear is within 2" of the second side ear; a second-side air impellor 2507 which moves air through the second-side air filter; and an perimeter array of air filters (2501, 2504, 2509, and 2510) around the perimeter of the transparent portion.

In an example, a perimeter array of air filters can comprise four air filters around the perimeter of a transparent portion of the mask. In an example, a perimeter array of air filters can comprise six or more air filters around the perimeter of a transparent portion of the mask. In an example, a perimeter array of air filters can be an arcuate array of air filters. In an example, a perimeter array of air filters can be a circular, elliptical, or oval array of air filters. In an example, a perimeter array of air filters can be a polygonal array of air filters. In an example, a perimeter array of air filters can be a quadrilateral, hexagonal, or octagonal array of air filters. In an example, a perimeter array of air filters can span at least 75% of the perimeter of a transparent portion of the mask.

In an example, when the first-side air impellor and/or second-side air impellor are in operation then: airflow through the first-side air filter and/or second-side air filter can be primarily (or entirely) from the environment into the interior of the mask; and airflow through the perimeter array of air filters can be primarily (or entirely) from the interior of the mask out into environment. In an example, when the first-side air impellor and second-side air impellor are not in operation then: airflow through the first-side air filter, the second-side air filter, and/or the perimeter array of air filters can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 26:
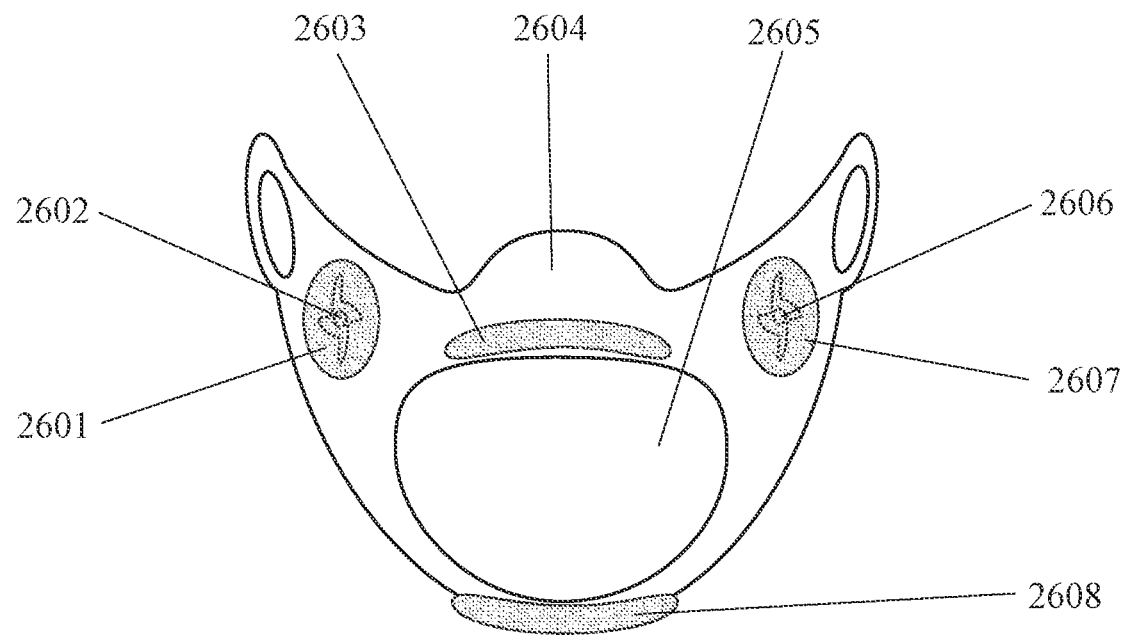
FIG. 26 shows a face mask with a transparent portion, a non-transparent portion, first-side and second-side air filters and impellors, and upper and lower air filters around the transparent portion.

FIG. 26 shows an example of a pathogen-filtering semi-transparent face mask comprising: a transparent portion 2605 of a face mask which covers at least part of a person's mouth; a non-transparent portion 2604 of the mask which holds the transparent portion on the person's head; a first-side air filter 2601 on a first side (e.g. the right side) of the mask, wherein the portion of the perimeter of the first-side air filter which is closest to the person's first side ear is within 2" of the first side ear; a first-side air impellor 2602 which moves air through the first-side air filter; a second-side air filter 2607 on a second side (e.g. the left side) of the mask, wherein the portion of the perimeter of the second-side air filter which is closest to the person's second side ear is within 2" of the second side ear; a second-side air impellor 2606 which moves air through the second-side air filter; an upper-perimeter air filter 2603 on the upper perimeter of the transparent portion above the person's mouth; and a lower-perimeter air filter 2608 on the lower perimeter of the transparent portion below the person's mouth.

In an example, an upper-perimeter air filter can be above a person's mouth and below the person's nose. In an example, an upper-perimeter air filter can be over a person's nose nostrils. In an example, an upper-perimeter air filter can span between 20% and 50% of the perimeter of a transparent portion of the mask. In an example, a lower-perimeter air filter can be below a person's mouth and above their chin. In an example, an upper-perimeter air filter can be on a person's jaw or chin. In an example, a lower-perimeter air filter can span between 20% and 50% of the perimeter of a transparent portion of the mask.

In an example, when the first-side air impellor and/or second-side air impellor are in operation then: airflow through the first-side air filter and/or second-side air filter can be primarily (or entirely) from the environment into the interior of the mask; and airflow through the (upper and lower) perimeter air filters can be primarily (or entirely) from the interior of the mask out into environment. In an example, when the first-side air impellor and second-side air impellor are not in operation then: airflow through the first-side air filter, the second-side air filter, and/or the (upper and lower) perimeter air filters can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 27:
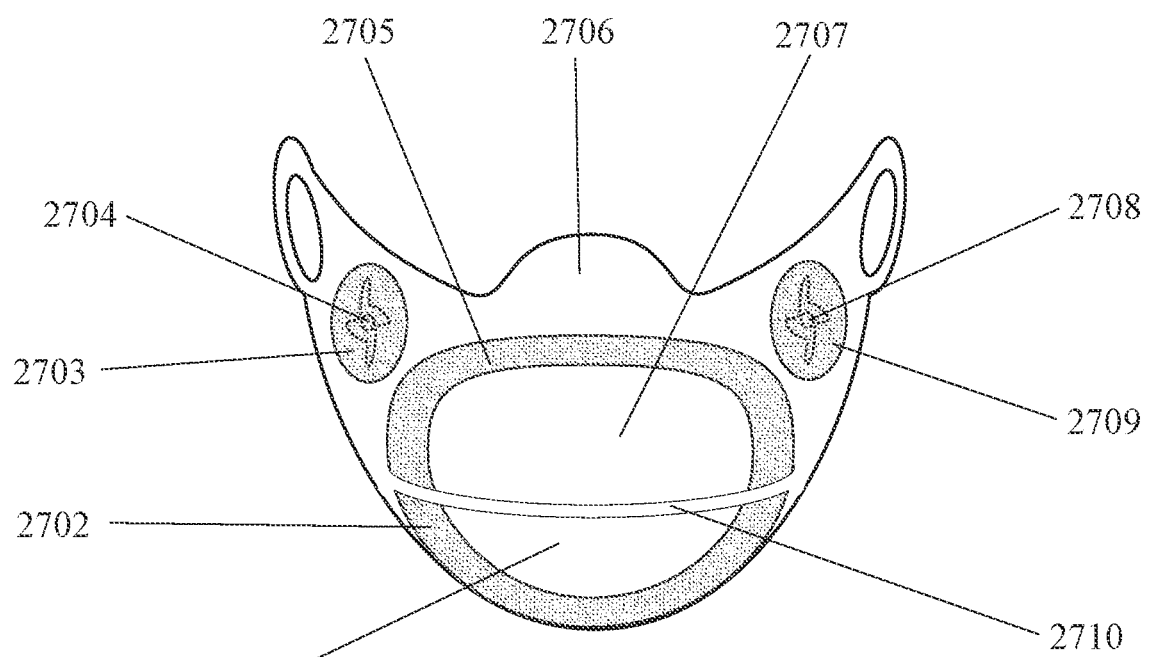
FIG. 27 shows a face mask with a transparent portion which is divided by a flexible section, a non-transparent portion, first-side and second-side air filters and impellors, and upper and lower air filters around the transparent portion.

FIG. 27 shows an example of a pathogen-filtering semi-transparent face mask comprising: an transparent portion of a face mask which covers at least part of a person's mouth, wherein the transparent portion further comprises an upper transparent section 2707 and a lower transparent section

2701; a flexible section 2710 between the upper transparent section and the lower transparent section; a perimeter air filter around at least 80% of the perimeter of the transparent portion, wherein the perimeter air filter further comprises an upper filter section 2705 and a lower filter section 2702; a non-transparent portion 2706 of the mask which holds the transparent portion on the person's head; a first-side air filter 2703 on a first side (e.g. the right side) of the mask; a first-side air impellor 2704 which moves air through the first-side air filter; a second-side air filter 2709 on a second side (e.g. the left side) of the mask; and a second-side air impellor 2708 which moves air through the second-side air filter.

In an example, a flexible section between an upper transparent section and a lower transparent section can enable the upper transparent section and the lower transparent section to move relative to each other. This can enable a person to move their jaw and mouth more than if the transparent portion were a single contiguous inflexible structure. In an example, the flexible section between an upper transparent section and a lower transparent section can be a longitudinal flexible strip or band which spans the transparent section from a first side (e.g. the right side) to a second side (e.g. the left side). In an example, the flexible section can have a width in the range of ¼" to ¾". In an example, the flexible section can be stretchable and/or elastic. In an example, the flexible section can also be between an upper filter section and a lower filter section.

In an example, when the first-side air impellor and/or second-side air impellor are in operation then: airflow through the first-side air filter and/or second-side air filter can be primarily (or entirely) from the environment into the interior of the mask; and airflow through the perimeter air filter can be primarily (or entirely) from the interior of the mask out into environment. In an example, when the first-side air impellor and second-side air impellor are not in operation then: airflow through the first-side air filter, the second-side air filter, and/or the perimeter air filter can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 28:
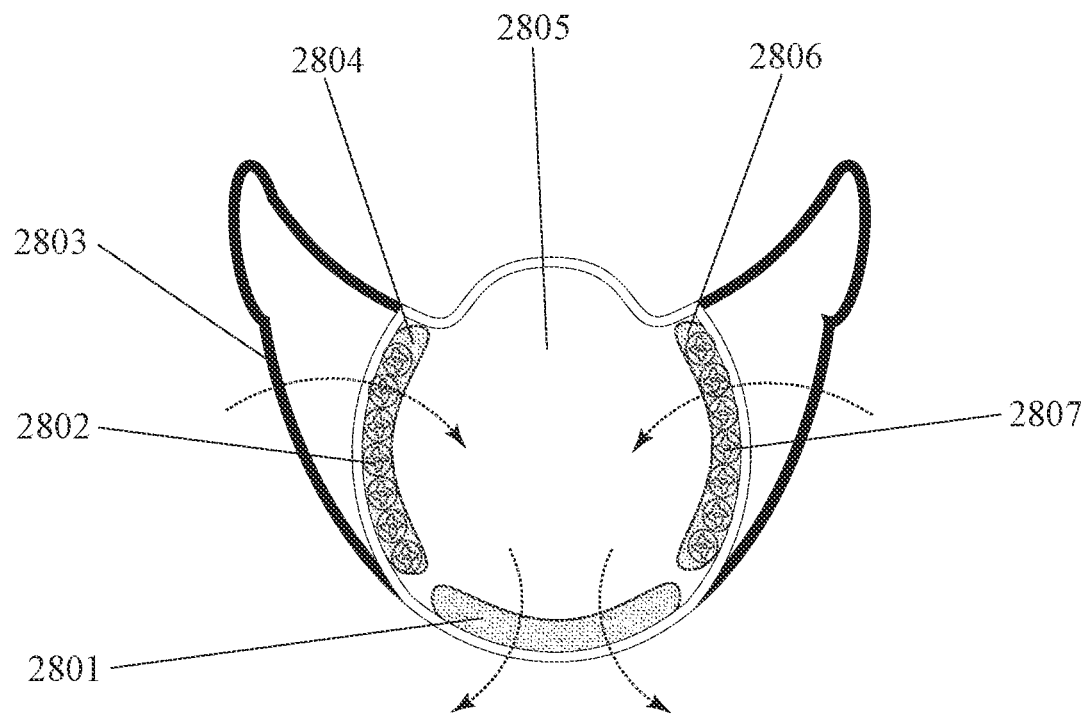
FIG. 28 shows a face mask with a transparent portion, straps, right-side and left-side air filters and air impellor arrays, and a lower air filter.

FIG. 28 shows an example of a pathogen-filtering semi-transparent face mask comprising: a transparent portion 2805 of a face mask which covers at least part of a person's mouth; straps, bands, or cords (including 2803) which hold the transparent portion on the person's head; a first-side air filter 2804 on a first side (e.g. the right side) of the mask; a first plurality of air impellors (including 2802) which move air through the first-side air filter; a second-side air filter 2806 on a second side (e.g. the left side) of the mask; a second plurality of air impellors (including 2807) which move air through the second-side air filter; and a lower air filter 2801 on or below the lower perimeter of the transparent portion.

There can be advantages from using a plurality of smaller air impellors instead of a single larger air impellor. One advantage is greater design flexibility with respect to the shape of an air exchange component on a mask. For example, a single large rotating impellor tends to require an air exchange component with a central circular cross-sectional shape. However, using a plurality of smaller air impellors instead of using one larger impellor can provide more design flexibility in the shape of an air exchange component on a mask. For example, one can create a linear or longitudinally-arcuate air exchange component by using a linear or longitudinally-arcuate array of air impellors. In an example, an arcuate array of air impellors can span some (or all) of an arcuate perimeter of a transparent portion of a mask. In an example, a circular array of air impellors can span a circular perimeter of a transparent portion of a mask. In an example, a linear array of air impellors can span some (or all) of a polygonal perimeter of a transparent portion of a mask.

The can also be other advantages from using a plurality of smaller air impellors instead of a single larger air impellor. In an example, a plurality of smaller air impellors can make less noise when rotating than a single larger air impellor. In an example, a plurality of smaller air impellors can move the same amount of air with a lower electric power requirement than a single larger air impellor. In an example, a plurality of smaller air impellors can produce more-uniform airflow than a single larger air impellor. In an example, a plurality of smaller air impellors can be safer than a single larger air impellor. In an example, a plurality of smaller air impellors can be substituted for a single larger air impellor in any of the other examples disclosed herein in order to achieve one of more of the above advantages.

In an example, the amount of airflow through an air filter can be adjusted by selectively changing the number of air impellors in a plurality of air impellors which are activated. In an example, the amount or direction of airflow through an air filter can be adjusted by selectively changing which air impellors in a plurality of air impellors which are activated. In an example, different air impellors in a plurality of air impellors can be activated in response to data from sensors which indicate how dirty and/or clogged different portions of an air filter are. In an example, different air impellors in a plurality of air impellors can be activated in response to data from biometric and/or physiological sensors which monitor the person. In an example, different air impellors in a plurality of air impellors can be activated in response to data from sensors which monitor air quality inside the mask (e.g. inside the transparent portion of the mask). In an example, different air impellors in a plurality of air impellors can be activated in response to data from environmental sensors.

In an example, when first-side and/or second-side air impellor arrays are in operation then: airflow through first-side and/or second-side air filters can be primarily (or entirely) from the environment into the interior of the mask; and airflow through the lower air filter can be primarily (or entirely) from the interior of the mask out into environment. In an example, when the first-side and second-side air impellor arrays are not in operation then: airflow through any of the air filters can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 29:
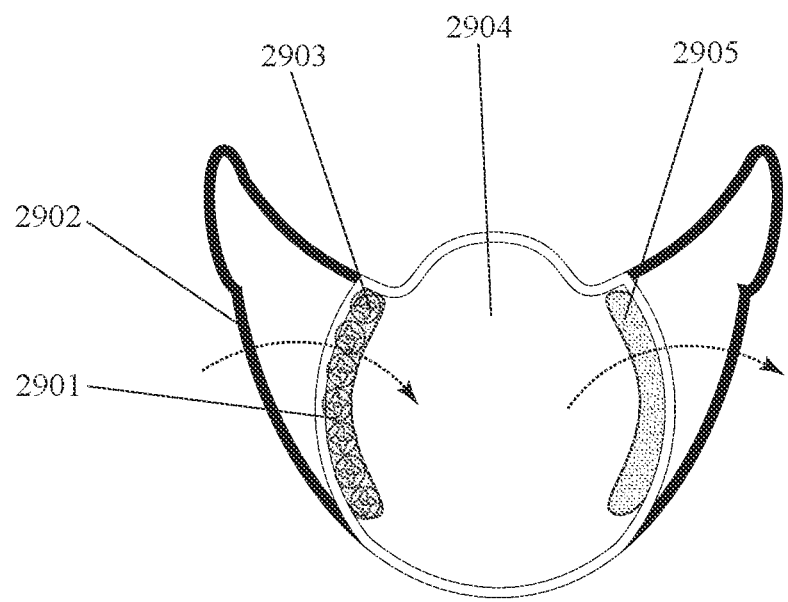
FIG. 29 shows a face mask with a transparent portion, straps, a first-side air filter and air impellor array, and a second-side air filter.

FIG. 29 shows an example of a pathogen-filtering semi-transparent face mask comprising: a transparent portion 2904 of a face mask which covers at least part of a person's mouth; straps, bands, or cords (including 2902) which hold the transparent portion on the person's head; a first-side air filter 2903 on a first side (e.g. the right side) of the mask; a plurality of air impellors (including 2901) which move air through the first-side air filter; and a second-side air filter 2905 on a second side (e.g. the left side) of the mask.

There can be advantages from using a plurality of smaller air impellors instead of a single larger air impellor. One advantage is greater design flexibility with respect to the shape of an air exchange component on a mask. For example, a single large rotating impellor tends to require an air exchange component with a central circular cross-sectional shape. However, using a plurality of smaller air impellors instead of using one larger impellor can provide more design flexibility in the shape of an air exchange component on a mask. For example, one can create a linear or longitudinally-arcuate air exchange component by using a linear or longitudinally-arcuate array of air impellors. In an example, an arcuate array of air impellors can span some (or all) of an arcuate perimeter of a transparent portion of a mask. In an example, a circular array of air impellors can span a circular perimeter of a transparent portion of a mask. In an example, a linear array of air impellors can span some (or all) of a polygonal perimeter of a transparent portion of a mask.

The can also be other advantages from using a plurality of smaller air impellors instead of a single larger air impellor. In an example, a plurality of smaller air impellors can make less noise when rotating than a single larger air impellor. In an example, a plurality of smaller air impellors can move the same amount of air with a lower electric power requirement than a single larger air impellor. In an example, a plurality of smaller air impellors can produce more-uniform airflow than a single larger air impellor. In an example, a plurality of smaller air impellors can be safer than a single larger air impellor. In an example, a plurality of smaller air impellors can be substituted for a single larger air impellor in any of the other examples disclosed herein in order to achieve one of more of the above advantages.

In an example, the amount of airflow through an air filter can be adjusted by selectively changing the number of air impellors in a plurality of air impellors which are activated. In an example, the amount or direction of airflow through an air filter can be adjusted by selectively changing which air impellors in a plurality of air impellors which are activated. In an example, different air impellors in a plurality of air impellors can be activated in response to data from sensors which indicate how dirty and/or clogged different portions of an air filter are. In an example, different air impellors in a plurality of air impellors can be activated in response to data from biometric and/or physiological sensors which monitor the person. In an example, different air impellors in a plurality of air impellors can be activated in response to data from sensors which monitor air quality inside the mask (e.g. inside the transparent portion of the mask). In an example, different air impellors in a plurality of air impellors can be activated in response to data from environmental sensors.

In an example, when first-side air impellors are in operation then: airflow through the first-side air filter can be primarily (or entirely) from the environment into the interior of the mask; and airflow through the second-side air filter can be primarily (or entirely) from the interior of the mask out into environment. In an example, when the first-side air impellors are not in operation then airflow through either of the air filters can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 30:
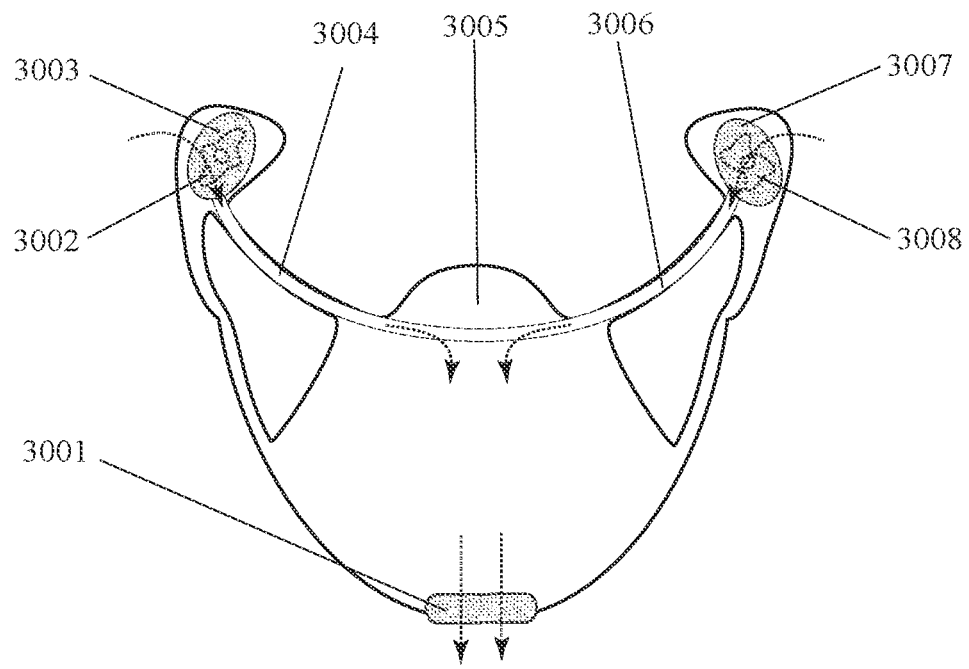
FIG. 30 shows a face mask with a transparent portion, right-side and left-side air filters and air impellors behind a person's ears, and a lower air filter on a person's chin, and air tubes or channels.

FIG. 30 shows an example of a pathogen-filtering semi-transparent face mask comprising: a transparent portion 3005 of a face mask which covers at least part of a person's mouth; a first-side air filter 3003 on a first side (e.g. the right side) of the person's head, wherein the first-side air filter is behind (e.g. posterior to) the person's first-side ear; a first-side air impellor 3002 which moves air through the first-side air filter; a first-side air tube (or channel) 3004 which directs airflow between the first-side air filter and the transparent portion; a second-side air filter 3007 on a second side (e.g. the left side) of the person's head, wherein the second-side air filter is behind (e.g. posterior to) the person's second-side ear; a second-side air impellor 3008 which moves air through the second-side air filter; a second-side air tube (or channel) 3006 which directs airflow between the second-side air filter and the transparent portion; and a lower air filter 3001 below the person's mouth.

In an example, a (first or second) side air filter can be located behind a person's ear. In an example, a (first or second) side air filter can be located directly behind a person's ear. In an example, a (first or second) side air filter can be behind a person's ear and also within 2" of the ear. In an example, a (first or second) side air filter can be behind a person's ear and also between 1" and 3" from the ear. In an example, a mask can further comprise straps, bands, or cords which hold a transparent portion of the mask on a person's head. In an example, an air tube (or channel) can be inside a strap, band, or cord in order to direct airflow from an air filter behind a person's ear to the transparent portion of a mask. In an example, a strap, band, or cord which holds a mask on a person's head can also be an air tube (or channel). In an example, a mask can further comprise straps, bands, or cords which: connect a transparent portion of a mask to a person's ears; and also conduct airflow between one or more air filters behind (e.g. posterior to) the person's ears to the interior of the transparent portion of the mask.

In an example, an air tube (e.g. air tube, channel, or pathway) can channel airflow between one or more air filters and an interior space of a transparent portion of a mask. This can be especially useful when an air filter and/or an air impellor are located relatively far away from the transparent portion of the mask for esthetic and/or other design reasons. In an example, a first air tube can channel airflow between a first air filter and an interior space of a transparent portion of a mask and a second air tube can channel airflow between a second air filter and the interior space of the transparent portion of the mask. In an example, an air tube (e.g. air tube, channel, or pathway) can span a portion of the perimeter of a transparent portion of a mask. In an example, an arcuate air tube can curve around a portion of an arcuate perimeter of a transparent portion of a mask.

In an example, an air tube in a mask can have an air-impermeable section and an air-permeable (e.g. perforated) section. In an example, the air-permeable section can have holes, openings, and perforations which allow fluid communication (e.g. air flow) with the interior space of the mask. In an example, the air-impermeable section can be closer to an air filter or air impellor and the air-permeable section can be closer to the interior space of a mask. In an example, the air-permeable section can have holes, openings, and perforations which allow fluid communication (e.g. air flow) with the interior space of transparent portion of the mask. In an example, the air-impermeable section can be closer to an air filter or air impellor and the air-permeable section can be closer to the interior space of the transparent portion of a mask.

In an example, the inner diameter of an air tube (e.g. air tube, channel, or pathway) can be within the range of 1/8" to 1/2". In an example, the length of an air tube can be within the range of 1/2" to 5". In an example, between 25% and 75% of the length of an air tube can be perforated with holes. In an example, between 50% and 80% of the length of an air tube can be perforated with holes. In an example, the interior of an air tube can have a circular cross-sectional shape. In an example, the interior of an air tube can have an elliptical, oval, and/or oblong cross-sectional shape. In an example, an air tube can be detached from a mask for cleaning and then reattached.

In an example, when the first-side air impellor and/or second-side air impellor are in operation then: airflow through the first-side air filter and/or second-side air filter can be primarily (or entirely) from the environment into the interior of the mask; and airflow through the lower air filter can be primarily (or entirely) from the interior of the mask out into environment. In an example, when the first-side air impellor and second-side air impellor are not in operation then airflow through the first-side air filter, the second-side air filter, and/or the lower air filter can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 31:
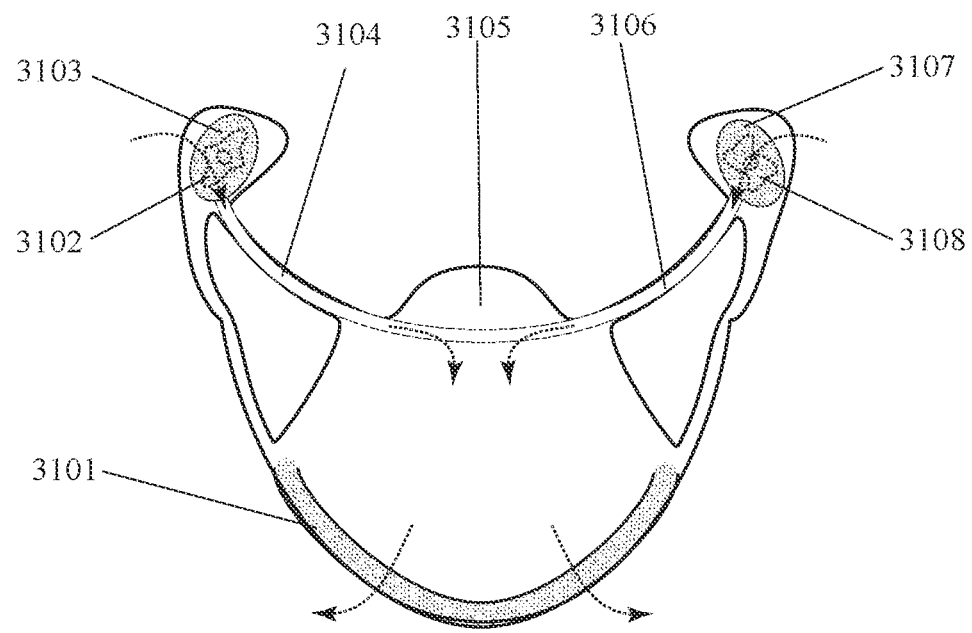
FIG. 31 shows a face mask with a transparent portion, right-side and left-side air filters and air impellors behind a person's ears, and a lower air filter along the lower perimeter of the mask.

FIG. 31 shows an example of a face mask which is similar to the one shown in FIG. 30 except that the lower air filter spans at least 25% of the lower perimeter of the mask. FIG. 31 shows an example of a pathogen-filtering semi-transparent face mask comprising: a transparent portion 3105 of a face mask which covers at least part of a person's mouth; a first-side air filter 3103 on a first side (e.g. the right side) of the person's head, wherein the first-side air filter is behind (e.g. posterior to) the person's first-side ear; a first-side air impellor 3102 which moves air through the first-side air filter; a first-side air tube (or channel) 3104 which directs airflow between the first-side air filter and the transparent portion; a second-side air filter 3107 on a second side (e.g. the left side) of the person's head, wherein the second-side air filter is behind (e.g. posterior to) the person's second-side ear; a second-side air impellor 3108 which moves air through the second-side air filter; a second-side air tube (or channel) 3106 which directs airflow between the second-side air filter and the transparent portion; and a lower air filter 3101 which spans at least 25% of the lower perimeter of the mask.

In an example, a lower filter can span at least 25% of the lower perimeter of a mask. In an example, a lower filter can span at least 50% of the lower perimeter of a mask. In an example, a lower filter can span between 20% and 80% of the lower perimeter of a mask. In an example, a lower filter can span the entire lower perimeter of a mask. In an example, a lower filter can span at least 25% of the lower perimeter (e.g. from one ear to another) of a mask. In an example, a lower filter can span at least 50% of the lower perimeter (e.g. from one ear to another) of a mask. In an example, a lower filter can span between 20% and 80% of the lower perimeter (e.g. from one ear to another) of a mask. In an example, a lower filter can span the entire e lower perimeter (e.g. from one ear to another) of a mask. In an example, a lower filter can span at least 25% of the lower perimeter of a transparent portion. In an example, a lower filter can span at least 50% of the lower perimeter of a transparent portion. In an example, a lower filter can span between 20% and 80% of the lower perimeter of a transparent portion. In an example, a lower filter can span the entire lower perimeter of a transparent portion.

In an example, when the first-side air impellor and/or second-side air impellor are in operation then: airflow through the first-side air filter and/or second-side air filter can be primarily (or entirely) from the environment into the interior of the mask; and airflow through the lower air filter can be primarily (or entirely) from the interior of the mask out into environment. In an example, when the first-side air impellor and second-side air impellor are not in operation then airflow through the first-side air filter, the second-side air filter, and/or the lower air filter can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 32:
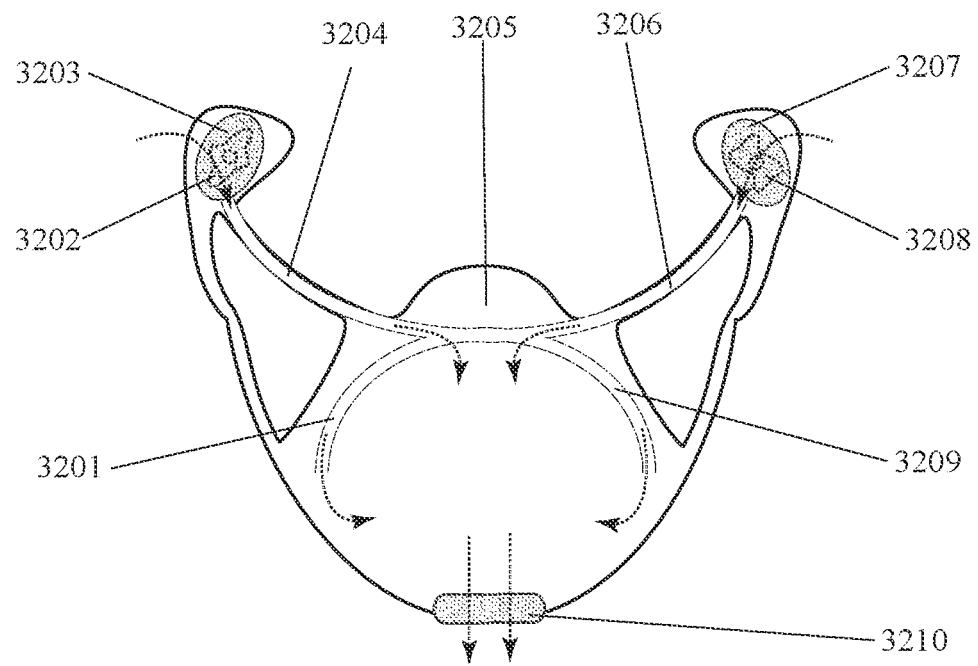
FIG. 32 shows a face mask with a transparent portion, right-side and left-side air filters and air impellors behind a person's ears, a lower air filter on a person's chin, and air tubes or channels on either side of the person's mouth.

FIG. 32 shows an example of a pathogen-filtering semi-transparent face mask comprising: a transparent portion 3205 of a face mask which covers at least part of a person's mouth; a first-side air filter 3203 on a first side (e.g. the right side) of the person's head, wherein the first-side air filter is behind (e.g. posterior to) the person's first-side ear; a first-side air impellor 3202 which moves air through the first-side air filter; a first air tube (or channel) 3204 which is in fluid communication the first-side air filter; a second air tube (or channel) 3201 which is in fluid communication with the first air tube and at least partially encircles the person's mouth; a second-side air filter 3207 on a second side (e.g. the left side) of the person's head, wherein the second-side air filter is behind (e.g. posterior to) the person's second-side ear; a second-side air impellor 3208 which moves air through the second-side air filter; a third air tube (or channel) 3206 which is in fluid communication the second-side air filter; a fourth air tube (or channel) 3209 which is in fluid communication with the third air tube and at least partially encircles the person's mouth; and a lower air filter 3210 below the person's mouth.

In an example, a (first or second) side air filter can be located behind a person's ear. In an example, a (first or second) side air filter can be located directly behind a person's ear. In an example, a (first or second) side air filter can be behind a person's ear and also within 2" of the ear. In an example, a (first or second) side air filter can be behind a person's ear and also between 1" and 3" from the ear. In an example, a mask can further comprise straps, bands, or cords which hold a transparent portion of the mask on a person's head. In an example, an air tube (or channel) can be inside a strap, band, or cord in order to direct airflow from an air filter behind a person's ear to the transparent portion of a mask. In an example, a strap, band, or cord which holds a mask on a person's head can also be an air tube (or channel). In an example, a mask can further comprise straps, bands, or cords which: connect a transparent portion of a mask to a person's ears; and also conduct airflow between one or more air filters behind (e.g. posterior to) the person's ears to the interior of the transparent portion of the mask.

In an example, an air tube (e.g. air tube, channel, or pathway) can channel airflow between one or more air filters and an interior space of a transparent portion of a mask. This can be especially useful when an air filter and/or an air impellor are located relatively far away from the transparent portion of the mask for esthetic and/or other design reasons. In an example, an air tube can channel airflow between a first air filter and an interior space of a transparent portion of a mask and an air tube can channel airflow between a second air filter and the interior space of the transparent portion of the mask. In an example, an air tube (e.g. air tube, channel, or pathway) can span a portion of the perimeter of a transparent portion of a mask. In an example, an arcuate air tube can curve around a portion of an arcuate perimeter of a transparent portion of a mask.

In an example, an air tube in a mask can have an air-impermeable section and an air-permeable (e.g. perforated) section. In an example, the air-permeable section can have holes, openings, and perforations which allow fluid communication (e.g. air flow) with the interior space of the mask. In an example, the air-impermeable section can be closer to an air filter or air impellor and the air-permeable section can be closer to the interior space of a mask. In an example, the air-permeable section can have holes, openings, and perforations which allow fluid communication (e.g. air flow) with the interior space of transparent portion of the mask. In an example, the air-impermeable section can be closer to an air filter or air impellor and the air-permeable section can be closer to the interior space of the transparent portion of a mask.

In an example, the inner diameter of an air tube (e.g. air tube, channel, or pathway) can be within the range of ⅛" to ½". In an example, the length of an air tube can be within the range of ½" to 5". In an example, between 25% and 75% of the length of an air tube can be perforated with holes. In an example, between 50% and 80% of the length of an air tube can be perforated with holes. In an example, the interior of an air tube can have a circular cross-sectional shape. In an example, the interior of an air tube can have an elliptical, oval, and/or oblong cross-sectional shape. In an example, an air tube can be detached from a mask for cleaning and then reattached.

In an example, when the first-side air impellor and/or second-side air impellor are in operation then: airflow through the first-side air filter and/or second-side air filter can be primarily (or entirely) from the environment into the interior of the mask; and airflow through the lower air filter can be primarily (or entirely) from the interior of the mask out into environment. In an example, when the first-side air impellor and second-side air impellor are not in operation then airflow through the first-side air filter, the second-side air filter, and/or the lower air filter can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 33:
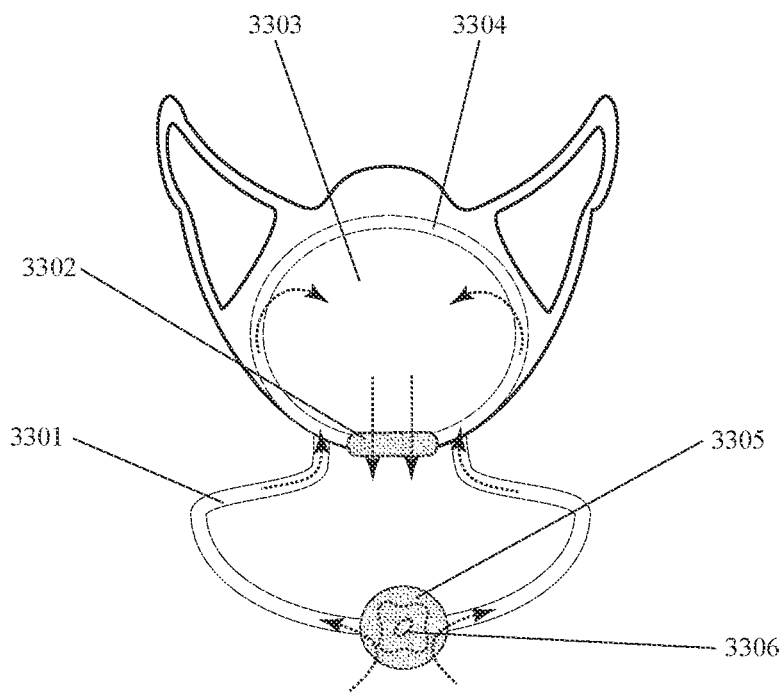
FIG. 33 shows a face mask with a transparent portion, a pendant-style air filter and air impellor on a person's torso, a lower air filter on the person's chin, and air tubes or channels.

FIG. 33 shows an example of a pathogen-filtering semi-transparent face mask comprising: a transparent portion 3303 of a face mask which covers at least part of a person's mouth; a pendant air filter 3305 which hangs from a person's neck; a pendant air impellor 3306 which moves air through the pendant air filter; a lower air tube (or channel) 3301 which is worn on the person's neck and is in fluid communication the pendant air filter; an upper air tube (or channel) 3304 which at least partially encircles the person's mouth and is in fluid communication with the lower air tube; and a jaw-worn air filter 3302 which is worn on or below the person's jaw.

In an example, a pendant air filter can hang down from a necklace around a person's neck. In an example, a pendant air tube can be part of (e.g. inside) a necklace around a person's neck. In an example, a pendant air filter can hang down from the front of a person's neck, onto the front of a person's torso. In an example, a pendant air filter can hang down from the back of a person's neck, onto the back of a person's torso. In an example, a pendant air filter can have a circular shape. In an example, a pendant air filter can have a tear-drop shape. In an example, such a mask can comprise a plurality of neck-worn air filters and/or impellors. In an example, such a mask can comprise a necklace with a plurality of neck-worn air filters and/or impellors. In an example, an air impellor can be located at the rear of a necklace (e.g. behind a person's neck or on a person's back), wherein the air impellor draws air in from a plurality of air filters along the front of the necklace. In an example, an air impellor can be located at the rear of a necklace (e.g. behind a person's neck or on a person's back). In an example, an air impellor can draw air into a mask from a plurality of openings (e.g. holes) along the front of a necklace.

In an example, an air tube (e.g. air tube, channel, or pathway) can channel airflow between one or more air filters and an interior space of a transparent portion of a mask. This can be especially useful when an air filter and/or an air impellor are located relatively far away from the transparent portion of the mask for esthetic and/or other design reasons. In an example, an air tube can channel airflow between a first air filter and an interior space of a transparent portion of a mask and an air tube can channel airflow between a second air filter and the interior space of the transparent portion of the mask. In an example, an air tube (e.g. air tube, channel, or pathway) can span a portion of the perimeter of a transparent portion of a mask. In an example, an arcuate air tube can curve around a portion of an arcuate perimeter of a transparent portion of a mask.

In an example, an air tube in a mask can have an air-impermeable section and an air-permeable (e.g. perforated) section. In an example, the air-permeable section can have holes, openings, and perforations which allow fluid communication (e.g. air flow) with the interior space of the mask. In an example, the air-impermeable section can be closer to an air filter or air impellor and the air-permeable section can be closer to the interior space of a mask. In an example, the air-permeable section can have holes, openings, and perforations which allow fluid communication (e.g. air flow) with the interior space of transparent portion of the mask. In an example, the air-impermeable section can be closer to an air filter or air impellor and the air-permeable section can be closer to the interior space of the transparent portion of a mask.

In an example, the inner diameter of an air tube (e.g. air tube, channel, or pathway) can be within the range of ⅛" to ½". In an example, the length of an air tube can be within the range of ½" to 5". In an example, between 25% and 75% of the length of an air tube can be perforated with holes. In an example, between 50% and 80% of the length of an air tube can be perforated with holes. In an example, the interior of an air tube can have a circular cross-sectional shape. In an example, the interior of an air tube can have an elliptical, oval, and/or oblong cross-sectional shape. In an example, an air tube can be detached from a mask for cleaning and then reattached.

In an example, when a pendant air impellor is in operation then: airflow through a pendant air filter can be primarily (or entirely) from the environment into the interior of the mask; and airflow through a jaw-worn air filter can be primarily (or entirely) from the interior of the mask out into environment. In an example, when the pendant air impellor is not in operation then airflow through the pendant air filter and/or the jaw-worn filter can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 34:
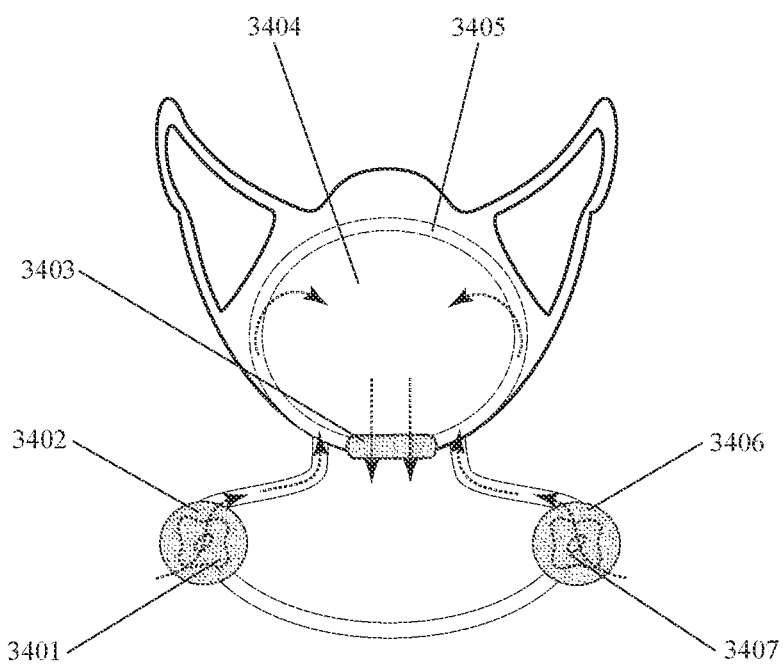
FIG. 34 shows a face mask with a transparent portion, two shoulder-worn air filters and air impellors, a lower air filter on the person's chin, and air tubes or channels.

FIG. 34 shows an example of a pathogen-filtering semi-transparent face mask comprising: a transparent portion 3404 of a face mask which covers at least part of a person's mouth; a first-side air filter 3402 which is worn on a person's first-side (e.g. right side) shoulder; a first-side air impellor 3401 which moves air through the first-side air filter; a second-side air filter 3406 which is worn on a person's second-side (e.g. left side) shoulder; a second-side air impellor 3407 which moves air through the second-side air filter; an air tube (or channel) 3405 which is in fluid communication the first-side air filter and/or the second-side air filter, wherein the air tube at least partially encircles the person's mouth; and a jaw-worn air filter 3403 which is worn on or below the person's jaw.

In an example, a (first or second) side air filter can be worn on a person's shoulder. In an example, a (first or second) side air filter can be worn on top of a person's shoulder. In an example, a (first or second) side air filter can hang down from a person's shoulder. In an example, a (first or second) side air filter can be worn on the lapel of a person's suit, jacket, or coat. In an example, a shoulder-worn air filter can have a circular shape. In an alternative example, a pathogen-filtering semi-transparent face mask can comprise only one shoulder-worn air filter (worn on only the person's right or left side) instead of two shoulder-worn air filters.

In an example, an air tube (e.g. air tube, channel, or pathway) can channel airflow between one or more air filters and an interior space of a transparent portion of a mask. This can be especially useful when an air filter and/or an air impellor are located relatively far away from the transparent portion of the mask for esthetic and/or other design reasons. In an example, an air tube can channel airflow between a first air filter and an interior space of a transparent portion of a mask and an air tube can channel airflow between a second air filter and the interior space of the transparent portion of the mask. In an example, an air tube (e.g. air tube, channel, or pathway) can span a portion of the perimeter of a transparent portion of a mask. In an example, an arcuate air tube can curve around a portion of an arcuate perimeter of a transparent portion of a mask.

In an example, an air tube in a mask can have an air-impermeable section and an air-permeable (e.g. perforated) section. In an example, the air-permeable section can have holes, openings, and perforations which allow fluid communication (e.g. air flow) with the interior space of the mask. In an example, the air-impermeable section can be closer to an air filter or air impellor and the air-permeable section can be closer to the interior space of a mask. In an example, the air-permeable section can have holes, openings, and perforations which allow fluid communication (e.g. air flow) with the interior space of transparent portion of the mask. In an example, the air-impermeable section can be closer to an air filter or air impellor and the air-permeable section can be closer to the interior space of the transparent portion of a mask.

In an example, the inner diameter of an air tube (e.g. air tube, channel, or pathway) can be within the range of ⅛" to ½". In an example, the length of an air tube can be within the range of ½" to 5". In an example, between 25% and 75% of the length of an air tube can be perforated with holes. In an example, between 50% and 80% of the length of an air tube can be perforated with holes. In an example, the interior of an air tube can have a circular cross-sectional shape. In an example, the interior of an air tube can have an elliptical, oval, and/or oblong cross-sectional shape. In an example, an air tube can be detached from a mask for cleaning and then reattached.

In an example, when one or more air impellors are in operation then: airflow through one or more shoulder air filters can be primarily (or entirely) from the environment into the interior of the mask; and airflow through a jaw-worn air filter can be primarily (or entirely) from the interior of the mask out into environment. In an example, when one or more air impellors are not in operation then airflow through any or all air filters can be primarily (or entirely) from the environment into the interior of the mask when the person inhales and primarily (or entirely) from the interior of the mask out into environment when the person exhales. Other design variations discussed elsewhere in this disclosure or in priority-linked disclosures can also be applied to this example where relevant.

Figure 35:
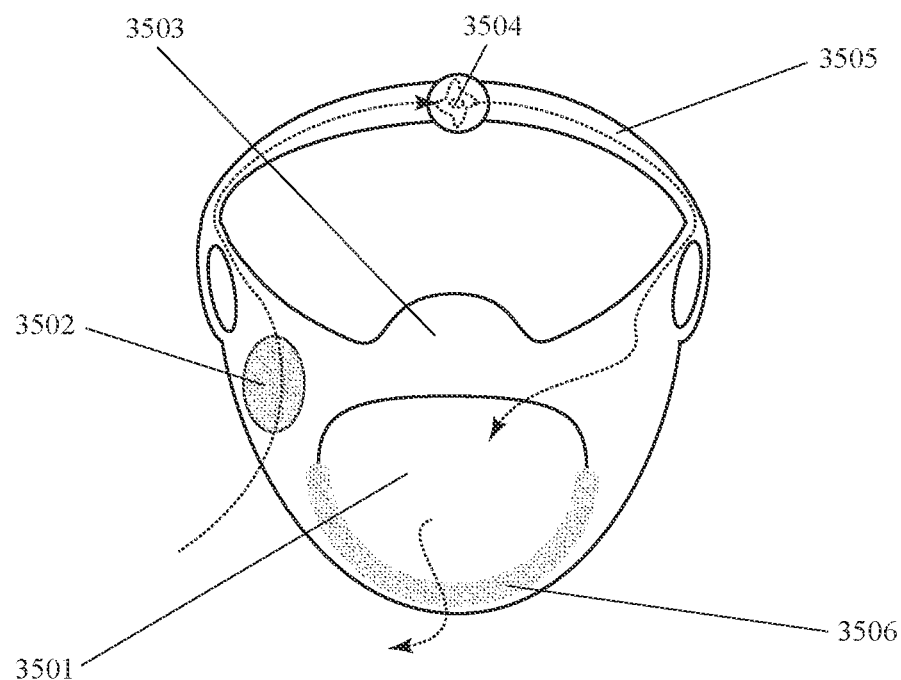
FIG. 35 shows a face mask with a transparent portion, a non-transparent portion, an air filter on the side of the mask, an air impellor on the back of a person's head, an air filter on the lower perimeter of the transparent portion, and air tubes or channels.

FIG. 35 shows an example of a pathogen-filtering semi-transparent face mask comprising: a transparent portion 3501 of a face mask which covers at least part of a person's mouth; a non-transparent portion 3503 of the face mask which holds the transparent portion on the person's head; a side air filter 3502 which is worn on a side (e.g. right side or left side) of the mask; a posterior air impellor 3504 which is worn on the back of the person's head, wherein the air impellor draws air into the mask through the side air filter; an air channel (or tube) 3505 which is in fluid communication the side air filter, the posterior air impellor, and the transparent portion, wherein there is airflow from the side air filter to the transparent portion through the air channel; and a lower air filter 3506 which is at least partly below the person's mouth.

Locating an air impellor on the back of a person's head can have advantages. As one advantage, having an air impellor on the back of the head means that noise from rotation of the impellor is away from the person's ears (e.g. compared to having an air impellor on a person's cheek or directly behind their ear). As another advantage, having an air impellor on the back of the head can be better aesthetically by reducing facial clutter (e.g. compared to having an air impellor on a person's cheek or jaw). One could also locate the air filter/intake on the back of a person's head as well, but then the person wearing the mask cannot see potential environmental hazards near the mask air intake. For example, if someone wearing the mask is riding a subway, they cannot see if a person behind them is coughing directly toward the mask air intake. For this reason, this example features an air impellor on the back of a person's head (reducing noise near the person's ears and facial clutter) with the air filter/intake on the side of the person's face (allowing the person to see environmental hazards near the air intake).

In an example, when an air impellor is in operation then: airflow through a side air filter can be primarily (or entirely) from the environment into the interior of the mask; and airflow through a lower air filter can be primarily (or entirely) from the interior of the mask out into environment. In an example, when an air impellor is not in operation then airflow through all air filters can be primarily (or entirely) from the environment into the interior of the mask when the person inhales and primarily (or entirely) from the interior of the mask out into environment when the person exhales.

Other design variations discussed elsewhere in this disclosure or in priority-linked disclosures can also be applied to this example where relevant.

Figure 36:
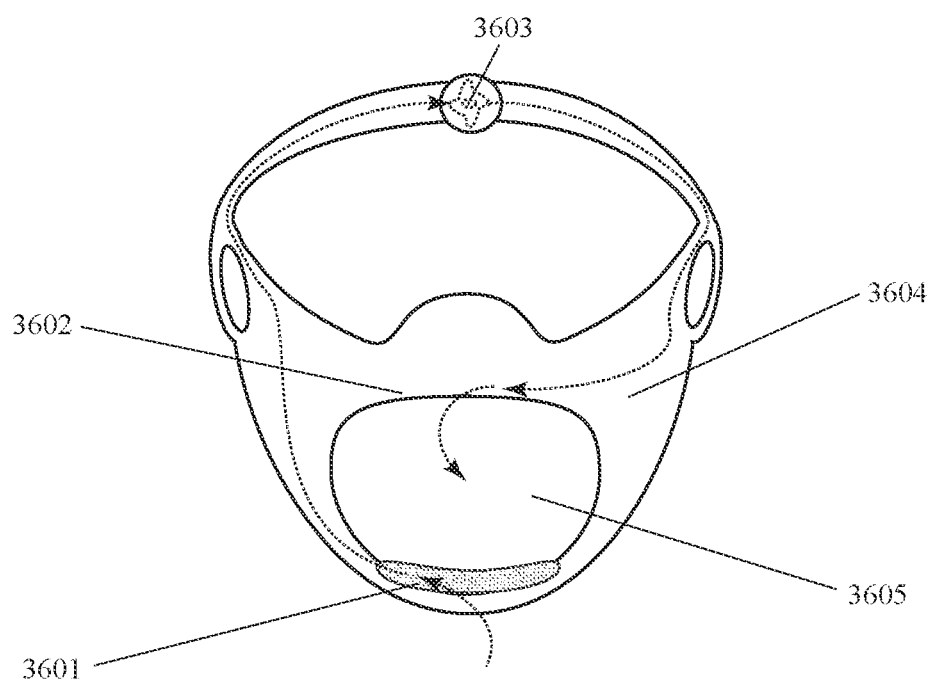
FIG. 36 shows a face mask with a transparent portion, a non-transparent portion, an air impellor on the back of a person's head, and an air filter on the lower perimeter of the transparent portion.

FIG. 36 shows an example of a pathogen-filtering semi-transparent face mask comprising: a transparent portion 3605 of a face mask with a perimeter 3602 which encircles a person's mouth; a non-transparent portion 3604 of the face mask which holds the transparent portion on the person's head; a lower air filter 3601 which is at least partly below the person's mouth; and a posterior air impellor 3603 which is worn on the back of the person's head, wherein the air impellor draws air into the mask through the side air filter. Other design variations discussed elsewhere in this disclosure or in priority-linked disclosures can also be applied to this example where relevant.

Figure 37:
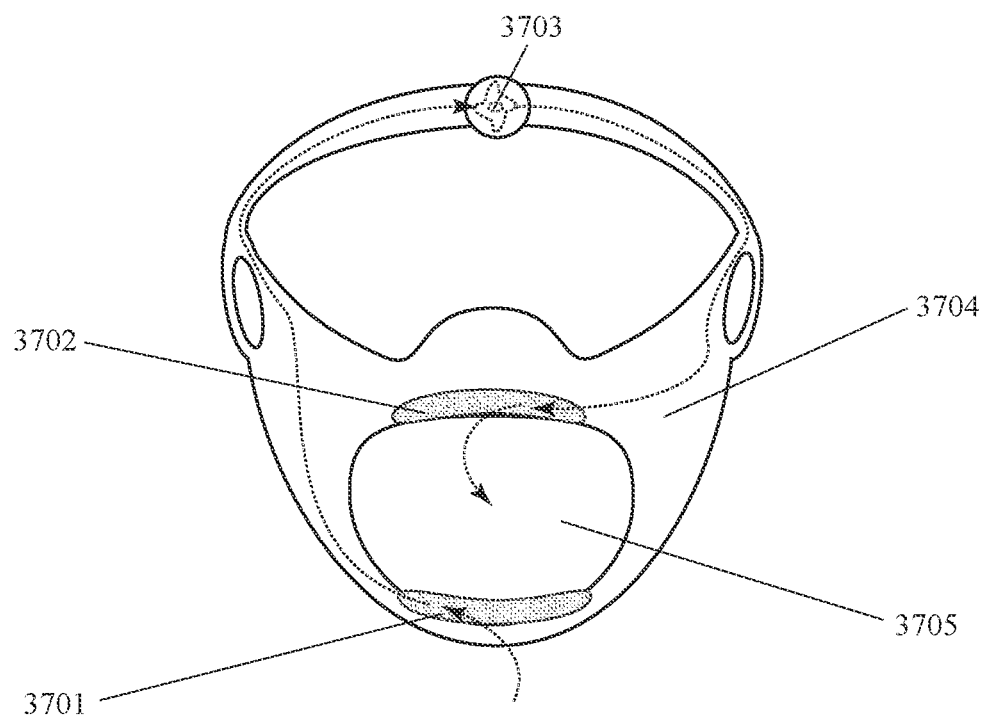
FIG. 37 shows a face mask with a transparent portion, a non-transparent portion, an air impellor on the back of a person's head, and upper and lower air filters around the perimeter of the transparent portion.

FIG. 37 shows an example of a pathogen-filtering semi-transparent face mask comprising: a transparent portion 3705 of a face mask which at least partly covers a person's mouth; a non-transparent portion 3704 of the face mask which holds the transparent portion on the person's head; a lower air filter 3701 which is at least partly below the person's mouth; an upper air filter 3702 which is at least partly above the person's mouth; and a posterior air impellor 3703 which is worn on the back of the person's head, wherein the air impellor draws air into the mask through the lower air filter. Other design variations discussed elsewhere in this disclosure or in priority-linked disclosures can also be applied to this example where relevant.

Figure 38:
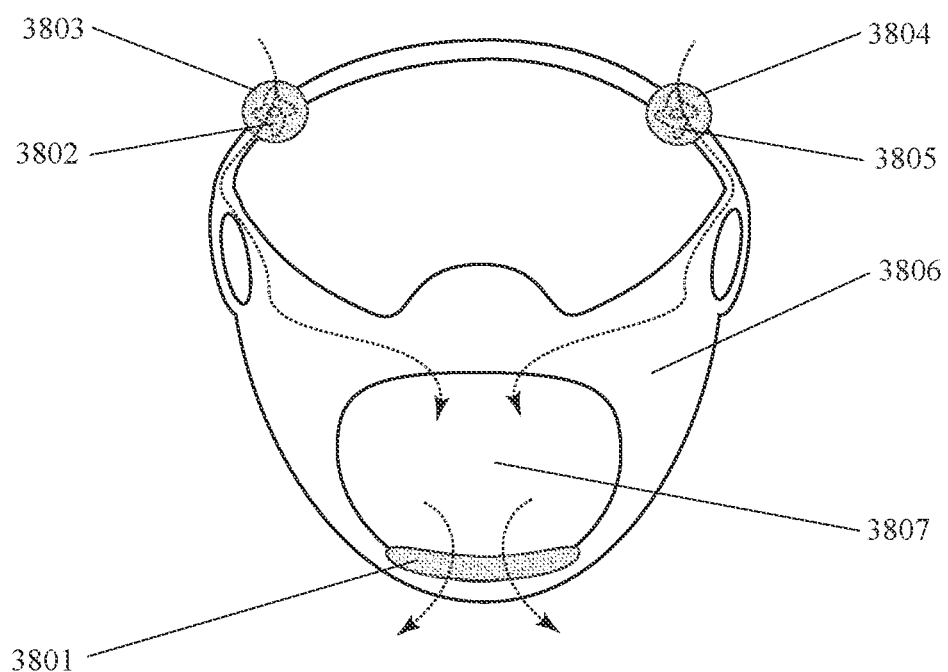
FIG. 38 shows a face mask with a transparent portion, a non-transparent portion, two air filters and air impellors on the back of a person's head, and an air filter on the lower perimeter of the transparent portion.

FIG. 38 shows an example of a pathogen-filtering semi-transparent face mask comprising: a transparent portion 3807 of a face mask which at least partly covers a person's mouth; a non-transparent portion 3806 of the face mask which holds the transparent portion on the person's head; a first posterior air filter 3803 which is worn on the back the person's head; a first posterior air impellor 3802 which is worn on the back of the person's head, wherein the first posterior air impellor moves air through the first posterior air filter; a second posterior air filter 3804 which is worn on the back the person's head; a second posterior air impellor 3805 which is worn on the back of the person's head, wherein the second posterior air impellor moves air through the second posterior air filter; and a lower air filter 3801 which is at least partly below the person's mouth.

In an example, a first posterior air filter and/or a first posterior air impellor can be on a first side (e.g. right side) of the back of a person's head and a second posterior air filter and/or a second posterior air impellor can be on a second side (e.g. left side) of the back of the person's head. In an example, air can enter a mask through a first posterior air filter and through a second posterior air filter. In an example, air can enter a mask through a first posterior air filter and exit the mask through a second posterior air filter. In an example, air can exit a mask through a lower air filter. In an example, a mask can further comprise one or more air tubes (or channels) which direct air from an air filter and/or air impellor on the back of a person's head to a concave interior of a transparent portion of the mask which covers the person's mouth. Other design variations discussed elsewhere in this disclosure or in priority-linked disclosures can also be applied to this example where relevant.

Figure 39:
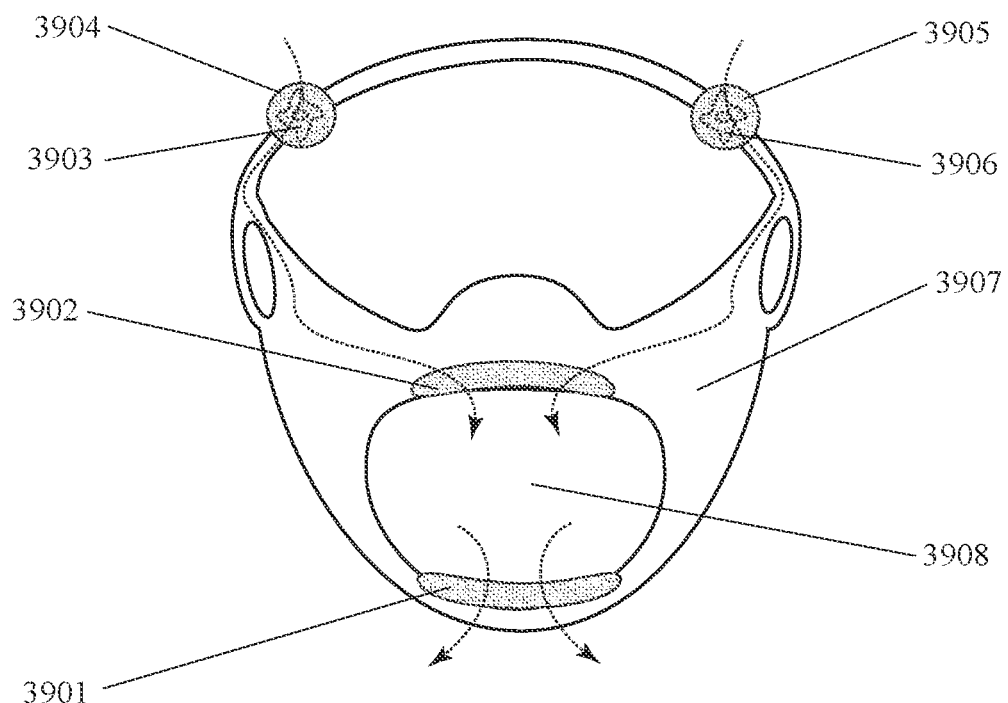
FIG. 39 shows a face mask with a transparent portion, a non-transparent portion, two air filters and air impellors on the back of a person's head, and upper and lower air filters around the perimeter of the transparent portion.

FIG. 39 shows an example of a pathogen-filtering semi-transparent face mask comprising: a transparent portion 3908 of a face mask which at least partly covers a person's mouth; a non-transparent portion 3907 of the face mask which holds the transparent portion on the person's head; a first posterior air filter 3904 which is worn on the back the person's head; a first posterior air impellor 3903 which is worn on the back of the person's head, wherein the first posterior air impellor moves air through the first posterior air filter; a second posterior air filter 3905 which is worn on the back the person's head; a second posterior air impellor 3906 which is worn on the back of the person's head, wherein the second posterior air impellor moves air through the second posterior air filter; an upper frontal air filter 3902 which is at least partly above the person's mouth; and a lower frontal air filter 3901 which is at least partly below the person's mouth.

In an example, a first posterior air filter and/or a first posterior air impellor can be on a first side (e.g. right side) of the back of a person's head and a second posterior air filter and/or a second posterior air impellor can be on a second side (e.g. left side) of the back of the person's head. In an example, air can enter a mask through a first posterior air filter and through a second posterior air filter. In an example, air can enter a mask through a first posterior air filter and exit the mask through a second posterior air filter. In an example, air can exit a mask through a lower frontal air filter. In an example, a mask can further comprise one or more air tubes (or channels) which direct air from an air filter and/or air impellor on the back of a person's head to a concave interior of a transparent portion of the mask which covers the person's mouth. Other design variations discussed elsewhere in this disclosure or in priority-linked disclosures can also be applied to this example where relevant.

Figure 40:
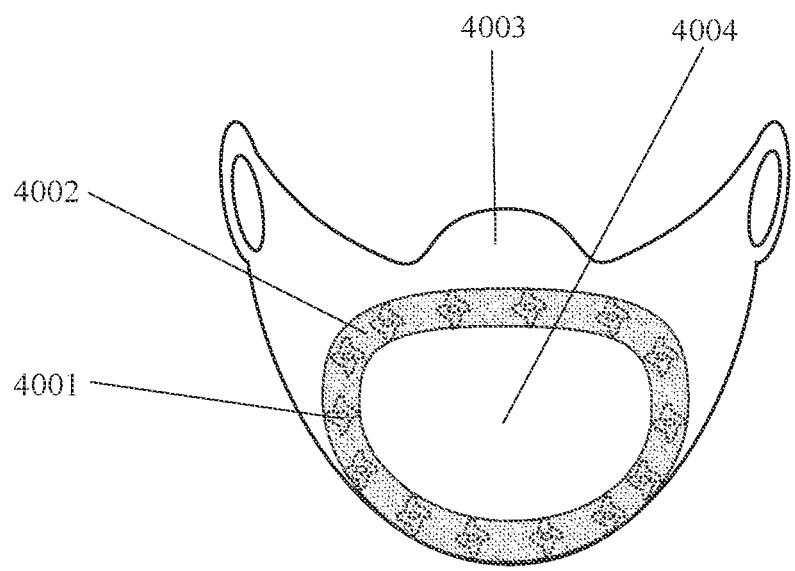
FIG. 40 shows a face mask with a transparent portion, a non-transparent portion, and an air filter and plurality of air impellors around the perimeter of the transparent portion.

FIG. 40 shows an example of a pathogen-filtering semi-transparent face mask comprising: a transparent portion 4004 of a face mask which covers at least part of a person's mouth; a non-transparent portion 4003 of the mask which holds the transparent portion on the person's head; a perimeter air filter 4002 along (e.g. around) at least part of the perimeter of the non-transparent portion; and a plurality of air impellors (including 4001) along (e.g. around) at least part of the perimeter of the non-transparent portion which move air through the perimeter air filter. In this example, the perimeter air filter and the plurality of air impellers span (e.g. encircle) the entire perimeter of the non-transparent portion of the mask.

There can be advantages from using a plurality of smaller air impellors instead of a single larger air impellor. One advantage is greater design flexibility with respect to the shape of an air exchange component on a mask. For example, a single large rotating impellor tends to require an air exchange component with a central circular cross-sectional shape. However, using a plurality of smaller air impellors instead of using one larger impellor can provide more design flexibility in the shape of an air exchange component on a mask. For example, one can create a linear or longitudinally-arcuate air exchange component by using a linear or longitudinally-arcuate array of air impellors. In an example, an arcuate array of air impellors can span some (or all) of an arcuate perimeter of a transparent portion of a mask. In an example, a circular array of air impellors can span a circular perimeter of a transparent portion of a mask. In an example, a linear array of air impellors can span some (or all) of a polygonal perimeter of a transparent portion of a mask.

The can also be other advantages from using a plurality of smaller air impellors instead of a single larger air impellor. In an example, a plurality of smaller air impellors can make less noise when rotating than a single larger air impellor. In an example, a plurality of smaller air impellors can move the same amount of air with a lower electric power requirement than a single larger air impellor. In an example, a plurality of smaller air impellors can produce more-uniform airflow than a single larger air impellor. In an example, a plurality of smaller air impellors can be safer than a single larger air impellor. In an example, a plurality of smaller air impellors can be substituted for a single larger air impellor in any of the other examples disclosed herein in order to achieve one of more of the above advantages.

In an example, the amount of airflow through an air filter can be adjusted by selectively changing the number of air impellors in a plurality of air impellors which are activated. In an example, the amount or direction of airflow through an air filter can be adjusted by selectively changing which air impellors in a plurality of air impellors which are activated. In an example, different air impellors in a plurality of air impellors can be activated in response to data from sensors which indicate how dirty and/or clogged different portions of an air filter are. In an example, different air impellors in a plurality of air impellors can be activated in response to data from biometric and/or physiological sensors which monitor the person. In an example, different air impellors in a plurality of air impellors can be activated in response to data from sensors which monitor air quality inside the mask (e.g. inside the transparent portion of the mask). In an example, different air impellors in a plurality of air impellors can be activated in response to data from environmental sensors. Other design variations discussed elsewhere in this disclosure or in priority-linked disclosures can also be applied to this example where relevant.

Figure 41:
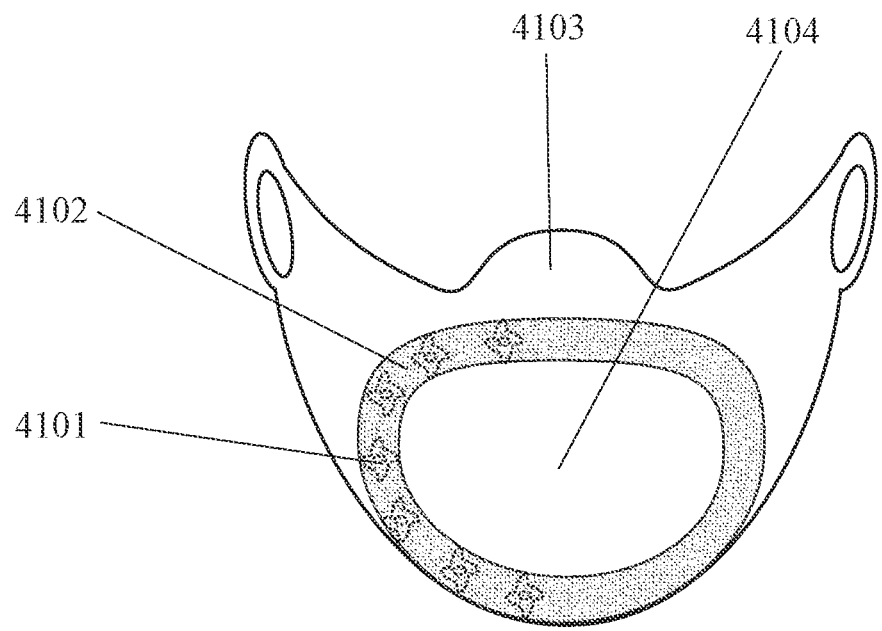
FIG. 41 shows a face mask with a transparent portion, a non-transparent portion, an air filter around the transparent portion, and a plurality of air impellors along a side of the transparent portion.

FIG. 41 shows an example of a pathogen-filtering semi-transparent face mask comprising: a transparent portion 4104 of a face mask which covers at least part of a person's mouth; a non-transparent portion 4103 of the mask which holds the transparent portion on the person's head; a perimeter air filter 4102 along (e.g. around) at least part of the perimeter of the non-transparent portion; and a plurality of air impellors (including 4101) along (e.g. around) at least part of the perimeter of the non-transparent portion which move air through the perimeter air filter.

In this example, a plurality of air impellers spans between 40% and 60% of the perimeter of a non-transparent portion of the mask. In this example, the perimeter air filter spans (e.g. encircles) the entire perimeter of the non-transparent portion of the mask and the plurality of air impellers spans one side (e.g. the right side or the left side) of the non-transparent portion. In an example, an arcuate array of air impellors can span some (or all) of an arcuate perimeter of a transparent portion of a mask. In an example, a circular array of air impellors can span a circular perimeter of a transparent portion of a mask. In an example, a linear array of air impellors can span some (or all) of a polygonal perimeter of a transparent portion of a mask.

There can be advantages from using a plurality of smaller air impellors instead of a single larger air impellor. One advantage is greater design flexibility with respect to the shape of an air exchange component on a mask. For example, a single large rotating impellor tends to require an air exchange component with a central circular cross-sectional shape. However, using a plurality of smaller air impellors instead of using one larger impellor can provide more design flexibility in the shape of an air exchange component on a mask. For example, one can create a linear or longitudinally-arcuate air exchange component by using a linear or longitudinally-arcuate array of air impellors.

The can also be other advantages from using a plurality of smaller air impellors instead of a single larger air impellor. In an example, a plurality of smaller air impellors can make less noise when rotating than a single larger air impellor. In an example, a plurality of smaller air impellors can move the same amount of air with a lower electric power requirement than a single larger air impellor. In an example, a plurality of smaller air impellors can produce more-uniform airflow than a single larger air impellor. In an example, a plurality of smaller air impellors can be safer than a single larger air impellor. In an example, a plurality of smaller air impellors can be substituted for a single larger air impellor in any of the other examples disclosed herein in order to achieve one of more of the above advantages.

In an example, the amount of airflow through an air filter can be adjusted by selectively changing the number of air impellors in a plurality of air impellors which are activated. In an example, the amount or direction of airflow through an air filter can be adjusted by selectively changing which air impellors in a plurality of air impellors which are activated. In an example, different air impellors in a plurality of air impellors can be activated in response to data from sensors which indicate how dirty and/or clogged different portions of an air filter are. In an example, different air impellors in a plurality of air impellors can be activated in response to data from biometric and/or physiological sensors which monitor the person. In an example, different air impellors in a plurality of air impellors can be activated in response to data from sensors which monitor air quality inside the mask (e.g. inside the transparent portion of the mask). In an example, different air impellors in a plurality of air impellors can be activated in response to data from environmental sensors. Other design variations discussed elsewhere in this disclosure or in priority-linked disclosures can also be applied to this example where relevant.

Figure 42:
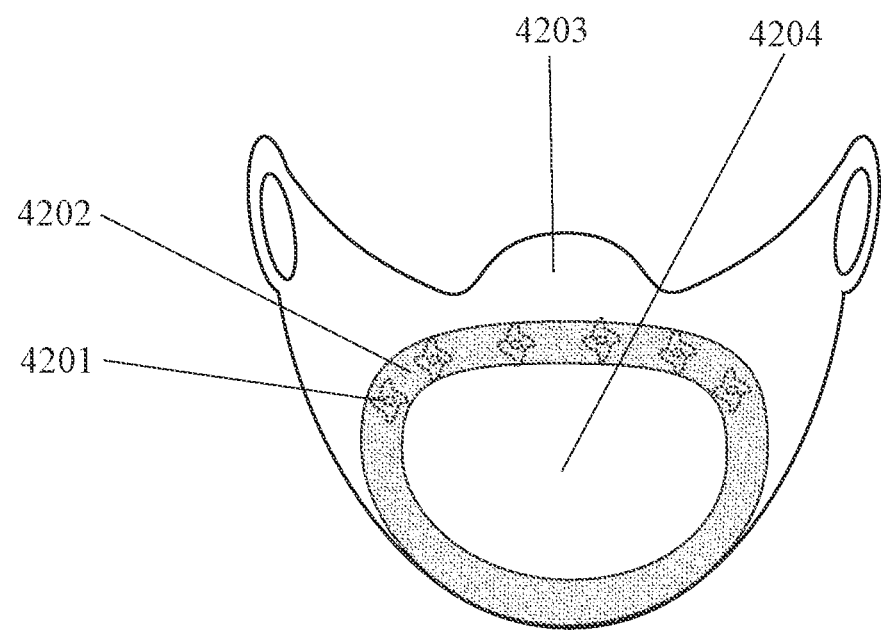
FIG. 42 shows a face mask with a transparent portion, a non-transparent portion, an air filter around the transparent portion, and a plurality of air impellors along the upper perimeter of the transparent portion.

FIG. 42 shows an example of a pathogen-filtering semi-transparent face mask comprising: a transparent portion 4204 of a face mask which covers at least part of a person's mouth; a non-transparent portion 4203 of the mask which holds the transparent portion on the person's head; a perimeter air filter 4202 along (e.g. around) at least part of the perimeter of the non-transparent portion; and a plurality of air impellors (including 4201) along (e.g. around) at least part of the perimeter of the non-transparent portion which move air through the perimeter air filter.

In this example, a plurality of air impellers spans between 40% and 60% of the perimeter of a non-transparent portion of the mask. In this example, the perimeter air filter spans (e.g. encircles) the entire perimeter of the non-transparent portion of the mask and the plurality of air impellers spans the upper of the non-transparent portion. In an example, an arcuate array of air impellors can span some (or all) of an arcuate perimeter of a transparent portion of a mask. In an example, a circular array of air impellors can span a circular perimeter of a transparent portion of a mask. In an example, a linear array of air impellors can span some (or all) of a polygonal perimeter of a transparent portion of a mask.

There can be advantages from using a plurality of smaller air impellors instead of a single larger air impellor. One advantage is greater design flexibility with respect to the shape of an air exchange component on a mask. For example, a single large rotating impellor tends to require an air exchange component with a central circular cross-sectional shape. However, using a plurality of smaller air impellors instead of using one larger impellor can provide more design flexibility in the shape of an air exchange component on a mask. For example, one can create a linear or longitudinally-arcuate air exchange component by using a linear or longitudinally-arcuate array of air impellors.

The can also be other advantages from using a plurality of smaller air impellors instead of a single larger air impellor.

In an example, a plurality of smaller air impellors can make less noise when rotating than a single larger air impellor. In an example, a plurality of smaller air impellors can move the same amount of air with a lower electric power requirement than a single larger air impellor. In an example, a plurality of smaller air impellors can produce more-uniform airflow than a single larger air impellor. In an example, a plurality of smaller air impellors can be safer than a single larger air impellor. In an example, a plurality of smaller air impellors can be substituted for a single larger air impellor in any of the other examples disclosed herein in order to achieve one of more of the above advantages.

In an example, the amount of airflow through an air filter can be adjusted by selectively changing the number of air impellors in a plurality of air impellors which are activated. In an example, the amount or direction of airflow through an air filter can be adjusted by selectively changing which air impellors in a plurality of air impellors which are activated. In an example, different air impellors in a plurality of air impellors can be activated in response to data from sensors which indicate how dirty and/or clogged different portions of an air filter are. In an example, different air impellors in a plurality of air impellors can be activated in response to data from biometric and/or physiological sensors which monitor the person. In an example, different air impellors in a plurality of air impellors can be activated in response to data from sensors which monitor air quality inside the mask (e.g. inside the transparent portion of the mask). In an example, different air impellors in a plurality of air impellors can be activated in response to data from environmental sensors. Other design variations discussed elsewhere in this disclosure or in priority-linked disclosures can also be applied to this example where relevant.

Figure 43:
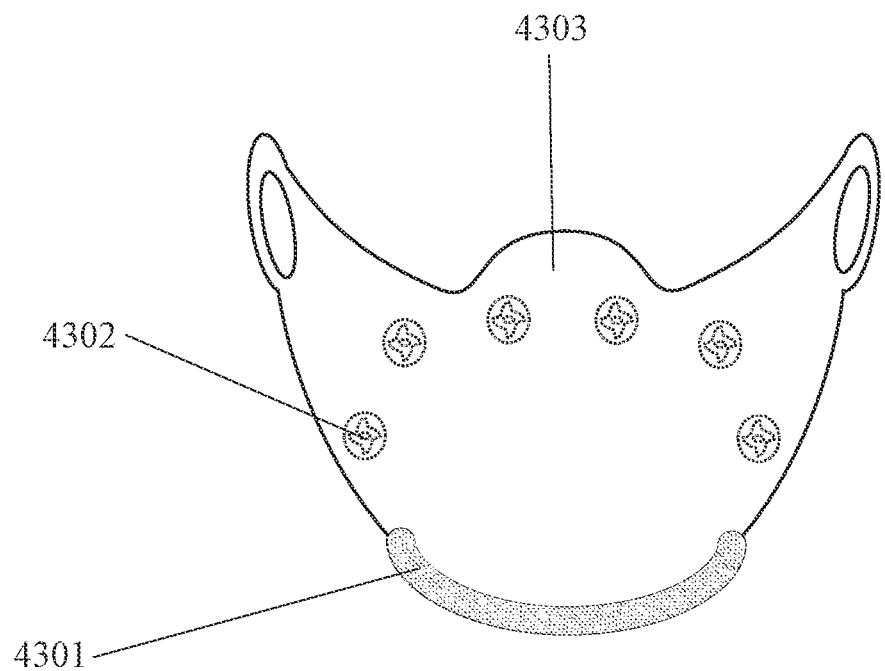
FIG. 43 shows a face mask with a transparent portion, a concave array of air impellors, and a lower perimeter air filter.

FIG. 43 shows an example of a pathogen-filtering semi-transparent face mask comprising: a transparent portion 4303 of a face mask which covers at least part of a person's mouth; an array of air impellors (including 4302) on the face mask which draw air from the environment into the face mask; and a perimeter air filter 4301 which spans (e.g. goes along) at least part of the perimeter of the face mask.

There can be advantages from using an array of smaller air impellors instead of a single larger air impellor. One advantage is greater design flexibility with respect to the shape of an air exchange component on a mask. For example, a single large rotating impellor tends to require an air exchange component with a central circular cross-sectional shape. However, using an array of smaller air impellors instead of using one larger impellor can provide more design flexibility in the shape of an air exchange component on a mask. For example, one can create a longitudinal arcuate air exchange component by using a longitudinal arcuate array of air impellors.

The can be other advantages from using an array of smaller air impellors instead of a single larger air impellor. In an example, an array of smaller air impellors can make less noise when rotating than a single larger air impellor. In an example, an array of smaller air impellors can move the same amount of air with a lower electric power requirement than a single larger air impellor. In an example, an array of smaller air impellors can produce more-uniform airflow than a single larger air impellor. In an example, an array of smaller air impellors can be safer than a single larger air impellor. In an example, an array of smaller air impellors can be substituted for a single larger air impellor in any of the other examples disclosed herein in order to achieve one of more of these advantages.

In an example, an array of air impellors on a face mask can collectively have a conic section shape. In an example, an array of air impellors can collectively form a concave arc. In an example, an array of air impellors can collectively form a concave arc with a downward-facing concavity (e.g. like a frown). In an example, an array of air impellors can collectively form a concave arc with an upward-facing concavity (e.g. like a smile). In an example, an array of air impellors can collectively form a circle, ellipse, or oval (e.g. around a person's mouth). In an example, an array of air impellors can be above a person's mouth. In an example, an array of air impellors can be below a person's mouth. In an example, there can be between 3 and 6 air impellors in an array of air impellors. In an example, there can be 3 air impellors in an array of air impellors. In an example, there can be between 4 and 8 air impellors in an array of air impellors.

In an example, an array of air impellors can span from a first side of a mask (e.g. the right side) to a second side of the mask (e.g. the left side). In an example, there can be a first array of air impellors on a first side of a mask (e.g. the right side) and a second array of air impellors on a second side of the mask (e.g. the left side). In an example, a face mask can comprise: a first arcuate array of air impellors on a first side of a mask (e.g. the right side) with a concavity which faces toward the second side (e.g. the left side); and a second arcuate array of air impellors on a second side of the mask (e.g. the left side) with a concavity which faces toward the first side (e.g. the right side).

In an example, the amount of airflow through (e.g. into and out of) a mask can be adjusted by selectively changing the number of air impellors in an array of air impellors which are activated and/or the speeds at which those air impellors rotate. In an example, the amount or direction of airflow through an air filter can be adjusted by selectively changing which air impellors in an array of air impellors which are activated. In an example, different air impellors in an array of air impellors can be activated in response to data from sensors which indicate how dirty and/or clogged different portions of an air filter are. In an example, different air impellors in an array of air impellors can be activated in response to data from biometric and/or physiological sensors which monitor the person. In an example, different air impellors in an array of air impellors can be activated in response to data from sensors which monitor air quality inside the mask (e.g. inside the transparent portion of the mask). In an example, different air impellors in a plurality of air impellors can be activated in response to data from environmental sensors.

In an example, a mask can further comprise a separate air filter in fluid communication with each air impellor. In an example, a mask can comprise an array of pairs of air filters and air impellors. Alternatively, a face mask can further comprise a single air filter which is in fluid communication with all air impellors. In an example, one or more air impellors in an array of air impellors can be individually and selectively activated. In an example, the number of air impellors in an array which are activated to move air can be proportional to the level of airborne pathogen threat in a given location or situation. In an example, the number of air impellors in an array which are activated to move air can be proportional to the oxygen requirement for the person wearing the mask at a given time (e.g. based on the person's activity or biometric sensor readings). In an example, the rotational directions of one or more rotating air impellors in an array of air impellors can be individually and selectively reversed.

In an example, a perimeter air filter can span at least part of the lower perimeter of a face mask. In an example, a perimeter air filter can span at least part of the lower perimeter of a transparent portion of a face mask. In an example, a perimeter air filter can span at least part of the upper perimeter of a face mask. In an example, a perimeter air filter can span at least part of the upper perimeter of a transparent portion of a face mask. In an example, a perimeter air filter can span at least part of the lower perimeter of a person's mouth. In an example, a perimeter air filter can span at least part of the upper perimeter of a person's mouth. In an example, a mask can comprise right-side and left-side air filters instead of a perimeter air filter. Other design variations discussed elsewhere in this disclosure or in priority-linked disclosures can also be applied to this example where relevant.

Figure 44:
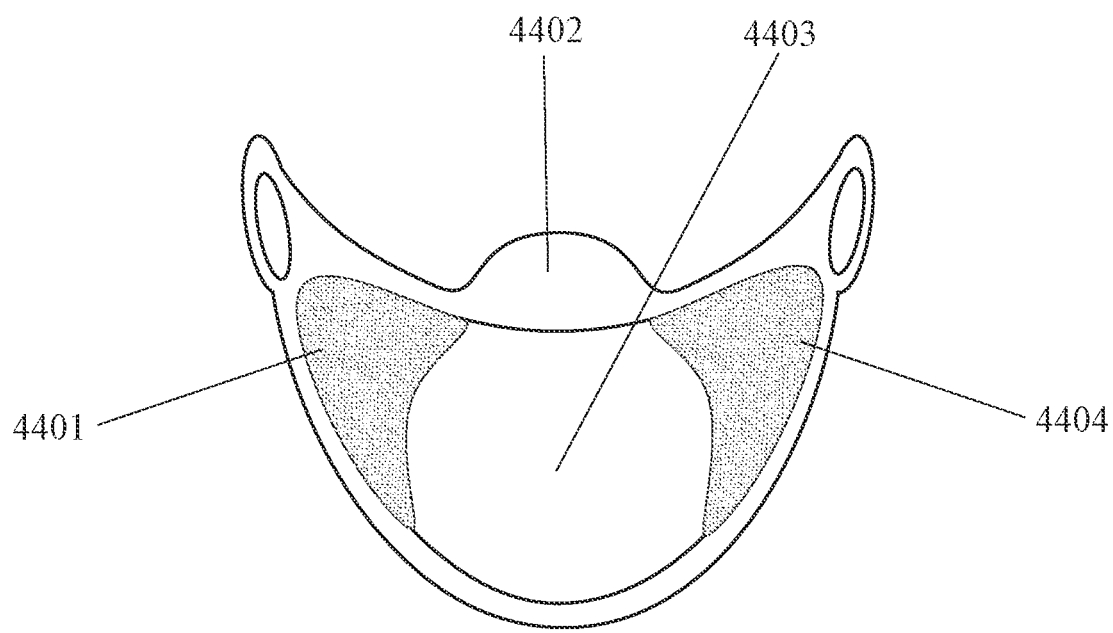
FIG. 44 shows a face mask with a transparent portion, a non-transparent portion, and air filters to the left and right of the transparent portion.

FIG. 44 shows an example of a pathogen-filtering semi-transparent face mask comprising: a transparent portion 4403 of a face mask which covers at least part of a person's mouth; a non-transparent portion 4402 of the face mask which holds the transparent portion on the person's head; a right-side air filter 4401 to the right of the transparent portion; and a left-side air filter 4404 to the left of the transparent portion.

In an example, a transparent portion of a face mask can cover (and/or span) a person's entire mouth. In an example, a transparent portion can cover a person's mouth and also portions of the person's cheeks. In an example, a transparent portion can cover a person's mouth, portions of the person's cheeks, and also a lower portion of the person's nose. In an example, the maximum distance from a transparent portion of a face mask to a person's mouth can be within the range of ½" to 3". In an example, the maximum distance from a transparent portion of a face mask to a person's mouth can be within the range of 1" to 4".

In an example, a transparent portion of a face mask can have a concave shape, wherein the concave interior of the transparent portion faces towards the person's mouth. In an example, a transparent portion of a face mask can have an arcuate concave shape. In an example, a transparent portion can have a shape which is a section of a sphere. In an example, a transparent portion can have a hemispherical shape. In an example, a transparent portion can have a shape which is a section of an oblate spheroid. In an example, a transparent portion can have a shape which is a section of an ellipsoid. In an example, a transparent portion can have a frustal shape. In an example, a transparent portion can have a shape which is a section of a round cylinder. In an example, a transparent portion can have a shape which is a section of a polygonal (e.g. quadrilateral, hexagonal, or octagonal) cylinder. In an example, a transparent portion can be shaped like the upper surface of a bicycle seat. In an example, a transparent portion can be shaped like the upper surface of a saddle.

In an example, a transparent portion of a face mask can be impermeable to air. In an example, a transparent portion of a face mask can be less permeable to air than a non-transparent portion of a face mask. In an example, a transparent portion can be less flexible than a non-transparent portion. In an example, a transparent portion can be rigid. In an example, a transparent portion can be made with a transparent polymer. In an example, a transparent portion can be coated with an anti-fogging coating. In an example, a transparent portion of a face mask can be heated to reduce fogging. In an example, airflow from an air impellor can be directed across the mouth-facing surface of a transparent portion of a face mask to reduce fogging.

In an example, a non-transparent portion of a face mask can hold a transparent portion of a face mask on a person's head by being attached to (e.g. looping around) the person's ears. In an example, a non-transparent portion can hold the transparent portion on a person's head by being attached to (e.g. looping around) the rear of the person's head. In an example, a non-transparent portion can comprise straps, bands, cords, or strings. In an example, a non-transparent portion can comprise four straps, bands, cords, or strings. In an example, a non-transparent portion can comprise two straps, bands, cords, or strings. In an example, a non-transparent portion can comprise elastic and/or stretchable straps, bands, cords, or strings. In an example, a non-transparent portion can comprise fabric straps. In an example, a non-transparent portion can be made from a flexible fabric and/or textile. In an example, a non-transparent portion can be permeable to air. In an example, a non-transparent portion can be impermeable to air. In an example, a non-transparent portion can be less permeable to air than an air filter.

In an example, a transparent portion and a non-transparent portion of a face mask can be attached to each other by sewing or weaving. In an example, a transparent portion and a non-transparent portion can be attached to each other by adhesion and/or gluing. In an example, a transparent portion and a non-transparent portion can be attached to each other by melting and/or welding. In an example, a transparent portion and a non-transparent portion can be attached to each other by snaps, clips, clamps, hooks, pins, prongs, or buttons.

In an example, a side air filter can be contiguous to a transparent portion of a face mask. In an example, a side air filter can be contiguous to the side perimeter of a transparent portion of a face mask. In an example, a side air filter can be attached to the side perimeter of a transparent portion of a face mask. In an example, a side air filter can span between 20% and 40% of the perimeter of a transparent portion of a face mask. In an example, a side air filter can be contiguous with between 20% and 40% of the perimeter of a transparent portion of a face mask. In an example, a side air filter can span between 30% and 50% of the perimeter of a transparent portion of a face mask. In an example, a side air filter can be contiguous with between 30% and 50% of the perimeter of a transparent portion of a face mask.

In an example, a side air filter can have a shape selected from the group consisting of: an arrowhead shape, a Nike™ swoosh shape, a Star-Trek™ badge shape (turned sideways), a parabolic shape; and a conic section shape. In an example, a side air filter can have a filtration area with the range of ½ square inch to 3 square inches. In an example, a side air filter can have a filtration area with the range of 2 to 6 square inches. In an example, right-side and left-side air filters can be symmetric with respect to a central vertical plane of a mask. In an example, right-side and left-side air filters can be passive air filters. Alternatively, right-side and left-side air filters can be active air filters, wherein the right-side air filter is paired with a right-side air impellor and the left-side air filter is paired with a left-side air impellor.

In an example, a side air filter can be removably attached to a face mask via a clip, snap, clasp, hook, clamp, adhesive substance, or pin. In an example, a side air filter can be disposable. In an example, a side air filter can be detached from a face mask, cleaned, and then reattached to the face mask. In an example, a mask can further comprise a sensor which tracks the cumulative airflow through an upper filter and indicates when the side air filter should be changed and/or cleaned. In an example, a mask can further comprise a sensor which tracks the level of airflow resistance through an upper filter and indicates when the side air filter should be changed and/or cleaned. In an example, there can be two air filters, wherein the mask directs airflow through a first filter until a sensor detects that the first filter is dirty, at which time the mask automatically redirects airflow through a second filter. In an example, a side air filter can further comprise two air filters, wherein the mask directs air through a second filter when the first filter becomes dirty and/or clogged.

In an example, a face mask can further comprise one or more components selected from the group consisting of: data processor, power source (e.g. battery), data transmitter/receiver, biometric and/or physiological sensor, environmental sensor, microphone, speaker, interior mask light, exterior mask light, ultraviolet light emitter in optical communication with airflow within the mask, touch screen, push buttons or switches, a strap or band which loops around the back of a person's head, and a strap or band which loops over the top of a person's head. In an example, a face mask can further comprise a microphone which is in acoustic communication with the interior of the mask (e.g. with the interior of the transparent portion) and a speaker which reproduces sound recorded by the microphone. In an example, a face mask can further comprise a microphone on the inside of the mask which records a person's voice and a speaker on the outside of the mask which reproduces the person's voice. In an example, a face mask can further comprise one or more lights on the inside of the mask which highlight a person's mouth in order to increase visibility of the person's mouth (e.g. lip motion and facial expression) by nearby people. Other design variations discussed elsewhere in this disclosure or in priority-linked disclosures can also be applied to this example where relevant.

Figure 45:
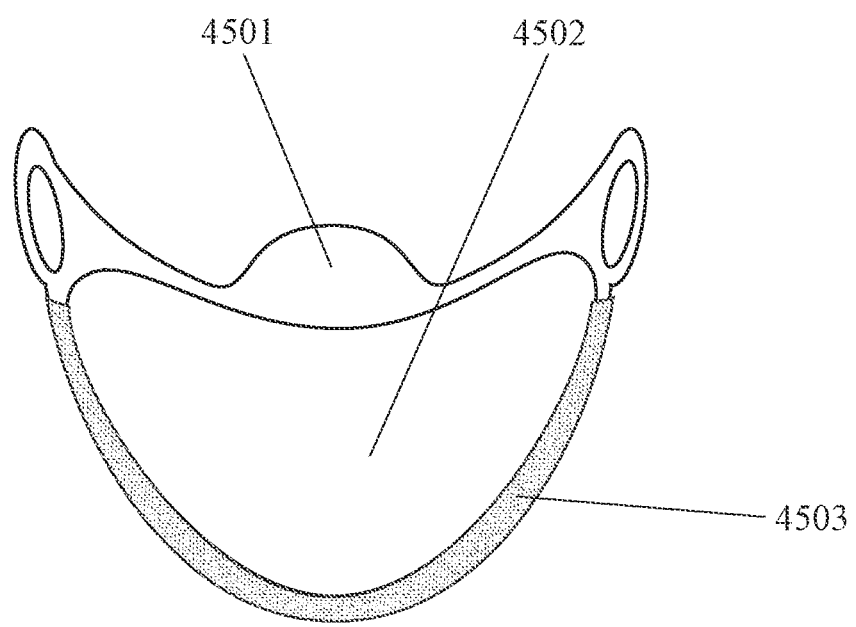
FIG. 45 shows a face mask with a transparent portion, a non-transparent portion, and an air filter along the lower perimeter of the mask.

FIG. 45 shows an example of a pathogen-filtering semi-transparent face mask comprising: a transparent portion 4502 of a face mask which covers at least part of a person's mouth; a non-transparent portion 4501 of the face mask which holds the transparent portion on the person's head; and a lower air filter 4503 which is at least partly below the person's mouth.

In an example, a transparent portion of a face mask can cover (and/or span) a person's entire mouth. In an example, a transparent portion can cover a person's mouth and also portions of the person's cheeks. In an example, a transparent portion can cover a person's mouth, portions of the person's cheeks, and also a lower portion of the person's nose. In an example, the maximum distance from a transparent portion of a face mask to a person's mouth can be within the range of ½" to 3". In an example, the maximum distance from a transparent portion of a face mask to a person's mouth can be within the range of 1" to 4".

In an example, a transparent portion of a face mask can have a concave shape, wherein the concave interior of the transparent portion faces towards the person's mouth. In an example, a transparent portion of a face mask can have an arcuate concave shape. In an example, a transparent portion can have a shape which is a section of a sphere. In an example, a transparent portion can have a hemispherical shape. In an example, a transparent portion can have a shape which is a section of an oblate spheroid. In an example, a transparent portion can have a shape which is a section of an ellipsoid. In an example, a transparent portion can have a frustal shape. In an example, a transparent portion can have a shape which is a section of a round cylinder. In an example, a transparent portion can have a shape which is a section of a polygonal (e.g. quadrilateral, hexagonal, or octagonal) cylinder. In an example, a transparent portion can be shaped like the upper surface of a bicycle seat. In an example, a transparent portion can be shaped like the upper surface of a saddle. In an example, a transparent portion can be shaped like a large smile and/or mouth.

In an example, a transparent portion of a face mask can be impermeable to air. In an example, a transparent portion of a face mask can be less permeable to air than a non-transparent portion of a face mask. In an example, a transparent portion can be less flexible than a non-transparent portion. In an example, a transparent portion can be rigid. In an example, a transparent portion can be made with a transparent polymer. In an example, a transparent portion can be coated with an anti-fogging coating. In an example, a transparent portion of a face mask can be heated to reduce fogging. In an example, airflow from an air impellor can be directed across the mouth-facing surface of a transparent portion of a face mask to reduce fogging.

In an example, a non-transparent portion of a face mask can hold a transparent portion of a face mask on a person's head by being attached to (e.g. looping around) the person's ears. In an example, a non-transparent portion can hold the transparent portion on a person's head by being attached to (e.g. looping around) the rear of the person's head. In an example, a non-transparent portion can comprise straps, bands, cords, or strings. In an example, a non-transparent portion can comprise four straps, bands, cords, or strings. In an example, a non-transparent portion can comprise two straps, bands, cords, or strings. In an example, a non-transparent portion can comprise elastic and/or stretchable straps, bands, cords, or strings. In an example, a non-transparent portion can comprise fabric straps. In an example, a non-transparent portion can be made from a flexible fabric and/or textile. In an example, a non-transparent portion can be permeable to air. In an example, a non-transparent portion can be impermeable to air. In an example, a non-transparent portion can be less permeable to air than an air filter.

In an example, a transparent portion and a non-transparent portion of a face mask can be attached to each other by sewing or weaving. In an example, a transparent portion and a non-transparent portion can be attached to each other by adhesion and/or gluing. In an example, a transparent portion and a non-transparent portion can be attached to each other by melting and/or welding. In an example, a transparent portion and a non-transparent portion can be attached to each other by snaps, clips, clamps, hooks, pins, prongs, or buttons.

In an example, a lower air filter can be at least partly below (e.g. have a lower height than the bottom of) a person's mouth. In an example, a lower air filter can be entirely below (e.g. have a lower height than the bottom of) a person's mouth. In an example, a lower air filter can be located directly below a person's mouth. In an example, a lower air filter can be on and/or below a person's jaw. In an example, a lower air filter can span a person's jaw substantially from one ear to the other. In an example, a lower air filter can be on and/or below a person's chin. In an example, a lower air filter can be arcuate with an upward-facing concavity.

In an example, a lower air filter can span at least part of the lower perimeter of a face mask. In an example, a lower air filter can span at least part of the lower perimeter of the transparent portion a face mask. In an example, a lower air filter can span between 20% and 40% of the lower perimeter of a face mask. In an example, a lower air filter can span between 20% and 40% of the lower perimeter of the transparent portion a face mask. In an example, a lower air filter can span between 30% and 80% of the lower perimeter of a face mask. In an example, a lower air filter can span between 30% and 80% of the lower perimeter of the transparent portion a face mask. In an example, a lower air filter can span the entire lower perimeter of a face mask. In an example, a lower air filter can span the entire lower perimeter of the transparent portion a face mask.

In an example, a lower air filter can be removably attached to a face mask via a clip, snap, clasp, hook, clamp, adhesive substance, or pin. In an example, a lower air filter can be disposable. In an example, a lower air filter can be detached from a face mask, cleaned, and then reattached to the face mask. In an example, a mask can further comprise a sensor which tracks the cumulative airflow through an upper filter and indicates when the lower air filter should be changed and/or cleaned. In an example, a mask can further comprise a sensor which tracks the level of airflow resistance through an upper filter and indicates when the lower air filter should be changed and/or cleaned. In an example, there can be two air filters, wherein the mask directs airflow through a first filter until a sensor detects that the first filter is dirty, at which time the mask automatically redirects airflow through a second filter. In an example, a lower air filter can further comprise two air filters, wherein the mask directs air through a second filter when the first filter becomes dirty and/or clogged.

In an example, a face mask can further comprise one or more components selected from the group consisting of: data processor, power source (e.g. battery), data transmitter/receiver, biometric and/or physiological sensor, environmental sensor, microphone, speaker, interior mask light, exterior mask light, ultraviolet light emitter in optical communication with airflow within the mask, touch screen, push buttons or switches, a strap or band which loops around the back of a person's head, and a strap or band which loops over the top of a person's head. In an example, a face mask can further comprise a microphone which is in acoustic communication with the interior of the mask (e.g. with the interior of the transparent portion) and a speaker which reproduces sound recorded by the microphone. In an example, a face mask can further comprise a microphone on the inside of the mask which records a person's voice and a speaker on the outside of the mask which reproduces the person's voice. In an example, a face mask can further comprise one or more lights on the inside of the mask which highlight a person's mouth in order to increase visibility of the person's mouth (e.g. lip motion and facial expression) by nearby people. Other design variations discussed elsewhere in this disclosure or in priority-linked disclosures can also be applied to this example where relevant.

I claim:

1. A pathogen-filtering semi-transparent face mask comprising:
    a transparent portion of a face mask which is configured to cover at least part of a person's mouth;
    a first-side air filter on a first side of the mask is configured to be positioned below the person's jaw;
    a first-side air impellor on the first side of the mask is configured to be positioned below the person's jaw which draws air into the mask from the environment through the first-side air filter;
    a second-side air filter on a second side of the mask is configured to be positioned below the person's jaw;
    a second-side air impellor on the second side of the mask is configured to be positioned below the person's jaw which draws air into the mask from the environment through the second-side air filter;
    a central air filter between the first-side air filter and the second-side air filter, wherein the central air filter spans a perimeter of the transparent portion between the first-side air filter and the second-side air filter; and
    one or more air tubes or channels between the first-side and second-side air filters and an interior space of the transparent portion.

2. A pathogen-filtering semi-transparent face mask comprising:
    a transparent portion of a face mask which is configured to cover at least part of a person's mouth;
    non-transparent portions of the face mask which hold the transparent portion on the person's head;
    a first-side air filter on a first side of the transparent portion;
    a first-side air impellor which moves air through the first-side air filter;
    a second-side air filter on a second side of the transparent portion;
    a second-side air impellor which moves air through the second-side air filter; and
    a concave air filter with a concavity which opens upwards in a direction configured to be pointed towards the person's mouth, wherein the concave air filter spans between 15% and 60% of a perimeter of the transparent portion of the mask.

3. A pathogen-filtering semi-transparent face mask comprising:
    a transparent portion of a face mask which is configured to cover at least part of a person's mouth;
    a first-side air filter configured to be positioned on a first side of the person's head, wherein the first-side air filter is configured to be positioned directly behind and posterior to the person's first-side ear;
    a first-side air impellor which moves air through the first-side air filter;
    a first-side air tube or channel which directs airflow between the first-side air filter and the transparent portion;
    a second-side air filter configured to be positioned on a second side of the person's head, wherein the second-side air filter is configured to be positioned directly behind and posterior to the person's second-side ear;
    a second-side air impellor which moves air through the second-side air filter;
    a second-side air tube or channel which directs airflow between the second-side air filter and the transparent portion; and
    a lower air filter which spans at least 25% of the lower perimeter of the mask.

* * * * *